(12) United States Patent
Yi et al.

(10) Patent No.: US 12,238,702 B2
(45) Date of Patent: Feb. 25, 2025

(54) CROSS-CARRIER SCHEDULING FOR SIDELINK COMMUNICATIONS

(71) Applicant: Ofinno, LLC, Reston, VA (US)

(72) Inventors: Yunjung Yi, Vienna, VA (US); Esmael Hejazi Dinan, McLean, VA (US); Hyukjin Chae, Fairfax, VA (US); Hua Zhou, Vienna, VA (US); Taehun Kim, Fairfax, VA (US); Kyungmin Park, Vienna, VA (US); Youngwoo Kwak, Woodbury, NY (US); Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 296 days.

(21) Appl. No.: 17/694,343

(22) Filed: Mar. 14, 2022

(65) Prior Publication Data

US 2022/0201716 A1 Jun. 23, 2022

Related U.S. Application Data

(63) Continuation of application No. PCT/US2020/053146, filed on Sep. 28, 2020.

(Continued)

(51) Int. Cl.
*H04W 72/1263* (2023.01)
*H04W 24/08* (2009.01)
(Continued)

(52) U.S. Cl.
CPC ....... *H04W 72/1263* (2013.01); *H04W 24/08* (2013.01); *H04W 72/0453* (2013.01);
(Continued)

(58) Field of Classification Search
CPC ............. H04W 72/1263; H04W 24/08; H04W 72/0453; H04W 72/23; H04W 80/02; H04W 92/18; H04W 76/14
See application file for complete search history.

(56) References Cited

U.S. PATENT DOCUMENTS

| 11,638,285 B2 * | 4/2023 | Park ...................... H04L 1/1861 |
| | | 370/329 |
| 2015/0078279 A1 * | 3/2015 | Ko ....................... H04W 52/242 |
| | | 370/329 |

(Continued)

FOREIGN PATENT DOCUMENTS

WO WO-2021007862 A1 * 1/2021 ........... H04L 1/1812

OTHER PUBLICATIONS

Tseng et al., "Inter•RAT Sidelink Enhancements", U.S. Appl. No. 62/740,109 Oct. 2, 2018, Total Pages: 26 (Year: 2018).*

(Continued)

*Primary Examiner* — Shah M Rahman
(74) *Attorney, Agent, or Firm* — Patrick Moon; Kavon Nasabzadeh; Jacob L. Mangan

(57) ABSTRACT

A first wireless device may receive, from a base station, one or more configuration parameters. The one or more configuration parameters may indicate a first search space of a first cell for scheduling resources of a sidelink carrier and a second search space of a second cell for scheduling resources of the sidelink carrier. The first wireless device may monitor the first search space and the second search space. The first wireless device may receive, based on the monitoring, sidelink downlink control information (DCI) scheduling a sidelink resource of the sidelink carrier. The first wireless device may transmit, to a second wireless device, a sidelink transmission via the sidelink resource.

16 Claims, 34 Drawing Sheets

Related U.S. Application Data

(60) Provisional application No. 62/906,990, filed on Sep. 27, 2019.

(51) Int. Cl.
*H04W 72/0453* (2023.01)
*H04W 72/23* (2023.01)
*H04W 80/02* (2009.01)
*H04W 92/18* (2009.01)

(52) U.S. Cl.
CPC ............ *H04W 72/23* (2023.01); *H04W 80/02* (2013.01); *H04W 92/18* (2013.01)

(56) References Cited

U.S. PATENT DOCUMENTS

| | | | | |
|---|---|---|---|---|
| 2017/0303222 | A1* | 10/2017 | Lee | H04W 4/70 |
| 2018/0124650 | A1* | 5/2018 | Park | H04W 36/0055 |
| 2019/0053193 | A1* | 2/2019 | Park | H04W 72/51 |
| 2019/0274121 | A1* | 9/2019 | Wu | H04L 5/0092 |
| 2020/0107236 | A1* | 4/2020 | Tseng | H04W 4/40 |
| 2020/0314822 | A1* | 10/2020 | Lee | H04W 72/12 |
| 2021/0022142 | A1* | 1/2021 | Wu | H04W 72/56 |
| 2021/0045074 | A1* | 2/2021 | Manolakos | H04L 5/0057 |
| 2021/0045100 | A1* | 2/2021 | Park | H04W 72/21 |
| 2021/0136567 | A1* | 5/2021 | Lu | H04W 8/24 |
| 2021/0176747 | A1* | 6/2021 | Yang | H04W 72/0446 |
| 2021/0282165 | A1* | 9/2021 | Lee | H04W 72/23 |
| 2022/0150936 | A1* | 5/2022 | Lee | H04W 52/38 |
| 2022/0264678 | A1* | 8/2022 | Jung | H04W 76/27 |
| 2022/0272726 | A1* | 8/2022 | Wang | H04W 72/1263 |
| 2022/0322156 | A1* | 10/2022 | Kim | H04W 76/28 |
| 2023/0060947 | A1* | 3/2023 | Wang | H04W 72/1215 |

OTHER PUBLICATIONS

R1-1908148 Physical layer structure for NR sidelink_final; 3GPP TSG RAN WG1 #98 Meeting; Prague, CZ, Aug. 26-30, 2019; Source:vivo; Title:Physical layer structure for NR sidelink; Agenda Item:7.2.4.1.
R1-1908149 Discussion on mode 1 resource allocation mechanism; 3GPP TSG RAN WG1 #98; Prague, CZ, Aug. 26-30, 2019; Source:vivo; Title:Discussion on mode 1 resource allocation mechanism; Agenda Item:7.2.4.2.1.
R1-1908218 Control Channel Design and its Efficient Transmission; 3GPP TSG RAN WG1 #98; Prague, CZ, Aug. 26-30, 2019; Source: Fujitsu; Title: Control Channel Design and its Efficient Transmission in NR-V2X; Agenda Item:7.2.4.1.
R1-1908219 Discussion on mode 1 resource allocation for NR V2X; 3GPP TSG RAN WG1 #98; Prague, CZ, Aug. 26-30, 2019; Agenda Item:7.2.4.2.1; Source: Fujitsu; Title:Discussion on mode 1 resource allocation for NR V2X.
R1-1908282—Nokia-5G_V2X_NRSL—Discussion of physical layer structure for sidelink v1; 3GPP TSG RAN WG1 #98; Prague, CZ, Aug. 26-30, 2019; Source:Nokia, Nokia Shanghai Bel ; Title:Discussion of physical layer structure for sidelink; Agenda item:7.2.4.1; Document for:Discussion and Decision.
R1-1908361 PHY layer structure; 3GPP TSG RAN WG1 #98; Prague, CZ, Aug. 26-30, 2019; Source:OPPO ; Title:Physical layer structure for NR-V2X; Agenda Item:7.2.4.1.
R1-1908396 Discussion on sidelink physical layer structure; 3GPP TSG RAN WG1 #98; Prague, Czech, Aug. 26-30, 2019; Agenda item:7.2.4.1; Source: MediaTek Inc.; Title: Discussion on sidelink physical layer structure; Document for:Discussion/Decision.
R1-1908397 Discussion on Mode-1 resource allocation for NR SL; 3GPP TSG RAN1 WG1 Meeting #98; Prague, CZ, Aug. 26-30, 2019; Agenda item:7.2.4.2.1; Title:Discussion on Mode-1 resource allocation for NR SL; Source: MediaTek Inc.
R1-1908475 On physical layer structures for NR V2X; 3GPP TSG RAN WG1 #98 Meeting; Prague, CZ, Aug. 26-30, 2019; Agenda item:7.2.4.1; Source: Samsung; Title: On physical layer structures for NR V2X; Document for: Discussion and Decision.
R1-1908476 On Resource Allocation for NR V2X Mode 1-Samsung; 3GPP TSG RAN WG1 #98; Prague, CZ, Aug. 26-30, 2019; Agenda item:7.2.4.2.1; Source: Samsung; Title: On Resource Allocation for NR V2X Mode 1.
R1-1908675—RAN1#98-V2X_RS_Mitsubishi; 3GPP TSG RAN WG1 #98; Prague, CZ, Aug. 26-30, 2019; Source:Mitsubishi Electric; Title:Physical layer design for NR V2X sidelink; Agenda Item:7.2.4.1Physical layer structure for sidelink.
R1-1908850 Physical layer structure for NR sidelink; 3GPP TSG RAN WG1 #98; Prague, CZ, Aug. 26-30, 2019; Agenda Item:7.2.4.1; Source: NEC.
R1-1908851 Mode 1 resource allocation mechanism for NR sidelink; 3GPP TSG RAN WG1 #98; Prague, CZ, Aug. 26-30, 2019; Agenda Item:7.2.4.2.1; Source: NEC; Title:Mode 1 resource allocation mechanism for NR sidelink.
R1-1908894 Sidelink physical structure; 3GPP TSG RAN WG1 #98; Prague, CZ, Aug. 26-30, 2019; Title: NR sidelink physical layer structure; Source: ZTE, Sanechips; Agenda item:7.2.4.1.
R1-1908900 Discussion on physical layer structure for NR sidelink; 3GPP TSG RAN WG1 #98; Prague, CZ, Aug. 26-30, 2019; Agenda Item:7.2.4.1; Source: LG Electronics; Title: Discussion on physical layer structure for NR sidelink; Document for:Discussion and decision.
R1-1908911 Ericsson—PHY layer structure for NR sidelink; 3GPP TSG-RAN WG1 Meeting #98; Prague, CZ, Aug. 26-30, 2019; Agenda Item:7.2.4.1; Source:Ericsson; Title:PHY layer structure for NR sidelink.
R1-1908912 Ericsson—Uu-based sidelink resource allocation; 3GPP TSG-RAN WG1 Meeting #98; Prague, CZ, Aug. 26-30, 2019; Agenda Item:7.2.4.2.1; Source:Ericsson; Title:Uu-based sidelink resource allocation.
R1-1908947 Discussion on physical layer structure for sidelink_final; 3GPP TSG RAN WG1 #98; Prague, CZ, Aug. 26-30, 2019; Source:Spreadtrum Communications; Title:Discussion on physical layer structure for sidelink; Agenda item:7.2.4.1.
R1-1908948 Consideration on NR sidelink mode 1 resource allocation_final; 3GPP TSG RAN WG1 #98; Prague, CZ, Aug. 26-30, 2019; Agenda Item: 7.2.4.2.1; Source:Spreadtrum Communications; Title:Consideration on NR sidelink mode 1 resource allocation.
R1-1909028 On Physical Layer Structure for NR V2X Sidelink_final; 3GPP TSG RAN WG1 #98; Prague, CZ, Aug. 26-30, 2019; Agenda Item:7.2.4.1; Source:InterDigital, Inc.; Title:On Physical Layer Structure for NR V2X Sidelink.
R1-1909070 Physical layer structure for NR sidelink design; 3GPP TSG RAN WG1 #98; Prague, CZ, Aug. 26-30, 2019; Agenda Item:7.2.4.1; Source:AT&T; Title:Physical layer structure design for sidelink.
R1-1909185_DCM_SL PHY structure_fin; 3GPP TSG RAN WG1 #98; Prague, CZ, Aug. 26-30, 2019; Source: NTT Docomo, Inc.; Title:Sidelink physical layer structure for NR V2X; Agenda Item:7.2.4.1.
R1-1909186 NR Sidelink Resource Allocation Mechanism Mode 1; 3GPP TSG RAN WG1 #98; Prague, Czech Rep, Aug. 26-30, 2019; Source:NTT Docomo, Inc.; Title:NR Sidelink Resource Allocation Mechanism Mode 1; Agenda Item:7.2.4.2.1.
R1-1909252_Considerations on Physical Layer aspects of NR V2X; 3GPP TSG RAN WG1 Meeting #98; Prague, CZ, Aug. 26-30, 2019; Agenda item:7.2.4.1; Source: Qualcomm Incorporated; Title: Considerations on Physical Layer aspects of NR V2X.
R1-1909305 Discussion on sidelink structure in NR V2X; 3GPP TSG RAN WG1 #98; Prague, CZ, Aug. 26-30, 2019 ; ; Agenda Item:7.2.4.1; Source: ASUSTeK; Title:Discussion on sidelink structure in NR V2X.
R1-1909419_on_phy_struct_NR_V2X_SL; 3GPP TSG-RAN WG1 Meeting #98R1-1909419 Prague, CZ, Aug. 26-30, 2019; ; Agenda item:7.2.4.1 ; Title:On physical layer structure for NR V2X sidelink; Source:Convida Wireless.
R1-1909461 On physical layer structures for NR V2X_r1; 3GPP TSG RAN WG1 #98 Meeting ; Prague, CZ, Aug. 26-30, 2019; Agenda item:7.2.4.1; Source: Samsung; Title: On physical layer structures for NR V2X; Document for:Discussion and Decision.

(56) References Cited

OTHER PUBLICATIONS

R1-1909462 FL summary#1 for 7.2.4.1 PHY layer structure for sidelink_v1; 3GPP TSG RAN WG1 #98 Meeting; Prague, CZ, Aug. 26-30, 2019; Agenda item:7.2.4.1; Source: Samsung; Title: Feature lead summary#1 for agenda item 7.2.4.1 Physical layer structure for sidelink; Document for:Discussion and Decision.
R1-1909487—Feature lead summary 1 on Resource allocation for NR sidelink Mode; 3GPP TSG-RAN WG1 Meeting #98; Prague, CZ, Aug. 26-30, 2019; Agenda Item:7.2.4.2.1; Source:Ericsson; Title:Feature lead summary#1 on Resource allocation for NR sidelink Mode 1.
R1-1909609 FL summary#2 for 7.2.4.1 PHY layer structure for sidelink_v2; 3GPP TSG RAN WG1 #98 Meeting; Prague, CZ, Aug. 26-30, 2019; Agenda item:7.2.4.1; Source: Samsung; Title: Feature lead summary#2 for agenda item 7.2.4.1 Physical layer structure for sidelink; Document for Discussion and Decision.
R1-1909797—Feature lead summary2 on Resource allocation for NR sidelink Mode 1; 3GPP TSG-RAN WG1 Meeting #98; Prague, CZ, Aug. 26-30, 2019(Revision of R1-1909487); Agenda Item:7.2.4.2.1; Source:Ericsson; Title: Feature lead summary#2 on Resource allocation for NR sidelink Mode 1.
R1-1909839 FL summary#3 for 7.2.4.1 PHY layer structure for sidelink_v5; 3GPP TSG RAN WG1 #98 Meeting; Prague, CZ, Aug. 26-30, 2019; Agenda item:7.2.4.1; Source: Samsung; Title: Feature lead summary#3 for agenda item 7.2.4.1 Physical layer structure for sidelink; Document for:Discussion and Decision.
R1-1908275 3GPP TSG RAN WG1 Meeting #98; Prague, Czech Republic, Aug. 26-30, 2019; Agenda Item: 7.2.4.1 Source: TCL Communication; Title: Physical Layer Structure for Sidelink; Document for: Discussion and Decision.
International Search Report and Written Opinion for International Application No. PCT/US2020/053146, mailed on Mar. 11, 2021.
R1-1908640 3GPP TSG RAN WG1 Meeting #98 Prague, Czech Republic, Aug. 26-30, 2019; Source: Intel Corporation; Title: LTE Sidelink Communication under gNB Control; Agenda item: 7.2.4.7; Document for: Discussion and Decision.
R1-1908901 3GPP TSG RAN WG1 #98 Meeting; Prague, Aug. 26-30, 2019; Agenda item: 7.2.4.2.1 Source: LG Electronics; Title: Discussion on resource allocation for NR sidelink Mode 1; Document for: Discussion and decision.
3GPP TS 38.212 V15.7.0 (Sep. 2019); 3rd Generation Partnership Project; Technical Specification Group Radio Access Network; NR; Multiplexing and channel coding (Release 15).

* cited by examiner

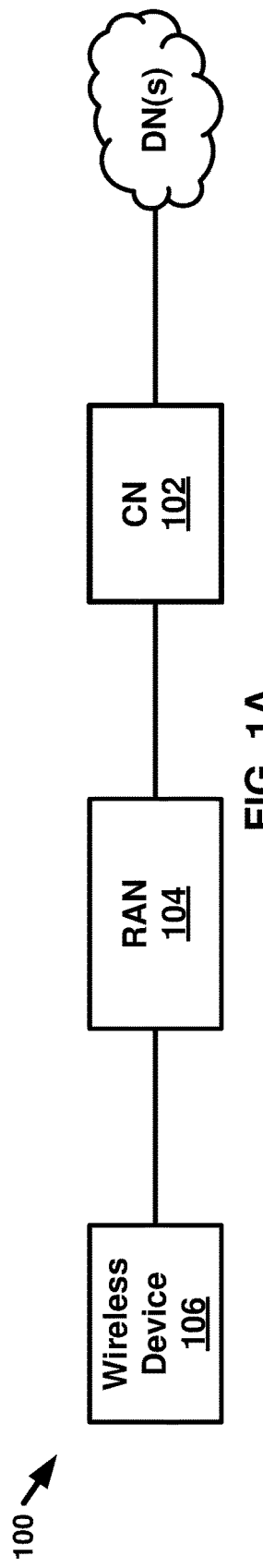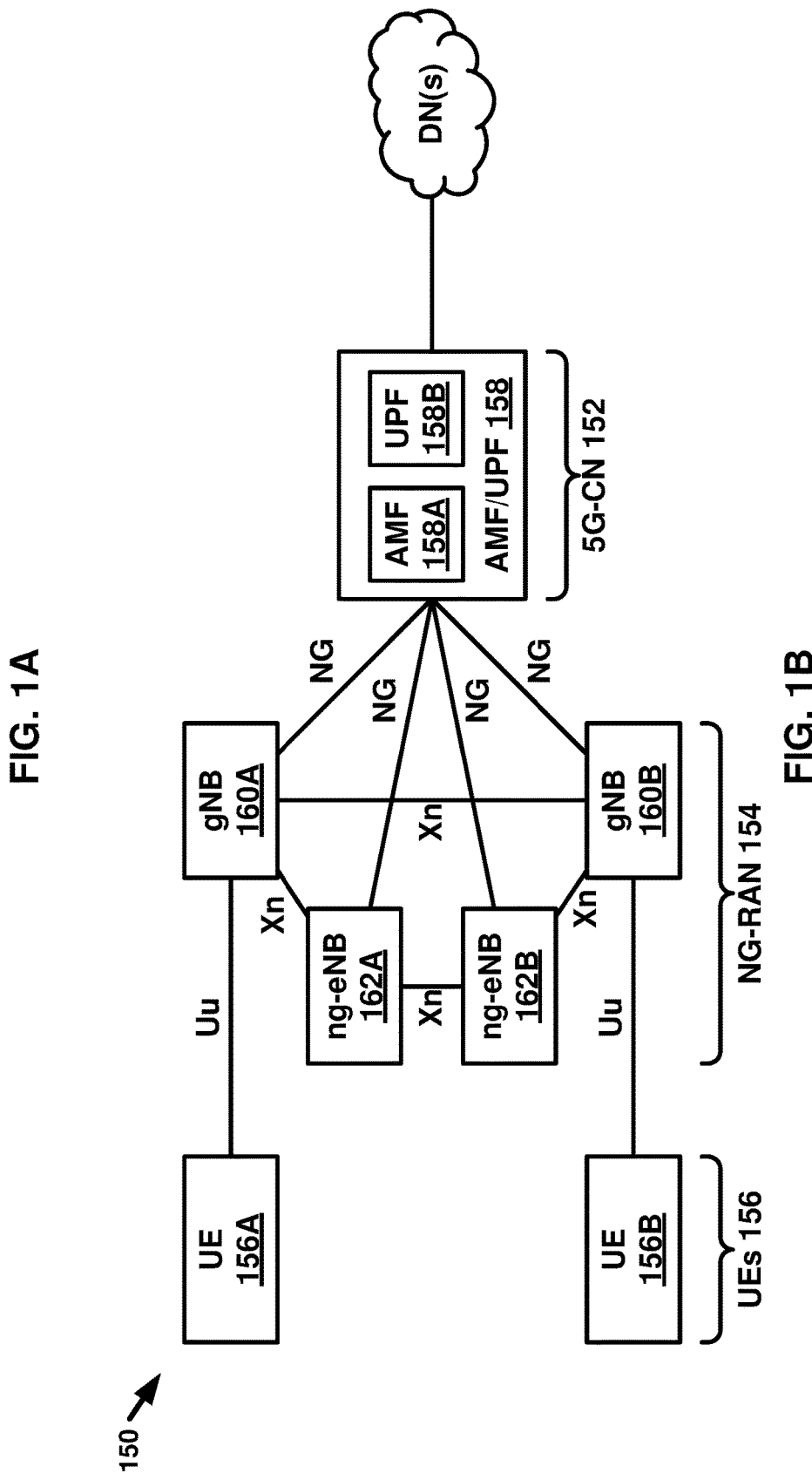

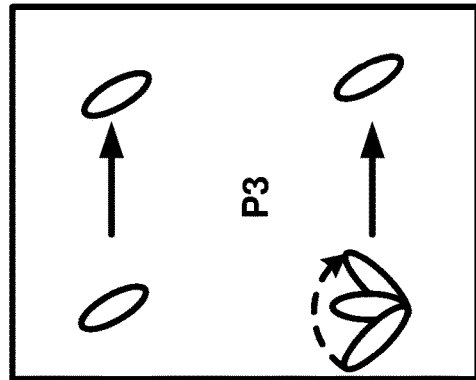
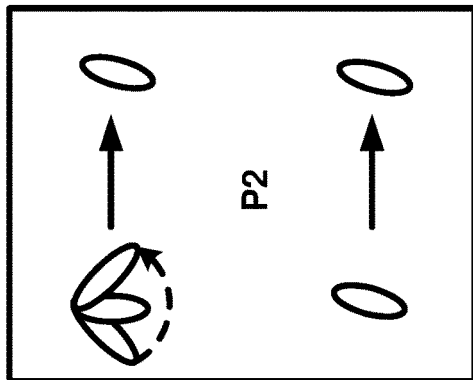
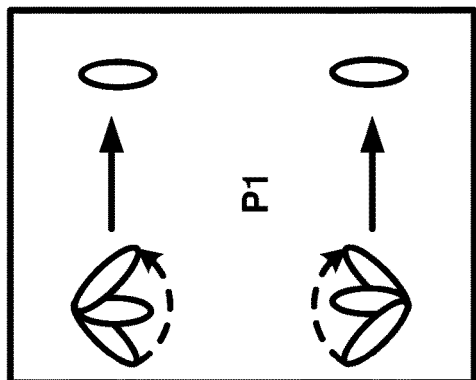
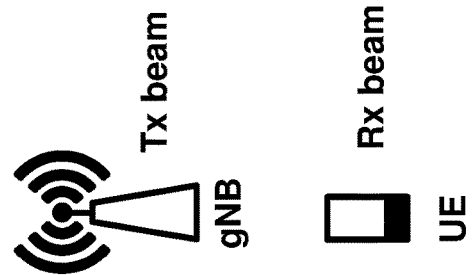
FIG. 12A
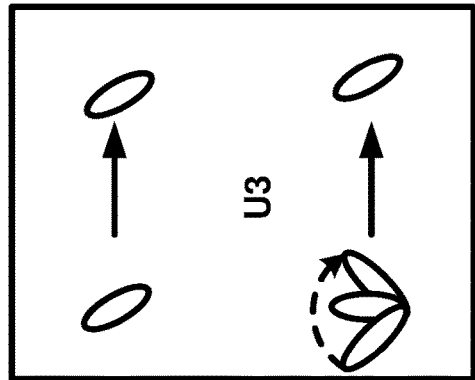
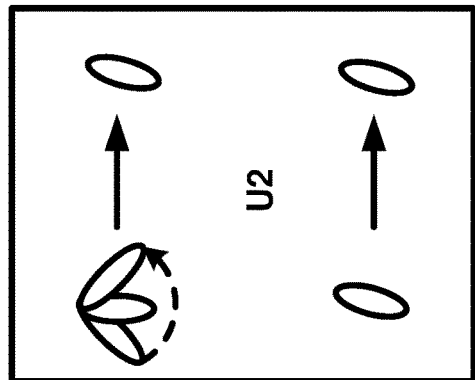
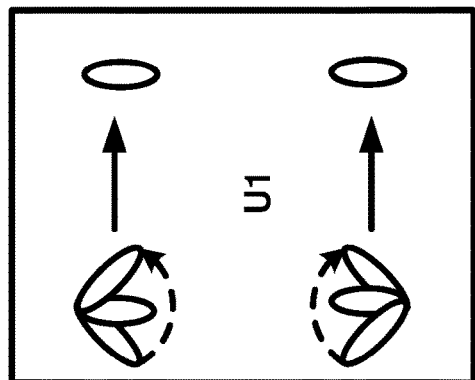
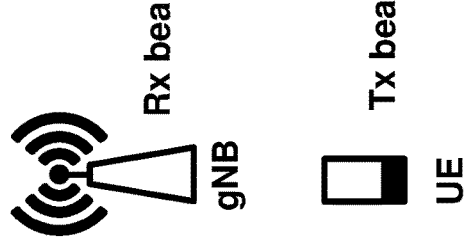
FIG. 12B

CROSS-CARRIER SCHEDULING FOR SIDELINK COMMUNICATIONS

CROSS-REFERENCE TO RELATED APPLICATIONS

This application is a continuation of International Application No. PCT/US2020/053146, filed Sep. 28, 2020, which claims the benefit of U.S. Provisional Application No. 62/906,990, filed Sep. 27, 2019, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 12A and FIG. 12B respectively illustrate examples of three downlink and uplink beam management procedures.

DETAILED DESCRIPTION

Figure 2A:
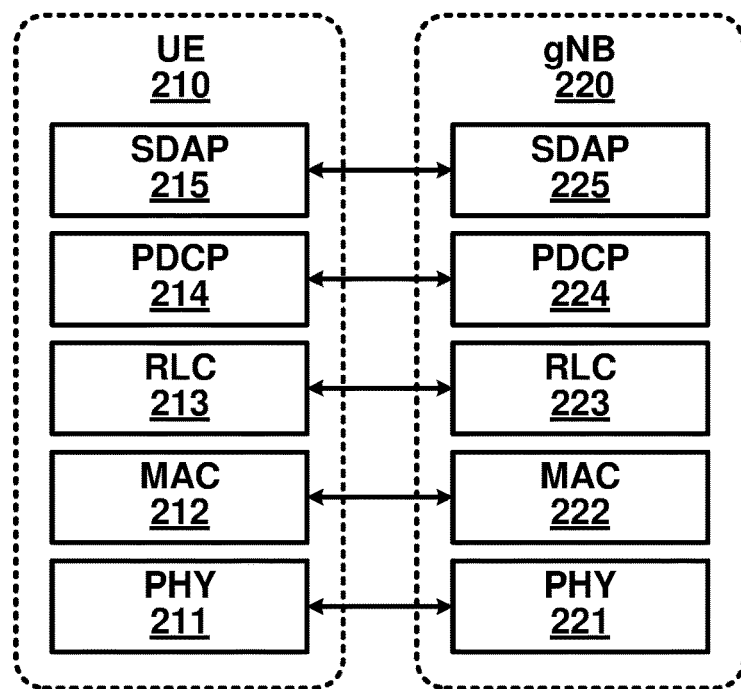
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
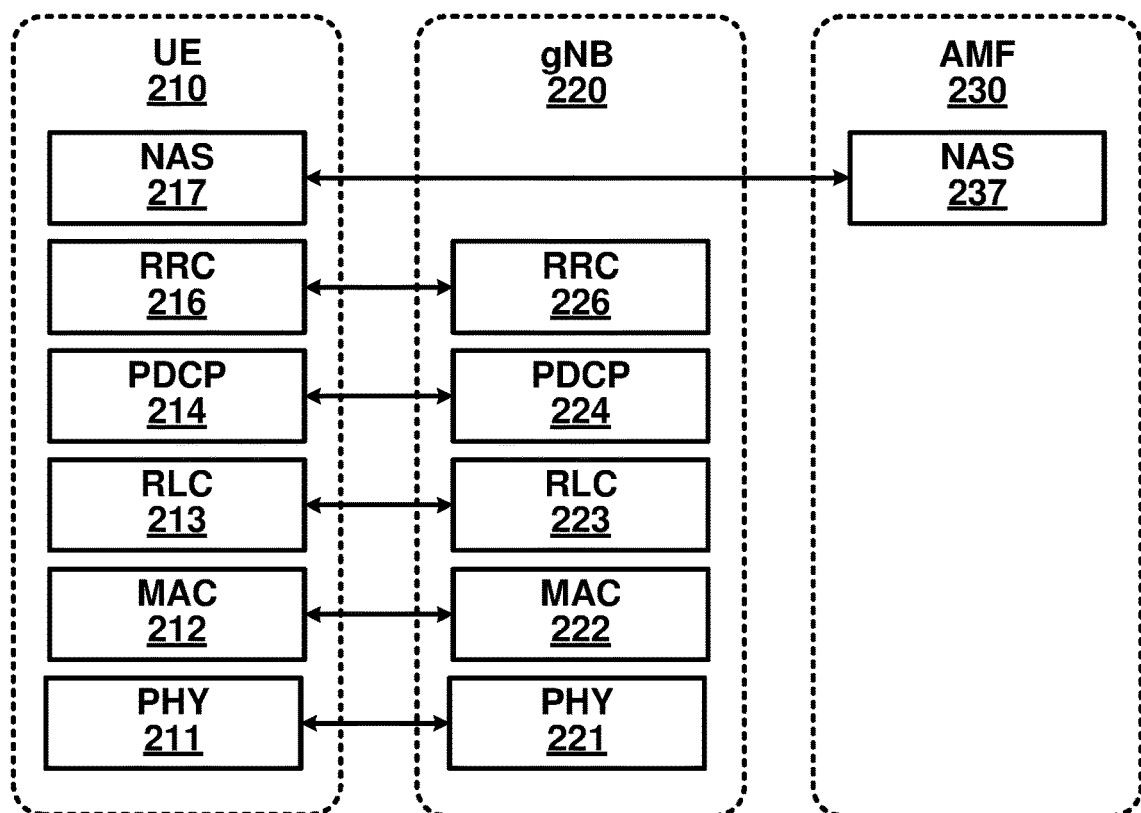

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
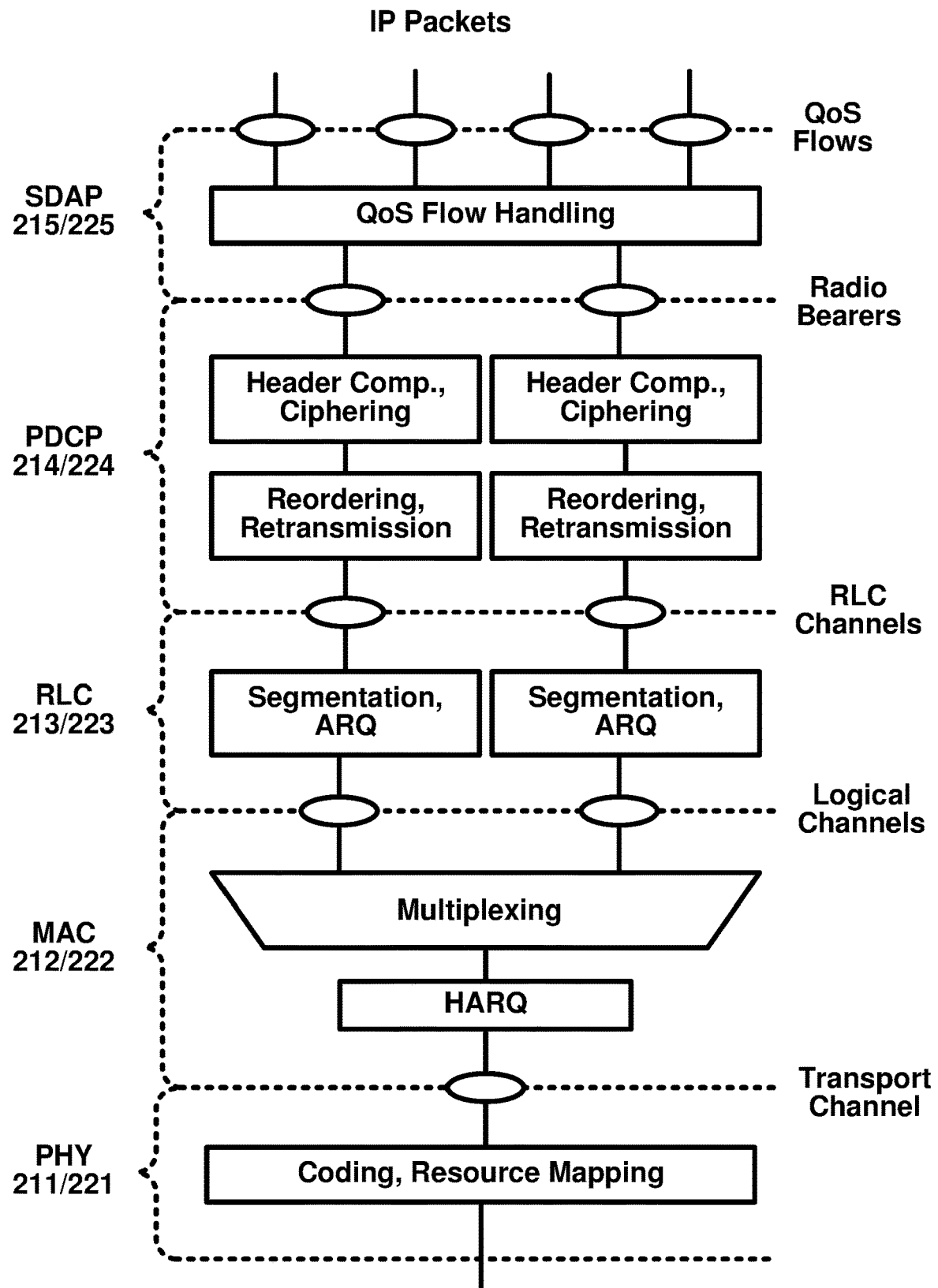
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
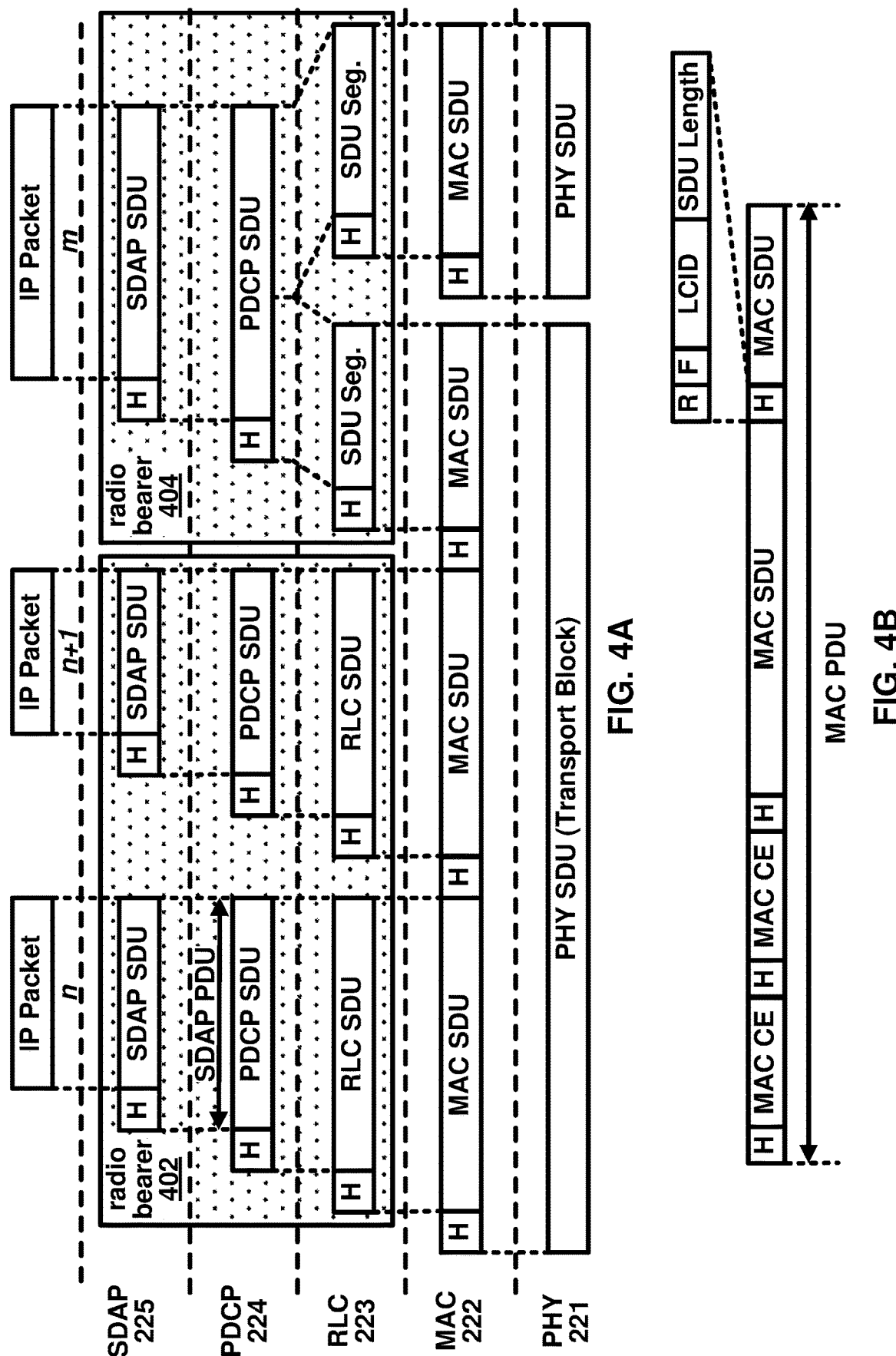
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
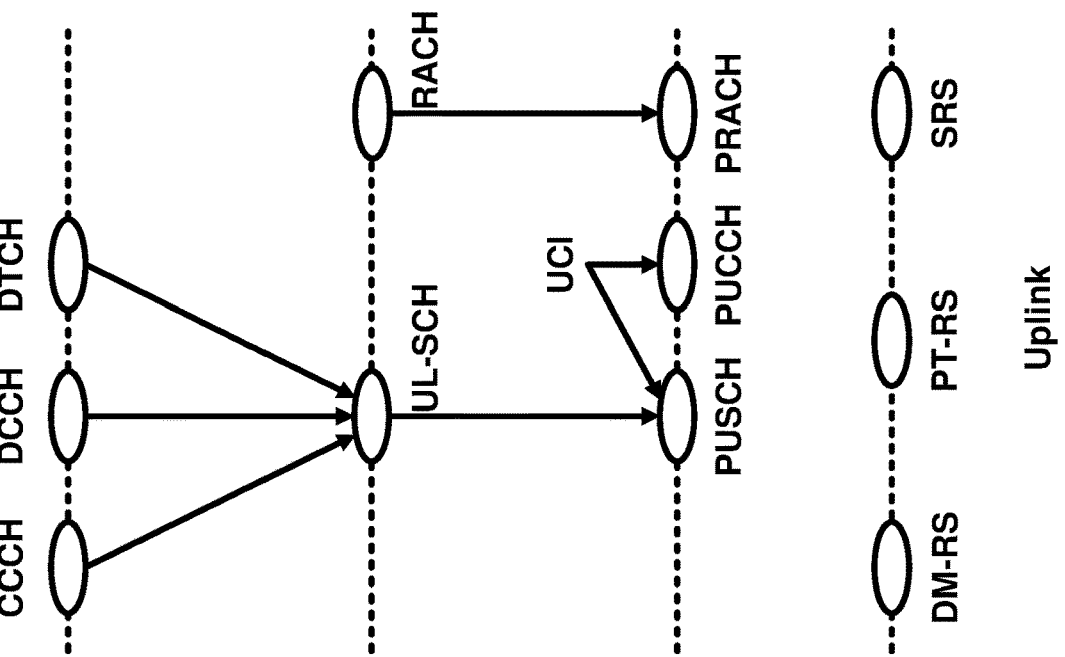
FIG. 5A and FIG. 5B respectively illustrate a mapping between logical channels, transport channels, and physical channels for the downlink and uplink.
Figure 5A:
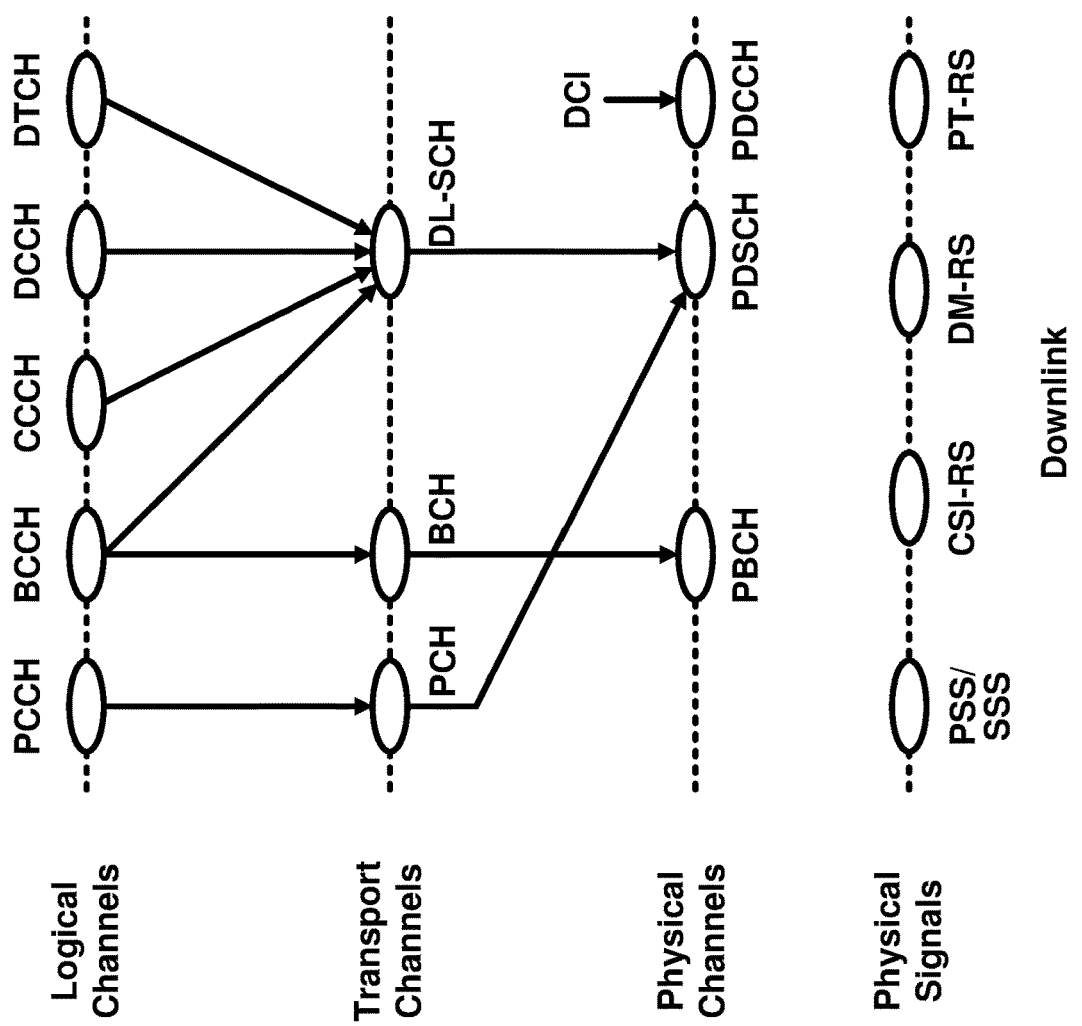

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

2.2 Control Plane Protocol Stack

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
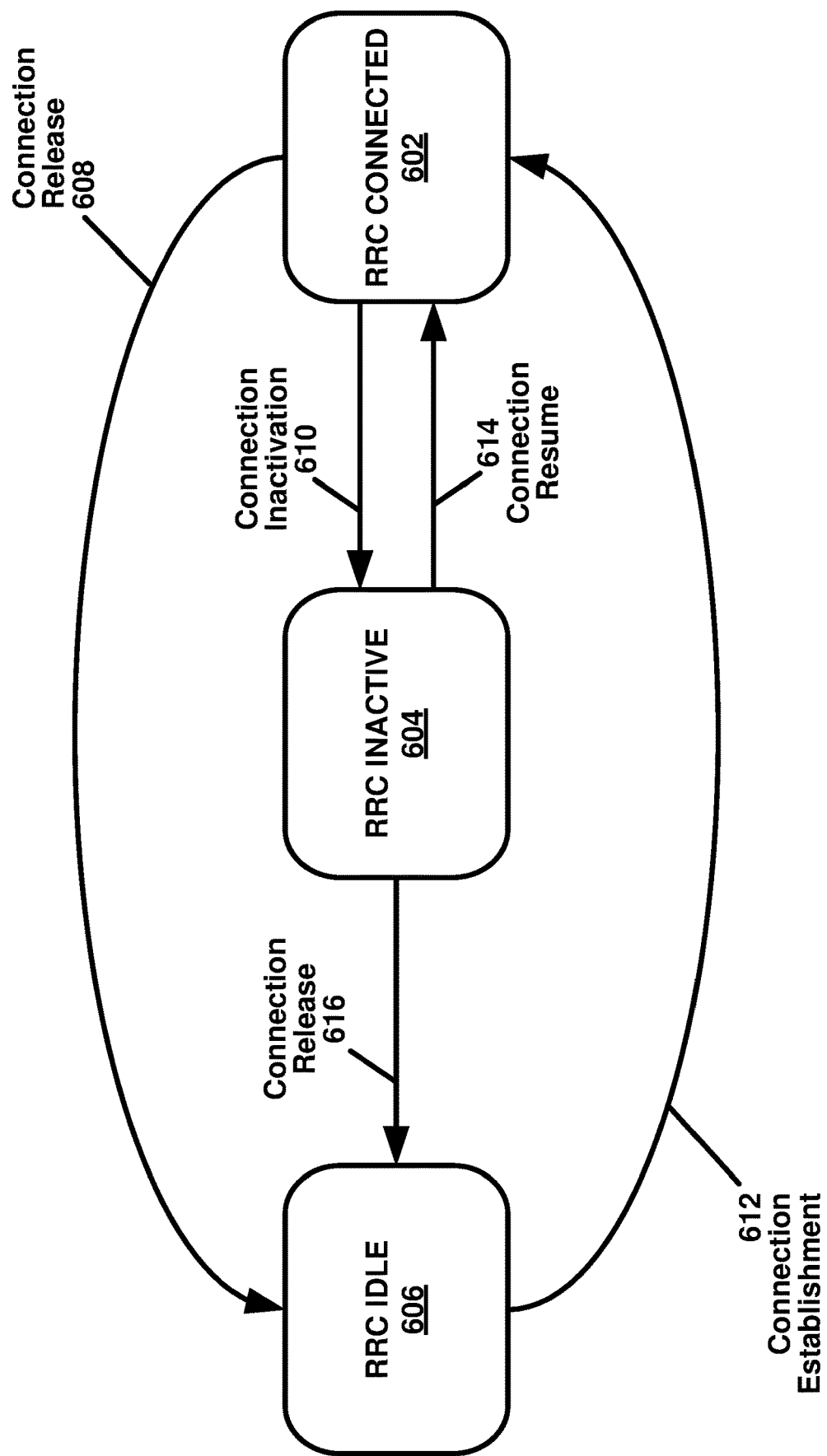
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
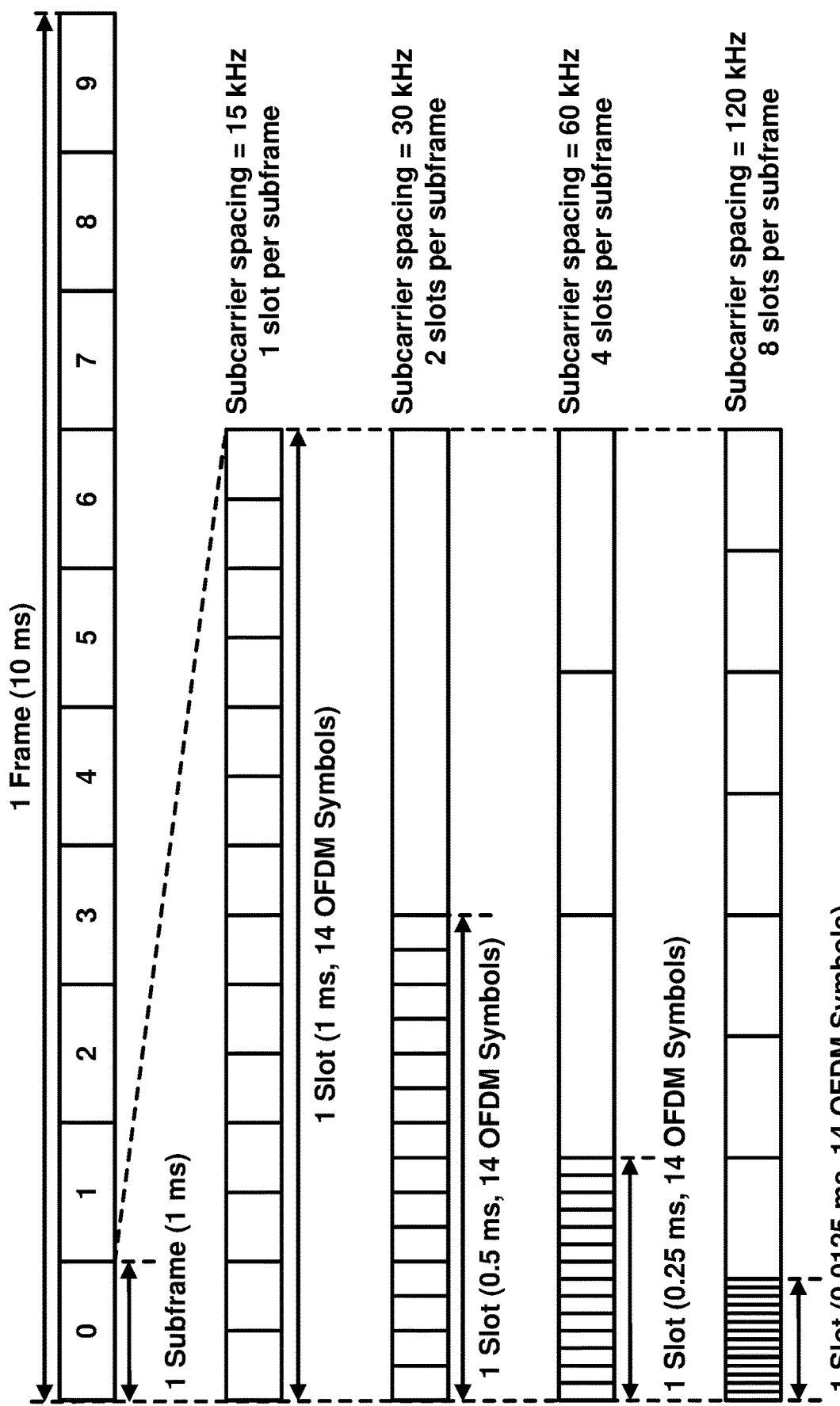
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
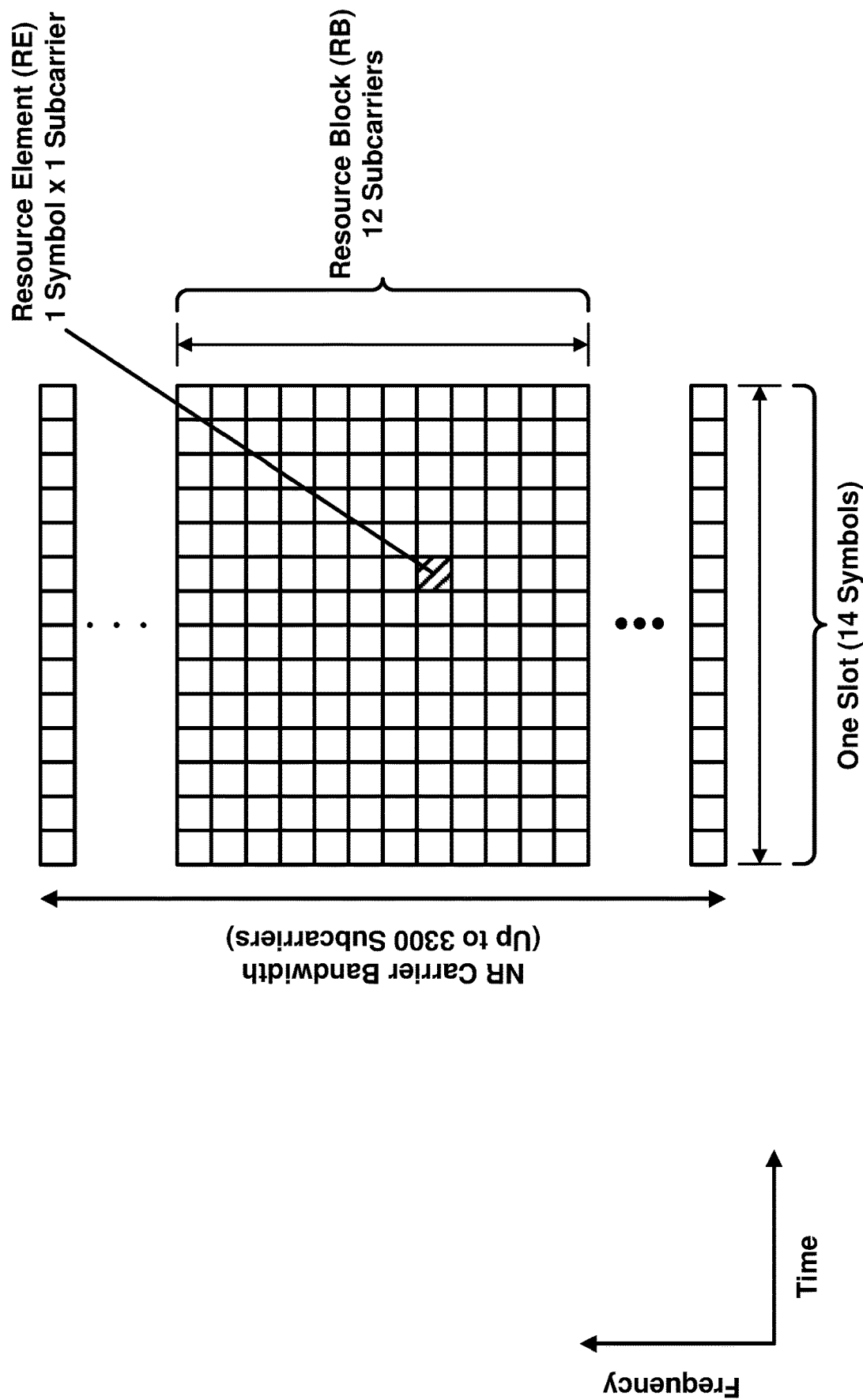
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
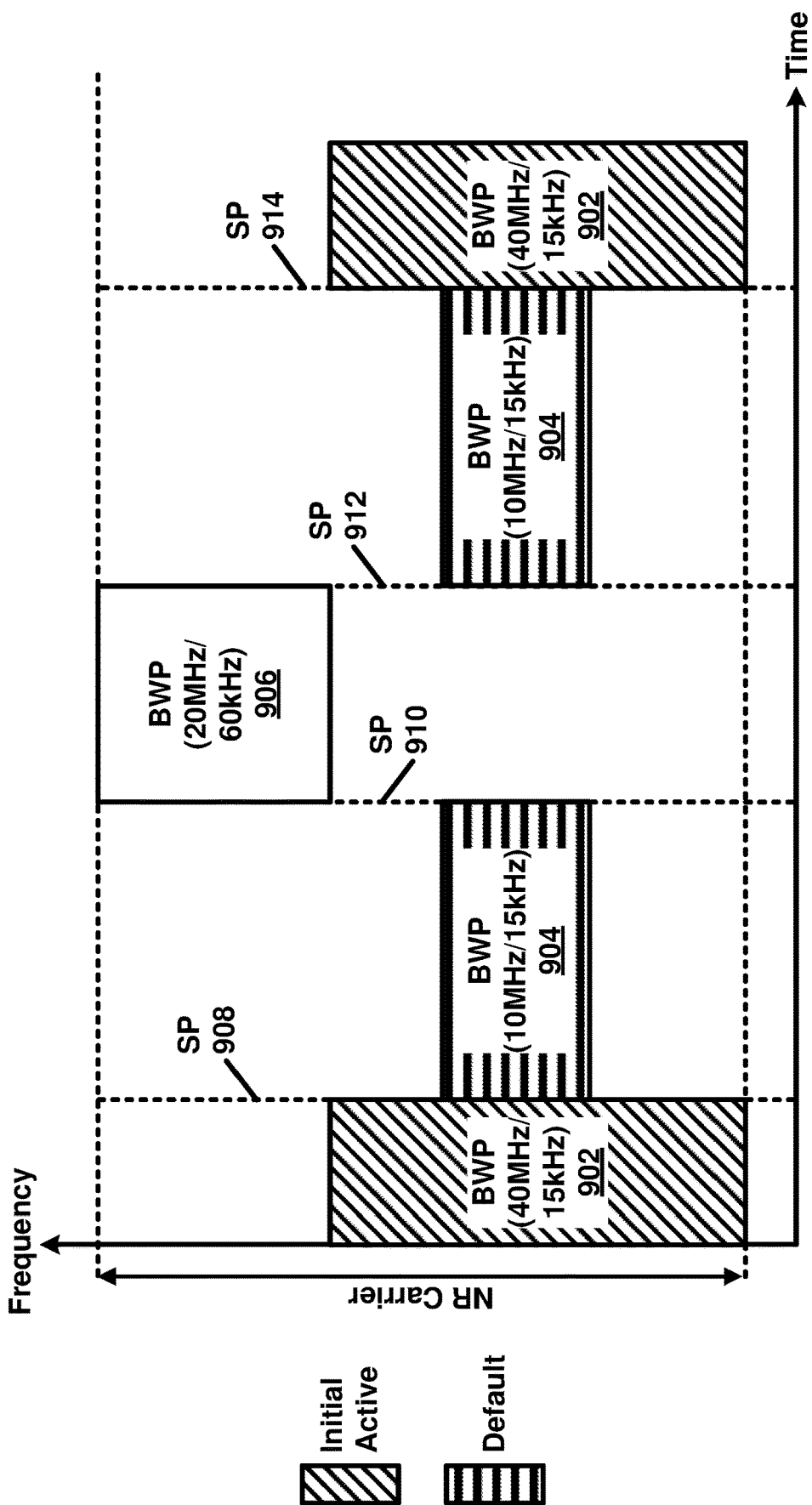
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
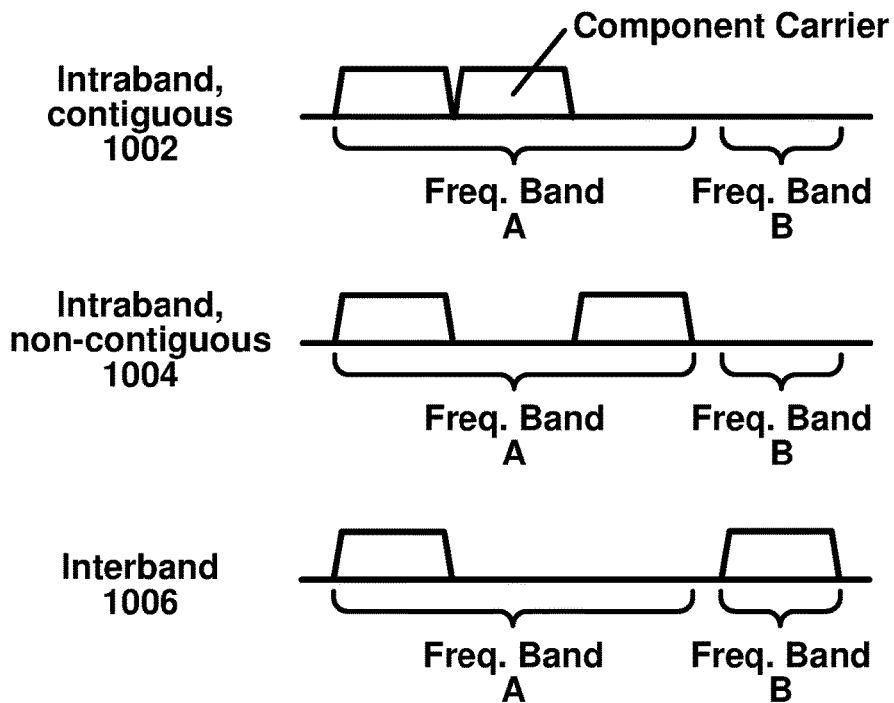
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
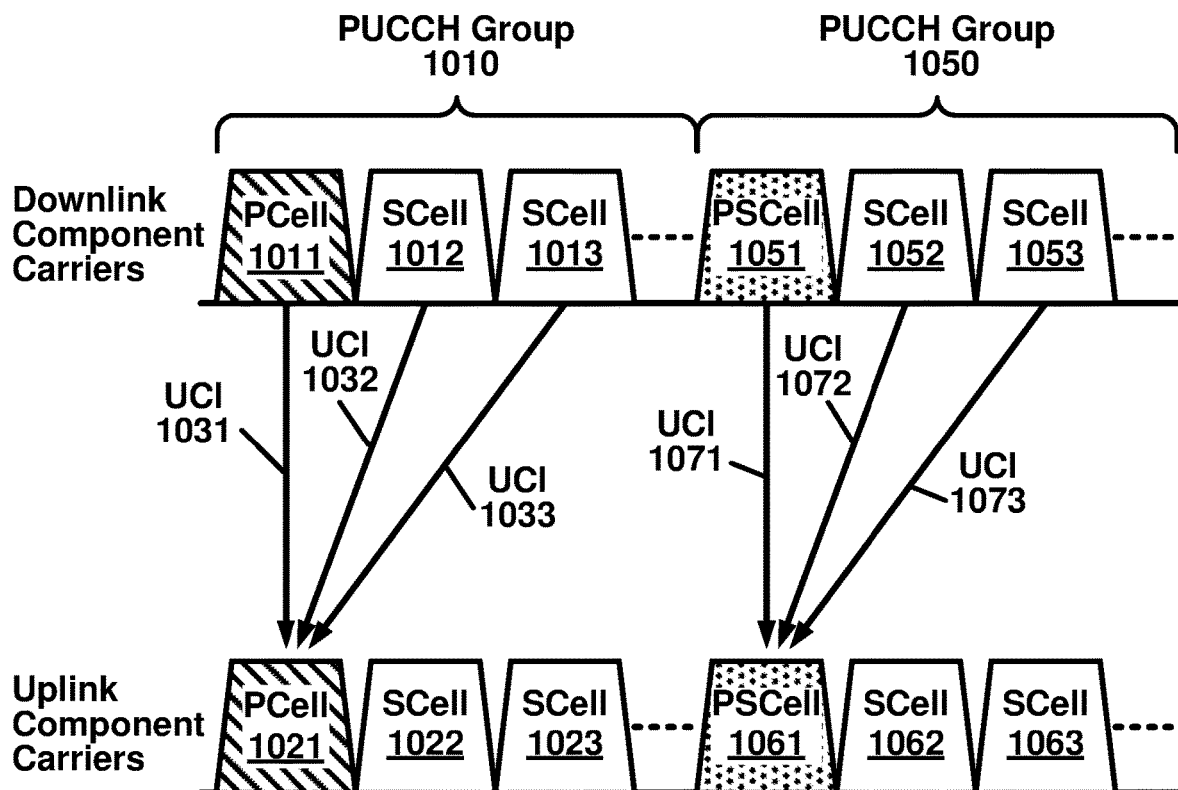
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a Pcell1011, an Scell1012, and an Scell1013. The PUCCH group 1050 includes three downlink CCs in the present example: a Pcell1051, an Scell1052, and an Scell1053. One or more uplink CCs may be configured as a Pcell1021, an Scell1022, and an Scell1023. One or more other uplink CCs may be configured as a primary Scell (PSCell) 1061, an Scell1062, and an Scell1063. Uplink control information (UCI) related to the downlink CCs of the PUCCH group 1010, shown as UCI 1031, UCI 1032, and UCI 1033, may be transmitted in the uplink of the Pcell1021. Uplink control information (UCI) related to the downlink CCs of the PUCCH group 1050, shown as UCI 1071, UCI 1072, and UCI 1073, may be transmitted in the uplink of the PScell1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the Pcell1021 and the PScell1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
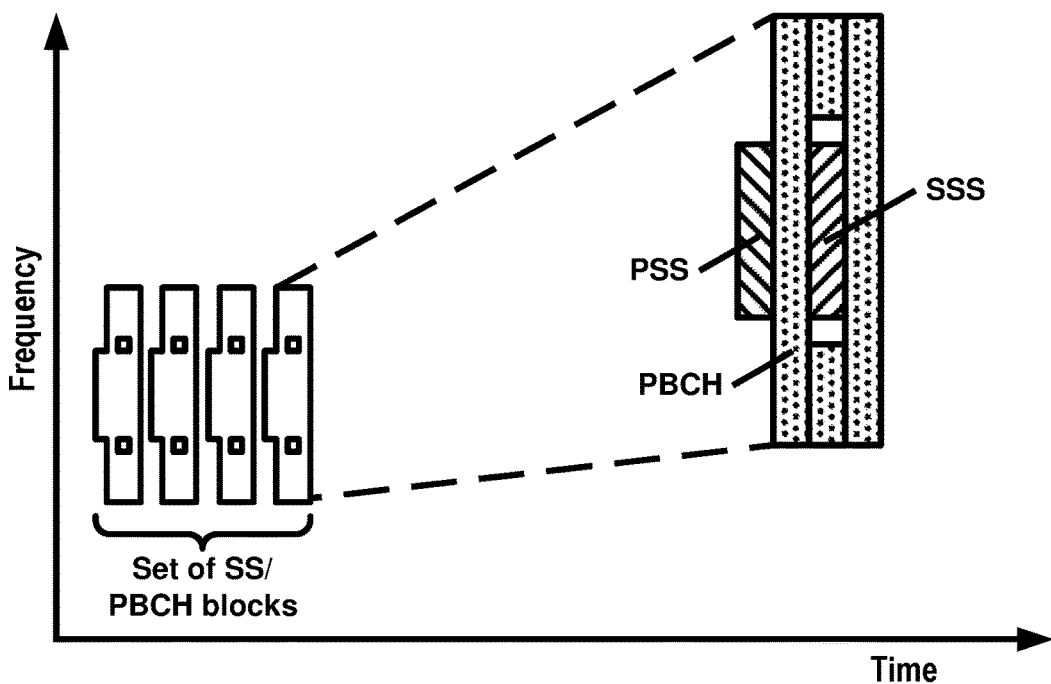
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
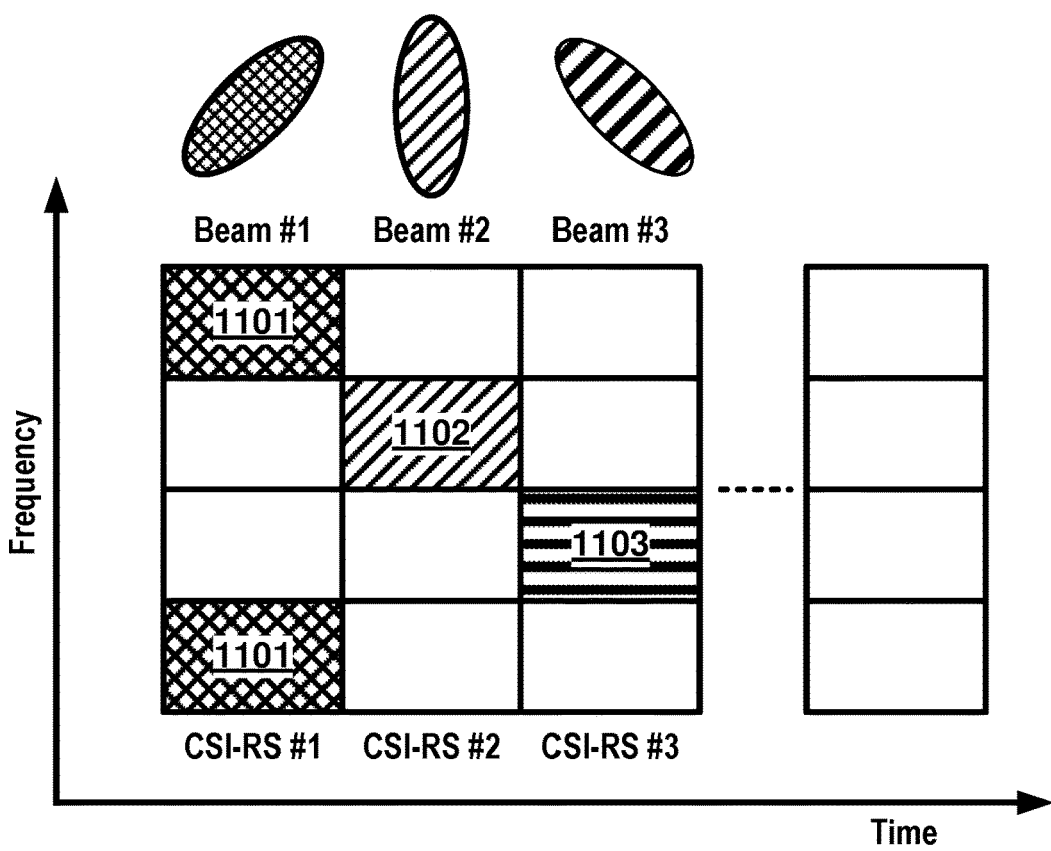
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
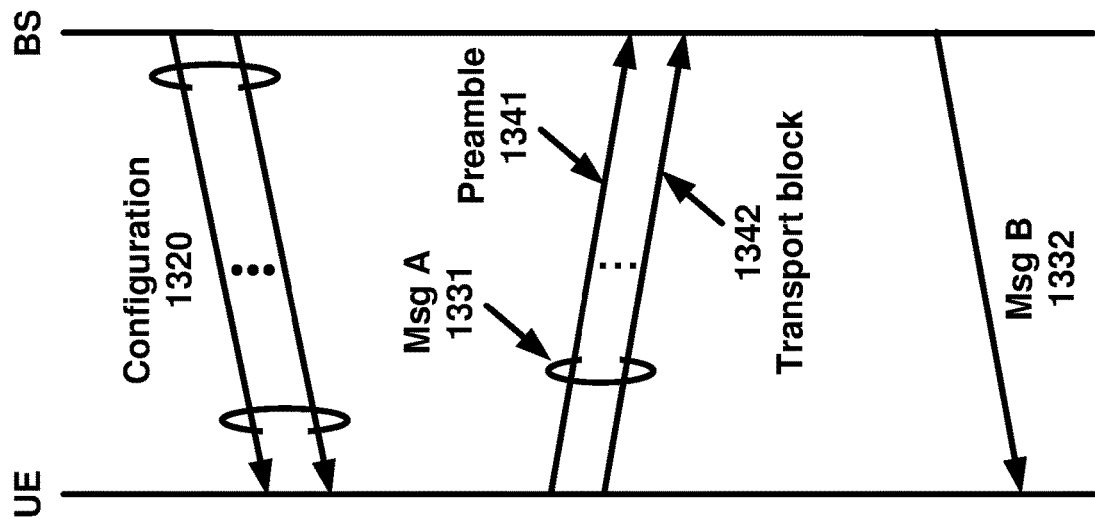
FIG. 13A, FIG. 13B, and FIG. 13C respectively illustrate a four-step contention-based random access procedure, a two-step contention-free random access procedure, and another two-step random access procedure.
Figure 13B:
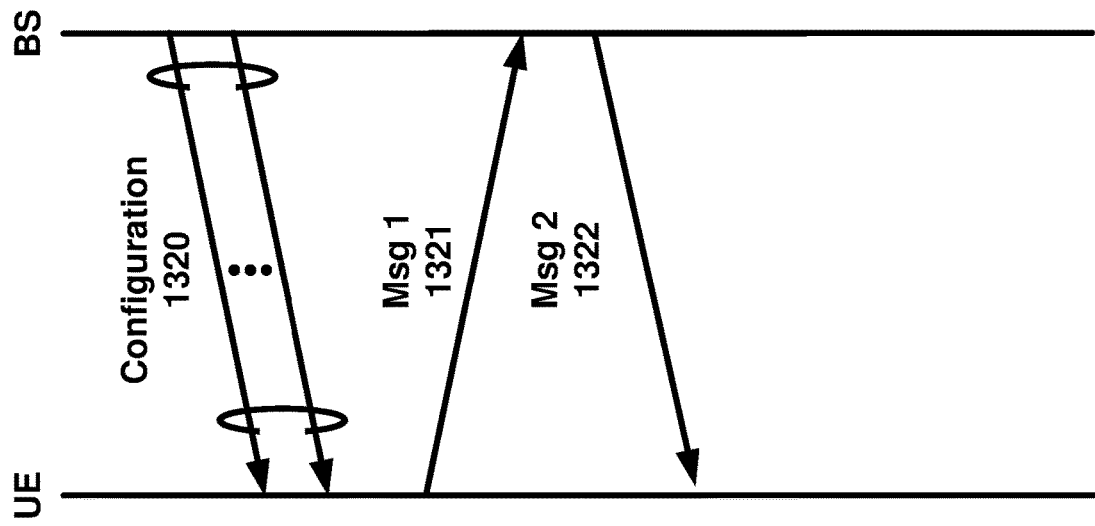
Figure 13A:
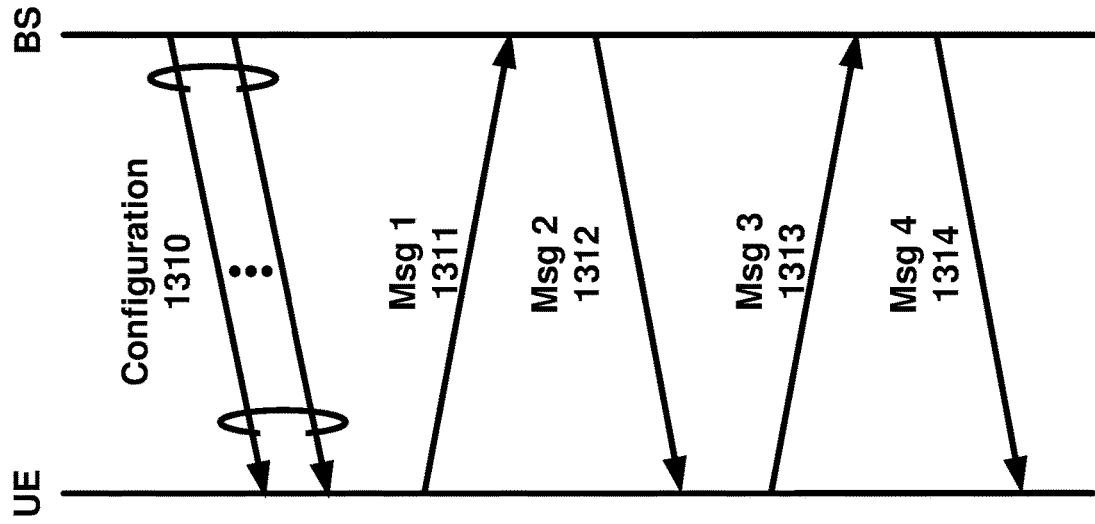

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs.

For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3

1313 and the Msg 4 1314) may be used to increase the likelihood that the UE does not incorrectly use an identity of another UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1320 may be transmitted in an uplink transmission by the UE. Msg A 1320 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1350 after or in response to transmitting the Msg A 1320. The Msg B 1350 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1350.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
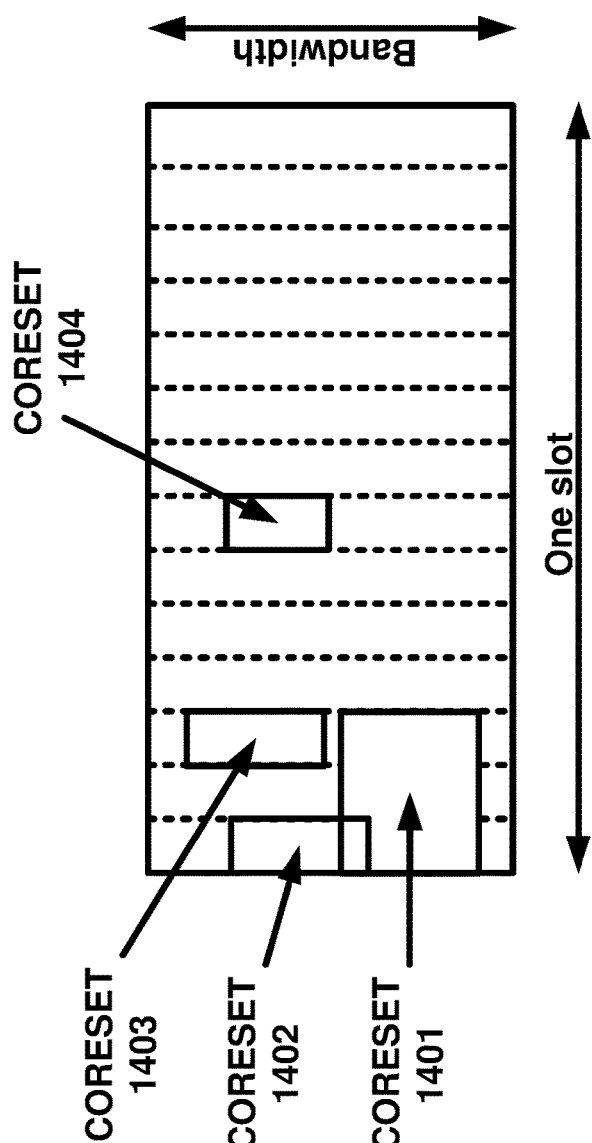
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
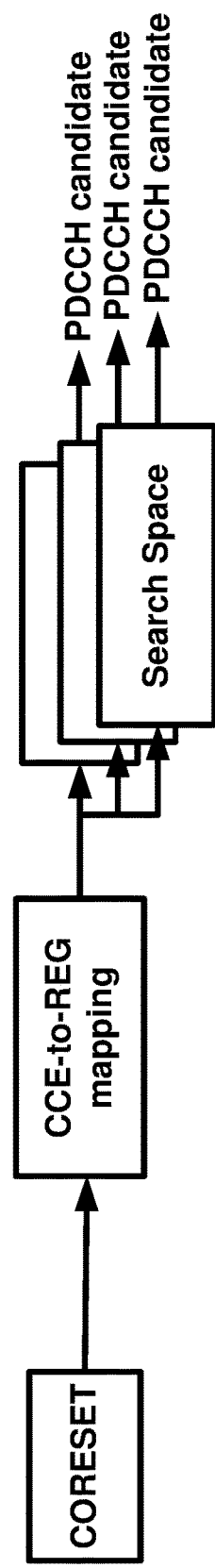
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
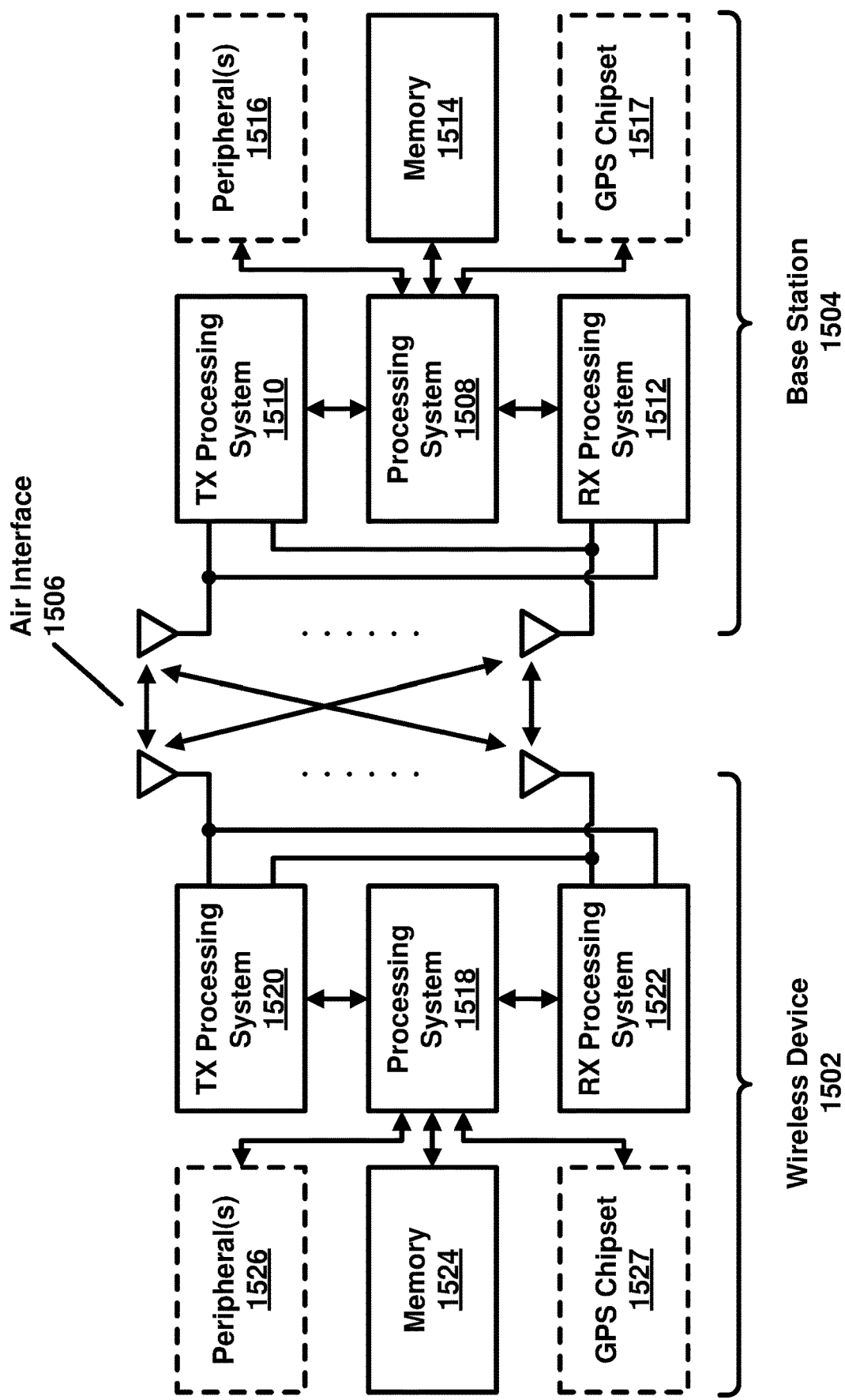
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset

1527 may be configured to provide geographic location information of the wireless device 1502 and the base station 1504, respectively.

Figure 16A:
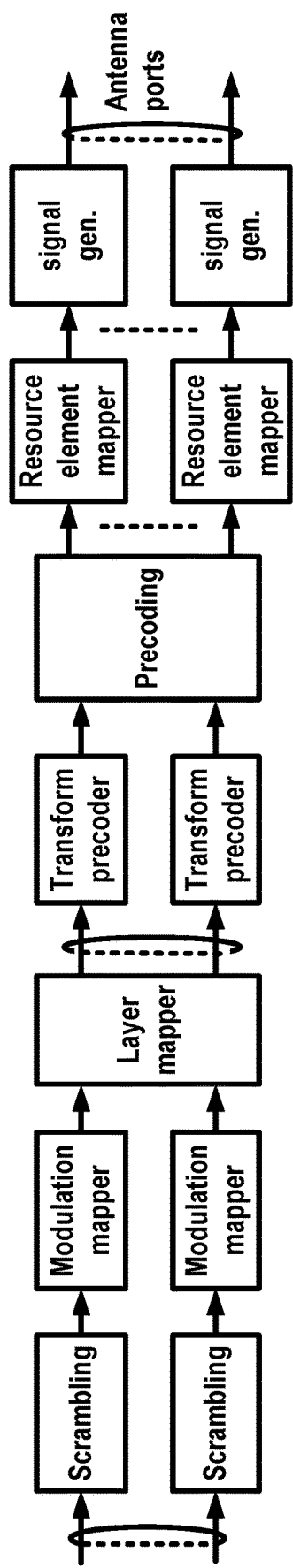
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16B:
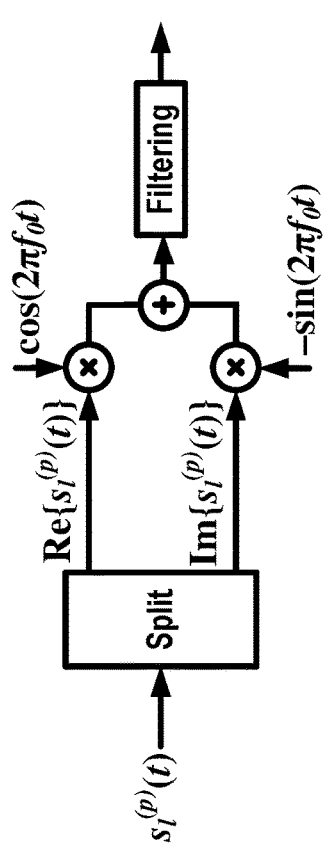

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16D:
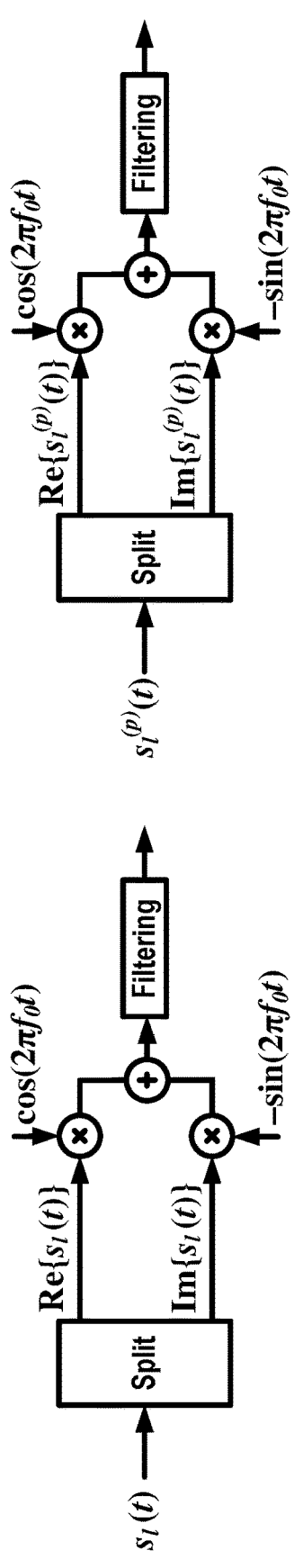
Figure 16C:
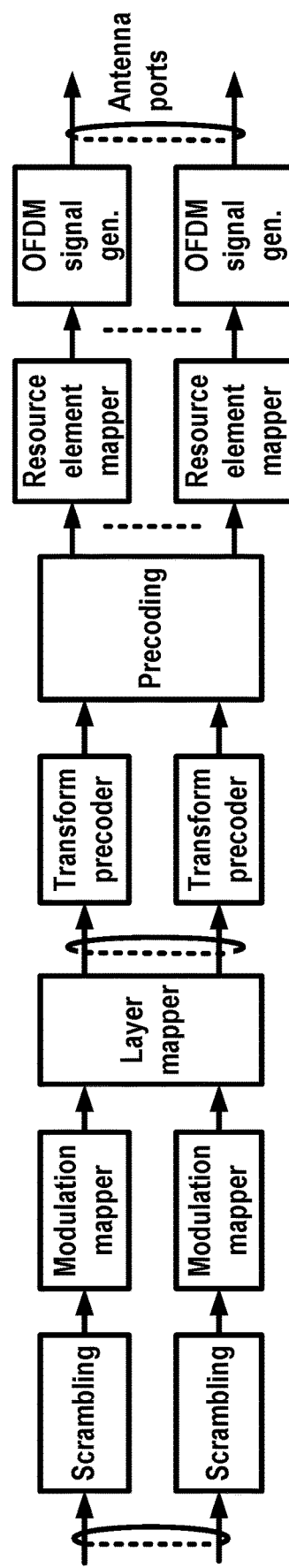

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
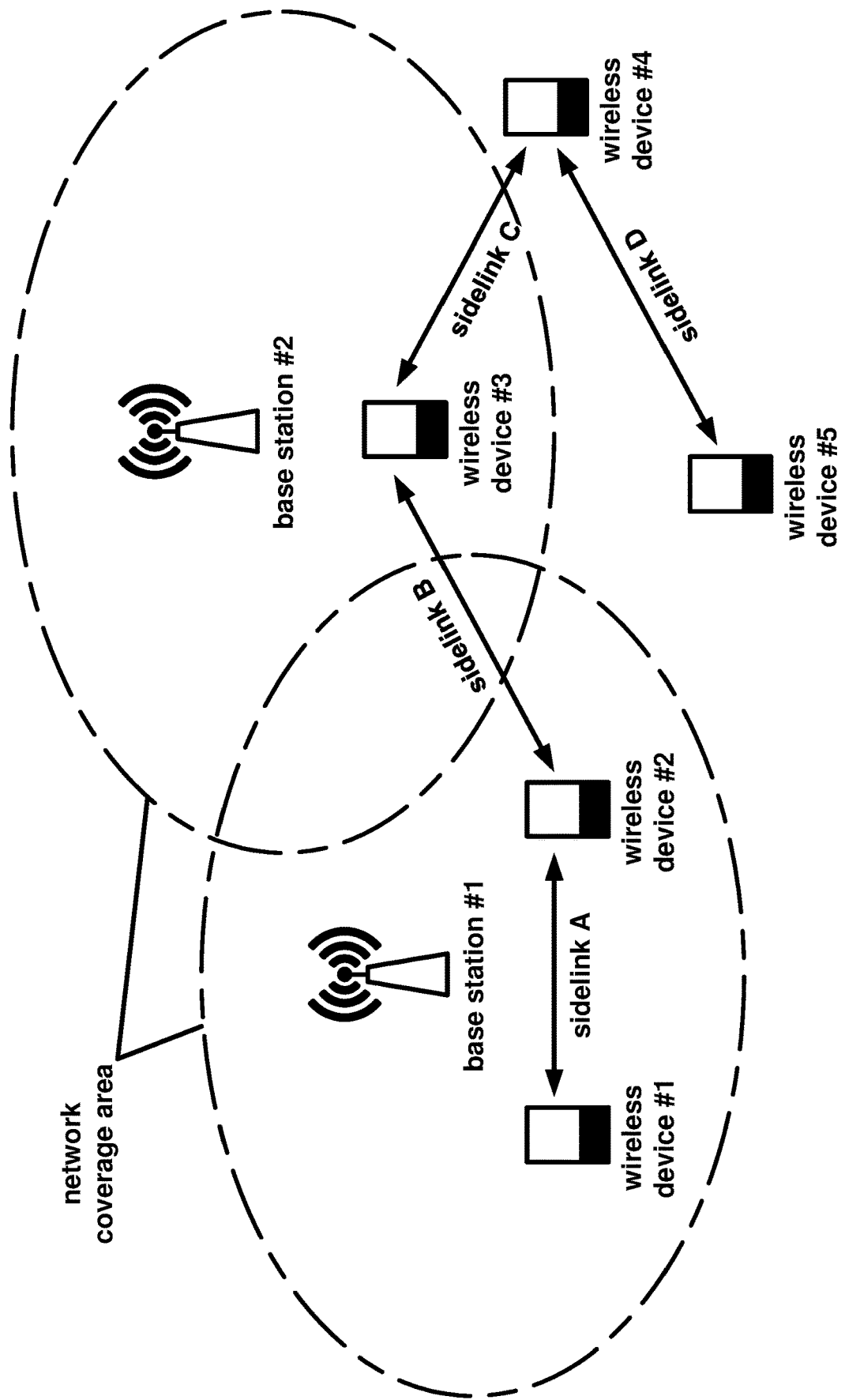
FIG. 17 is a diagram of example of a partial-coverage sidelink communication as per an aspect of an embodiment of the present disclosure.

FIG. 17 illustrates examples of device-to-device (D2D) communication, in which there is a direct communication between wireless devices. In an example, D2D communication may be performed via a sidelink (SL). The wireless devices may exchange sidelink communications via a sidelink interface (e.g., a PC5 interface). Sidelink differs from uplink (in which a wireless device communicates to a base station) and downlink (in which a base station communicates to a wireless device). A wireless device and a base station may exchange uplink and/or downlink communications via a user plane interface (e.g., a Uu interface).

As shown in the figure, wireless device #1 and wireless device #2 may be in a coverage area of base station #1. For example, both wireless device #1 and wireless device #2 may communicate with the base station #1 via a Uu interface. Wireless device #3 may be in a coverage area of base station #2. Base station #1 and base station #2 may share a network and may jointly provide a network coverage area. Wireless device #4 and wireless device #5 may be outside of the network coverage area.

In-coverage D2D communication may be performed when two wireless devices share a network coverage area. Wireless device #1 and wireless device #2 are both in the coverage area of base station #1. Accordingly, they may perform an in-coverage intra-cell D2D communication, labeled as sidelink A. Wireless device #2 and wireless device #3 are in the coverage areas of different base stations, but share the same network coverage area. Accordingly, they may perform an in-coverage inter-cell D2D communication, labeled as sidelink B. Partial-coverage D2D communications may be performed when one wireless device is within the network coverage area and the other wireless device is outside the network coverage area. Wireless device #3 and wireless device #4 may perform a partial-coverage D2D communication, labeled as sidelink C. Out-of-coverage D2D communications may be performed when both wireless devices are outside of the network coverage area. Wireless device #4 and wireless device #5 may perform an out-of-coverage D2D communication, labeled as sidelink D.

Sidelink communications may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. PSBCH may be similar in some respects to PBCH. The broadcast information may comprise, for example, a slot format indication, resource pool information, a sidelink system frame number, or any other suitable broadcast information. PSFCH may be used by a first wireless device to send feedback information to a second wireless device. The feedback information may comprise, for example, HARQ feedback information. PSDCH may be used by a first wireless device to send discovery information to a second wireless device. The discovery information may be used by a wireless device to signal its presence and/or the availability of services to other wireless devices in the area. PSCCH may be used by a first wireless device to send sidelink control information (SCI) to a second wireless device. PSCCH may be similar in some respects to PDCCH and/or PUCCH. The control information may comprise, for example, time/frequency resource allocation information (RB size, a number of retransmissions, etc.), demodulation related information (DMRS, MCS, RV, etc.), identifying information for a transmitting wireless device and/or a receiving wireless device, a process identifier (HARQ, etc.), or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. Each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and secondary sidelink synchronization signals (SSSS).

Sidelink resources may be configured to a wireless device in any suitable manner. A wireless device may be pre-configured for sidelink, for example, pre-configured with sidelink resource information. Additionally or alternatively, a network may broadcast system information relating to a resource pool for sidelink. Additionally or alternatively, a network may configure a particular wireless device with a dedicated sidelink configuration. The configuration may identify sidelink resources to be used for sidelink operation (e.g., configure a sidelink band combination).

The wireless device may operate in different modes, for example, an assisted mode (which may be referred to as mode 1) or an autonomous mode (which may be referred to as mode 2). Mode selection may be based on a coverage status of the wireless device, a radio resource control status of the wireless device, information and/or instructions from the network, and/or any other suitable factors. For example, if the wireless device is idle or inactive, or if the wireless device is outside of network coverage, the wireless device may select to operate in autonomous mode. For example, if the wireless device is in a connected mode (e.g., connected to a base station), the wireless device may select to operate (or be instructed by the base station to operate) in assisted mode. For example, the network (e.g., a base station) may instruct a connected wireless device to operate in a particular mode.

In an assisted mode, the wireless device may request scheduling from the network. For example, the wireless device may send a scheduling request to the network and the network may allocate sidelink resources to the wireless device. Assisted mode may be referred to as network-assisted mode, gNB-assisted mode, or base station-assisted mode. In an autonomous mode, the wireless device may select sidelink resources based on measurements within one or more resource pools (for example, pre-configure or network-assigned resource pools), sidelink resource selections made by other wireless devices, and/or sidelink resource usage of other wireless devices.

To select sidelink resources, a wireless device may observe a sensing window and a selection window. During the sensing window, the wireless device may observe SCI transmitted by other wireless devices using the sidelink resource pool. The SCIs may identify resources that may be used and/or reserved for sidelink transmissions. Based on the resources identified in the SCIs, the wireless device may select resources within the selection window (for example, resource that are different from the resources identified in the SCIs). The wireless device may transmit using the selected sidelink resources.

Figure 18:
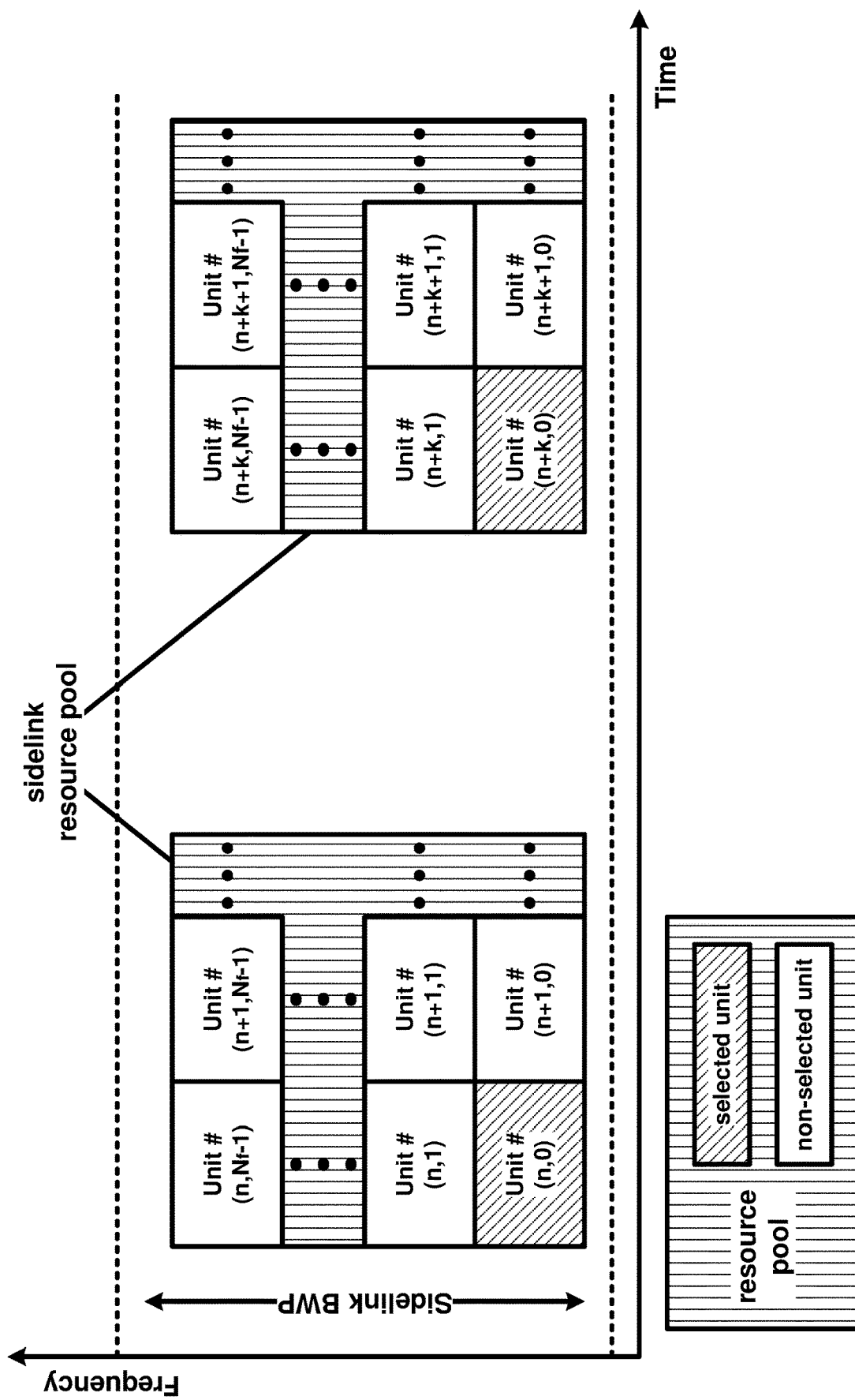
FIG. 18 is a diagram of example of an out-of-coverage sidelink communication as per an aspect of an embodiment of the present disclosure.

FIG. 18 illustrates an example of a resource pool for sidelink operations. A wireless device may operate using one or more sidelink cells. A sidelink cell may include one or more resource pools. Each resource pool may be configured to operate in accordance with a particular mode (for example, assisted or autonomous). The resource pool may be divided into resource units. In the frequency domain, each resource unit may comprise, for example, one or more resource blocks which may be referred to as a sub-channel. In the time domain, each resource unit may comprise, for example, one or more slots, one or more subframes, and/or one or more OFDM symbols. The resource pool may be continuous or non-continuous in the frequency domain and/or the time domain (for example, comprising contiguous resource units or non-contiguous resource units). The resource pool may be divided into repeating resource pool portions. The resource pool may be shared among one or more wireless devices. Each wireless device may attempt to transmit using different resource units, for example, to avoid collisions.

Sidelink resource pools may be arranged in any suitable manner. In the figure, the example resource pool is non-contiguous in the time domain and confined to a single sidelink BWP. In the example resource pool, frequency resources are divided into a Nf resource units per unit of time, numbered from zero to Nf−1. The example resource pool may comprise a plurality of portions (non-contiguous in this example) that repeat every k units of time. In the figure, time resources are numbered as n, n+1 . . . n+k, n+k+1 . . . , etc.

A wireless device may select for transmission one or more resource units from the resource pool. In the example resource pool, the wireless device selects resource unit (n,0) for sidelink transmission. The wireless device may further select periodic resource units in later portions of the resource pool, for example, resource unit (n+k,0), resource unit (n+2k,0), resource unit (n+3k,0), etc. The selection may be based on, for example, a determination that a transmission using resource unit (n,0) will not (or is not likely) to collide with a sidelink transmission of a wireless device that shares the sidelink resource pool. The determination may be based on, for example, behavior of other wireless devices that share the resource pool. For example, if no sidelink transmissions are detected in resource unit (n−k,0), then the wireless device may select resource unit (n,0), resource (n+k,0), etc. For example, if a sidelink transmission from another wireless device is detected in resource unit (n−k,1), then the wireless device may avoid selection of resource unit (n,1), resource (n+k,1), etc.

Different sidelink physical channels may use different resource pools. For example, PSCCH may use a first resource pool and PSSCH may use a second resource pool. Different resource priorities may be associated with different resource pools. For example, data associated with a first QoS, service, priority, and/or other characteristic may use a first resource pool and data associated with a second QoS, service, priority, and/or other characteristic may use a second resource pool. For example, a network (e.g., a base station) may configure a priority level for each resource pool, a service to be supported for each resource pool, etc. For example, a network (e.g., a base station) may configure a first resource pool for use by unicast UEs, a second resource pool for use by groupcast UEs, etc. For example, a network (e.g., a base station) may configure a first resource pool for transmission of sidelink data, a second resource pool for transmission of discovery messages, etc.

In an example, a wireless device may operate a sidelink operation via a first cell (e.g., a sidelink carrier may be associated with the first cell, or a sidelink BWP may be associated with the first cell). A base station may transmit configuration parameters indicating a second cell and a third cell to the wireless device. The base station may transmit one or more activation commands to activate the second cell and the third cell. The configuration parameters may comprise/indicate a mode 1 sidelink operation. Based on the mode 1 sidelink operation, the base station may assist the sidelink operation by scheduling one or more sidelink resources via one or more sidelink DCIs (SL DCIs). With the mode 1 sidelink operation, the wireless device may monitor the one or more sidelink (SL) DCIs comprising/indicating sidelink resources for sidelink transmissions. The wireless device may transmit the sidelink transmissions based on the sidelink resources to one or more second wireless devices. When the wireless device is configured with a plurality of cells, existing technologies may not allow a flexible indication of a cell of the plurality of cells as a scheduling cell for the mode 1 sidelink operation. For example, in existing technologies, the base station and the wireless device may determine a primary cell of the plurality of cells as the scheduling cell. For example, in existing technologies, the base station may transmit one or more RRC messages indicating a change of the primary cell and may reconfigure one or more search spaces for sidelink DCIs for the mode 1 sidelink operation. With a predetermined/fixed scheduling cell for the mode 1 sidelink operation, when a quality of the scheduling cell becomes poor due to beam failure, link failure, congestion, and/or the like, the wireless device may not be able to receive the one or more SL DCIs on the indicated cell for the first cell. The performance of the mode 1 sidelink operation may be degraded based on the quality of the scheduling cell. In existing technologies, the base station may reconfigure one or more search spaces and/or a cell to schedule SL DCIs when a current SL scheduling cell becomes unavailable. The reconfiguration may generally require a large latency (e.g., 20 msec) to become effective. During the reconfiguration, a mode 1 sidelink operation may be interrupted. A sidelink operation requiring a high quality of service (e.g., factory operation, remote driving, and/or the like), the interruption may lead a failure of meeting the required QoS.

In an example, a base station may transmit on more RRC messages indicating a first search space of a first cell for scheduling resource of a sidelink carrier/BWP and a second search space of a second cell for scheduling resources of the sidelink carrier/BWP. The one or more RRC messages may indicate a plurality of search spaces of a plurality of scheduling cells for the sidelink carrier/BWP for a mode 1 sidelink operation. The wireless device may monitor, for receiving one or more sidelink DCIs, the first search space and the second search space. For example, the wireless device may monitor the first search space and the second search space during a time duration. For example, the time duration is a slot, a few slots or a frame. For example, the second search space may overlap with the first search space in time domain. A second monitoring occasion of the second search space may overlap with a first monitoring occasion of the first search space in a time duration (e.g., a slot, a few slots, a frame). The wireless device may receive, based on the monitoring, the one or more sidelink DCIs scheduling a sidelink resource of the sidelink carrier/BWP. For example, the wireless device may receive a first DCI via the first search space, where the first DCI may schedule the sidelink resource. The wireless device may receive a second DCI via the second search, where the second DCI may schedule the sidelink resource. For example, the base station may indicate a cell between the first cell and the second cell for the one or more sidelink DCIs via one or more DCIs, one or more MAC CEs and/or one or more second RRC messages. The wireless device may monitor the one or more sidelink DCIs via a search space of the cell (e.g., the first search space when the cell is the first cell, the second search space when the cell is the second cell). Based on the one or more sidelink DCIs, the wireless device may transmit a sidelink transmission to a second wireless device. Embodiments may allow an efficient mode 1 sidelink operation by allowing scheduling a sidelink DCI via a cell, of a plurality of scheduling cells, with a good quality. Embodiments may reduce an interruption time of the mode 1 sidelink operation due to a poor signal quality of a scheduling cell for the mode 1 sidelink operation.

In an example, the base station may transmit one or more RRC messages comprising configuration parameters. The configuration parameters may comprise a plurality of cells where a wireless device may monitor one or more sidelink DCIs, based on a mode 1 sidelink operation, comprising resource assignments for sidelink transmissions on a sidelink carrier/BWP/cell. The wireless device may monitor one or more cells for a sidelink DCI comprising a resource assignment for a sidelink cell. The base station may further indicate a single cell among the plurality of cells dynamically via MAC CEs and/or DCIs. The base station may select a first cell from the plurality of cells to schedule a first sidelink DCI at a first time. The base station may select a second cell from the plurality of cells to schedule a second sidelink DCI at a second time. The wireless device may monitor both the first cell and the second cell for a potential sidelink DCI in such a case. The base station may transmit a first sidelink DCI via a first cell from the plurality of cells, wherein the first sidelink DCI comprising a resource assignment for a sidelink transmission. The base station may transmit a second sidelink DCI via a second cell from the plurality of cells, wherein the second sidelink DCI comprising the resource assignment for the sidelink transmission. In response to receiving one sidelink DCI from both the first sidelink DCI and the second sidelink DCI, the wireless device may perform the sidelink transmission as scheduled. In response to receiving both the first sidelink DCI and the second sidelink DCI, the wireless device may apply either sidelink DCI or both sidelink DCIs.

Figure 19:
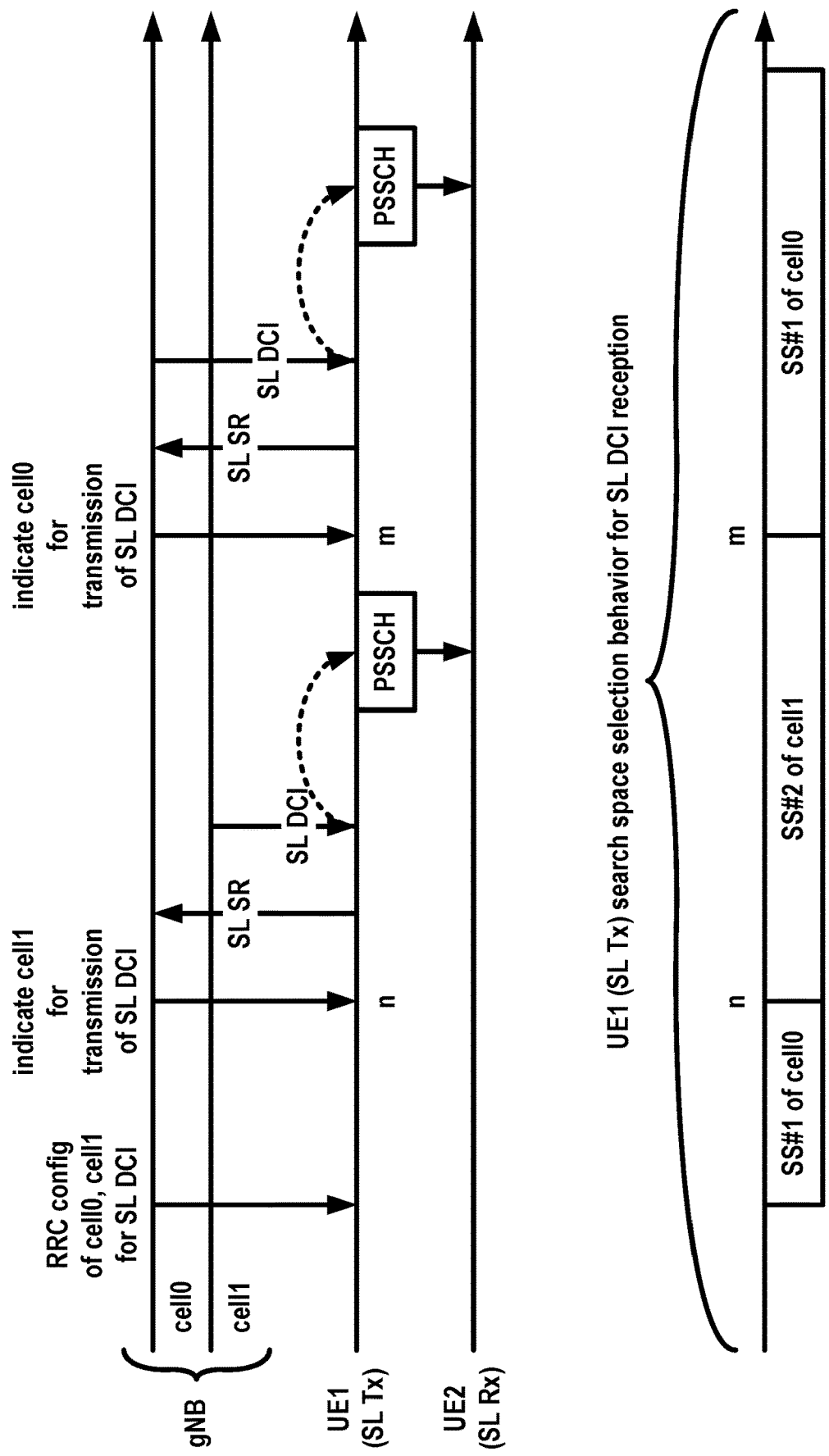
FIG. 19 illustrates an example signal flow diagram as per an aspect of an example embodiment of the present disclosure.

FIG. 19 illustrates an example signal flow diagram as per an aspect of an example embodiment of the present disclosure. A base station (gNB) may transmit one or more RRC messages comprising/indicating configuration parameters. The configuration parameters may comprise/indicate a first cell (cell0) and a second cell (cell1) to a first wireless device (Tx UE). The configuration parameters may comprise/indicate a mode 1 sidelink operation (e.g., a gNB-assisted sidelink operation) to the first wireless device. The first wireless device may receive one or more sidelink DCIs, wherein a sidelink DCI may comprise one or more resource assignments for a sidelink BWP/carrier/cell for one or more sidelink transmissions. The sidelink DCI may indicate/comprise resource assignments for initial and/or retransmissions of a transport block transmission for the one or more sidelink transmissions. The sidelink DCI may comprise a resource assignment for either initial or retransmission of the transport block transmission for a sidelink transmission. The configuration parameters may comprise/indicate the first cell and the second cell for scheduling cells where the base station may transmit one or more sidelink DCIs, via the first cell and/or the second cell, for the sidelink operation of the first wireless device.

Based on the first wireless device receives a plurality of cells or receives one or more RRC messages indicating a plurality of search spaces across a plurality of cells (e.g., a first search space associated with the first cell and a second search space associated with the second cell for SL DCIs), the first wireless device may assume a default behavior. The default behavior may be applied a time duration when the wireless device may receive the configuration parameters to indicate, by the base station, other option(s). The default behavior may be applied when the configuration parameters may not indicate an option to follow for the plurality of search spaces. The default behavior may be one or more of followings. For example of the default behavior, the first wireless device may assume that a lowest (or a highest or a pre-fixed) cell indexed cell among the plurality of cells is used/activated for scheduling SL DCIs. The first wireless device may monitor one or more search spaces of the lowest (or a highest or a pre-fixed) cell indexed cell for SL DCIs for the sidelink cell. The base station may configure one or more first search spaces across one or more first cells for a first sidelink cell. The base station may configure one or more second search spaces across one or more second cells for a second sidelink cell. The base station may explicitly indicate a cell index among the plurality of cells to monitor for SL DCIs. As shown in FIG. 19, the base station may transmit a command to indicate that the second cell (cell1) is used for SL DCIs at a time n. The first wireless device may start monitoring one or more search spaces associated with the second cell in response to receiving the command. For example, the wireless device may monitor SS #2 configured with a current active BWP of the second cell (BWP2) for SL DCIs since the time n.

The first wireless device may trigger a sidelink SR when new data becomes available for a sidelink operation. The base station may transmit a first sidelink DCI via cell1. The first wireless device may transmit a first PSSCH based on the first sidelink DCI to a second wireless device (Rx UE). The base station may change the sidelink cell at a time m. There may be multiple cases when the base station may initiate changing the scheduling cell for sidelink DCIs. For example, when the current scheduling cell becomes a poor quality (e.g., a beam failure), the base station may switch to another cell to minimize interruption of the sidelink operation. For example, when the current scheduling cell is deactivated (e.g., there is no uplink or downlink via the current scheduling cell), the base station may switch a cell of SL DCIs to another active cell. For example, when the current scheduling cell is congested (e.g., load on the current scheduling cell is high), then the base station may not be able to schedule SL DCIs for the first wireless device. The base station may switch a scheduling cell for SL DCIs to balance the loads among cells.

The first wireless device may select cell0 for monitoring as indicated by the base station at the time m. Similar to the previous operation, the first wireless device may transmit an SL SR. The base station may transmit a second SL DCI via cell0 after switching to cell0 for SL DCI scheduling. The wireless device may monitor SS #1 of cell0, where a current active BWP of cell0 is BWP1 and the SS #1 is associated with CORESET1. Embodiments allow a base station to dynamically switch a scheduling cell for a sidelink wireless device in assisting a sidelink operation without requiring considerable UE complexity increases. In an example, embodiments may allow a first base station and a second base station when a wireless device is associated with a plurality of cell groups to effectively switch a scheduling base station between two. For example, a first cell may be associated with the first base station. A second cell may be associated with the second base station. For example, the second base station may schedule SL DCIs for the wireless device when SL resources may be based on a same RAT as to the second base station. When the wireless device may need larger coverage (e.g., due to high mobility), the first base station may schedule SL DCIs to provide a better coverage via inter-RAT sidelink scheduling functionalities.

In an example, a base station may configure a plurality of search spaces across a plurality of cells for scheduling sidelink DCIs comprising resource assignments for a sidelink cell or for a sidelink resource pool or for a sidelink BWP. For example, the base station may select the plurality of cells from a plurality of active downlink cells configured to a first wireless device. For example, the base station may select the plurality of cells from a plurality of configured cells to the first wireless device. When the first wireless device may receive one or more parameters of a first search space associated with a deactivated SCell, the first wireless device may assume that the SCell is activated. The wireless device may activate the SCell and may start monitoring sidelink DCIs via the first search space. Alternatively, the first wireless device may not monitor the first search space that is associated with the deactivated SCell. When the base station configures/indicates a single cell to the first wireless device as a serving cell (e.g., the single cell is a primary cell), the single cell may be used as a sidelink scheduling cell with or without explicit indication from the base station. In response to receiving more than one search spaces across more than one cells, the first wireless device may monitor the more than one search spaces for SL DCIs comprising resource assignments for a sidelink cell/carrier/BWP. For example, the first wireless device may simultaneously monitor each of the more than one search spaces.

The base station may transmit one or more RRC messages indicating/comprising configuration parameters. The configuration parameters may comprise first search spaces for a first sidelink cell/carrier/BWP. The configuration parameters may comprise second search spaces for a second sidelink cell/carrier/BWP when the first wireless device may support more than one sidelink cells/carriers/BWPs.

Figure 20:
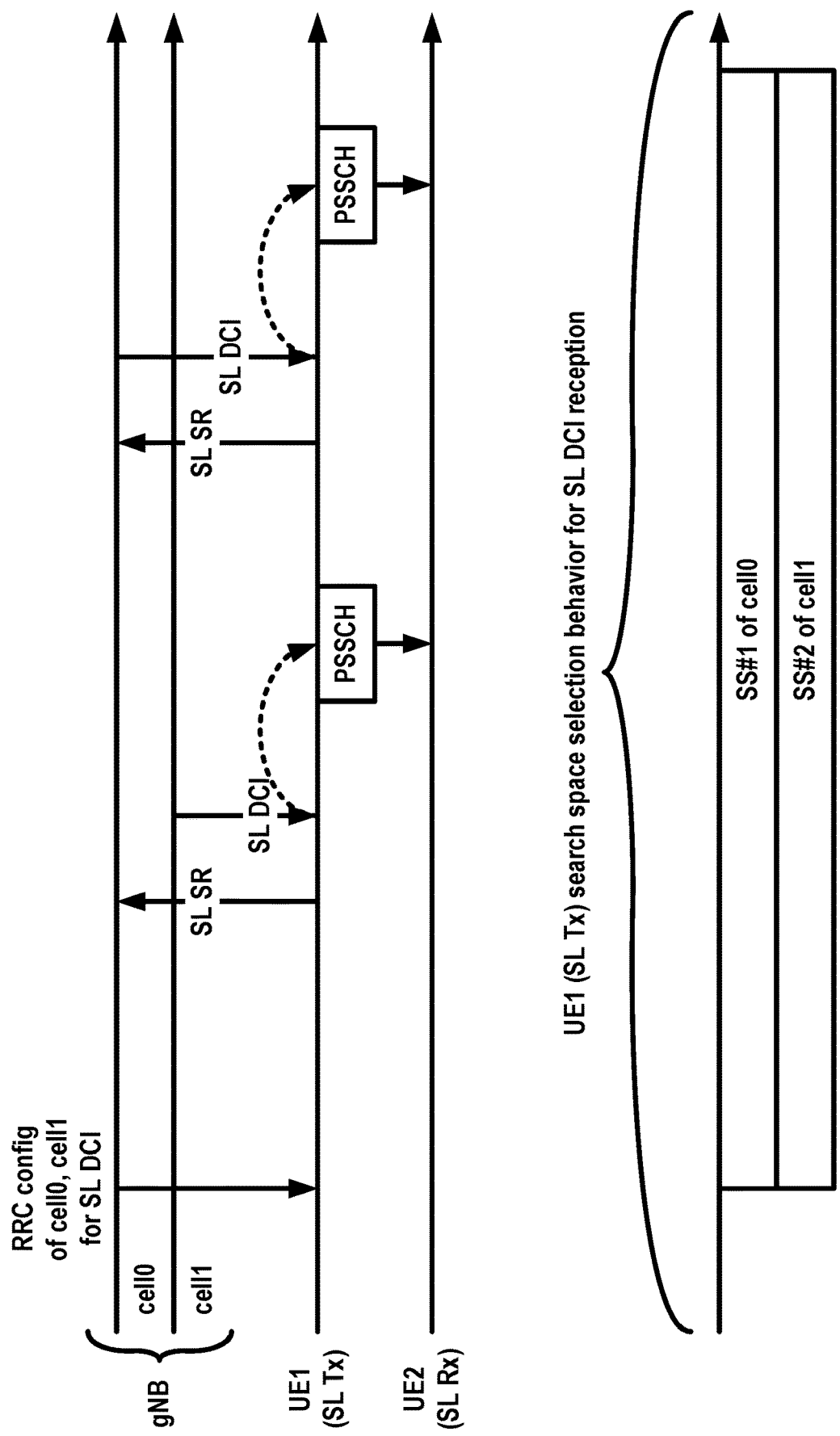
FIG. 20 illustrates an example signal flow diagram as per an aspect of an example embodiment of the present disclosure.
Figure 21:
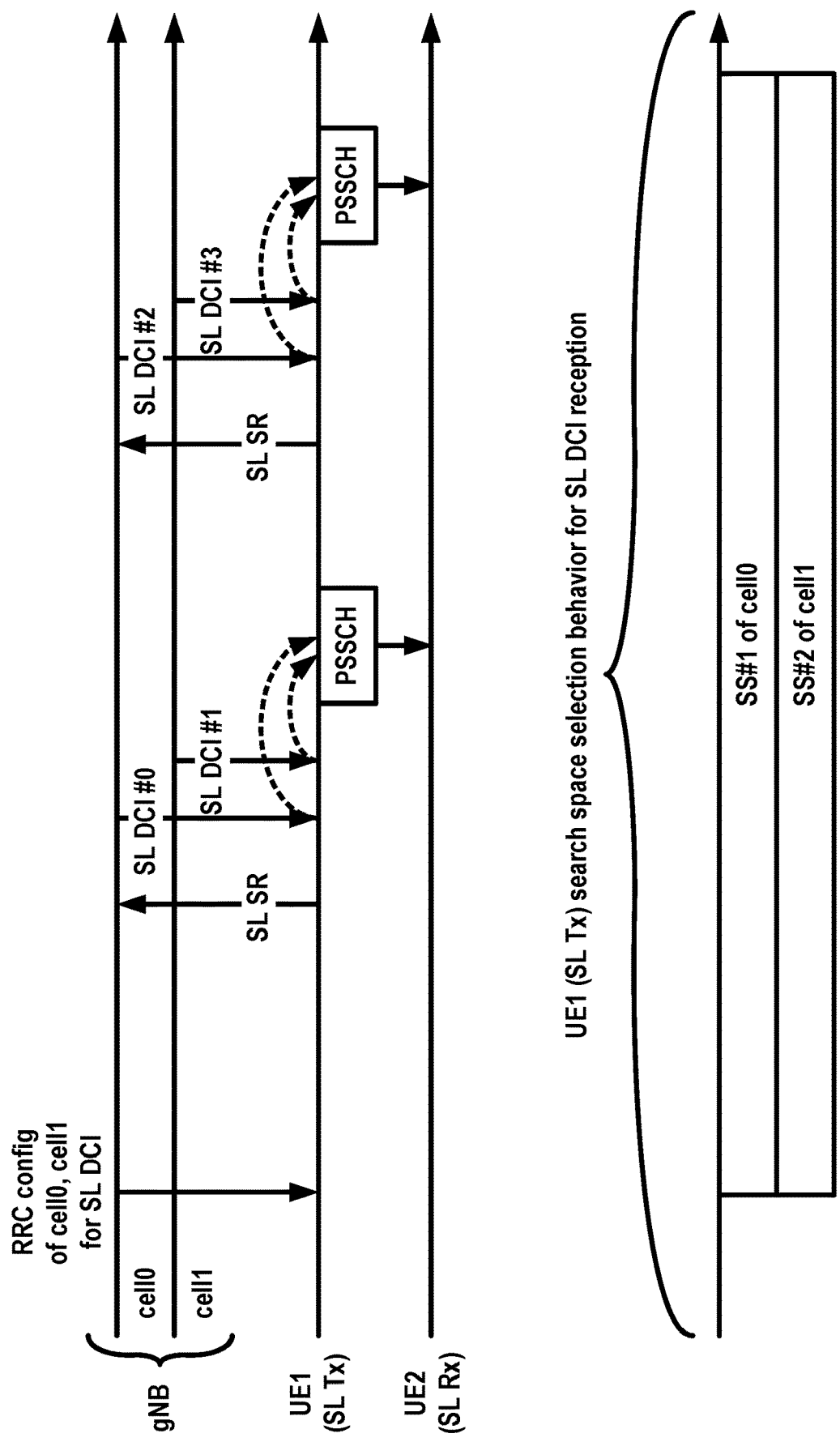
FIG. 21 illustrates an example signal flow diagram of an embodiment as per an aspect of an example embodiment of the present disclosure.

FIG. 20 illustrates an example signal flow diagram as per an aspect of an example embodiment of the present disclosure. A base station may transmit one or more RRC messages comprising configuration parameters. The configuration parameters may comprise/indicate a first search space (SS #1) associated with a first cell (ccell0) and a second search space (SS #2) associated with a second cell (cell1) for SL DCIs for a sidelink cell/carrier/BWP. A first wireless device (UE1) may operate a sidelink operation on one or more resource pools of the sidelink cell/carrier/BWP, wherein SL DCIs may allocate resource allocations on the resource pools of the sidelink cell/carrier/BWP. The first wireless device may monitor the SS #1 via the cell0 and SS #2 via cell1. The base station may transmit a SL DCI via the first search space of the first cell or the second search space of the second cell. For example, the base station may select a cell and a search space to transmit a SL DCI at the time of transmission. For example, FIG. 21 illustrates that the base station transmits a first SL DCI via cell1. The base station transmits a second SL DCI via cell0. The first wireless device may monitor the first search space via the first cell and the second search space via the second cell for the sidelink cell. In response to receiving the first sidelink DCI at the time n, the first wireless device may transmit one or more sidelink transmissions (e.g., PSSCH) based on the first sidelink DCI. In response to receiving the second sidelink DCI at the time n, the first wireless device may transmit one or more sidelink transmissions (e.g., PSSCH) based on the second sidelink DCI.

FIG. 21 illustrates an example signal flow diagram as per an aspect of an example embodiment of the present disclosure. In an embodiment, a base station may transmit one or more RRC messages comprising/indicating configuration parameters. The configuration parameters may comprise/indicate a plurality of cells for scheduling SL DCIs for a sidelink cell. The base station may transmit one or more redundant SL DCIs across the plurality of cells. The one or more redundant SL DCIs may indicate a same set of resource assignments on the sidelink cell. The example of FIG. 21 compared to the example of FIG. 20 is different in terms of a SL DCI transmission. For example, the base station wants to schedule a sidelink resource for a time n. The base station may transmit a first SL DCI from cell0 (SL DCI #0) and a second SL DCI from cell1 (SL DCI #1) to schedule the sidelink resource for the time n. Similarly, for scheduling a resource in a time m, the base station may transmit a third SL DCI (SL DCI #2) and a fourth SL DCI (SL DCI #3) to schedule a second sidelink resource. When a first wireless device (Tx UE) successfully receives one SL DCI from the first SL DCI and the second SL DCI, the first wireless device may apply the one SL DCI to determine the sidelink resource. When the first wireless device successfully both the first SL DCI and the second SL DCI, the wireless device may assume that both sidelink DCIs indicate a same set of sidelink resources or the sidelink resource. For example, the first SL DCI is received at a slot n and the second SL DCI is received at a slot n+1, both SL DCIs may schedule a same set of sidelink resources for one or more sidelink transmissions or both SL DCIs may schedule the sidelink resource for a sidelink transmission. A first offset between the first SL DCI to a first resource (or the sidelink resource) may be K. A second offset between the second SL DCI to a second resource (or the sidelink resource) may be K−1. For example, a slot is used for an offset value. When the wireless device may receive a plurality of SL DCIs in a short time window (e.g., SL DCIs received within a same slot) having different sidelink resources, the wireless device may assume that different SL DCIs are transmitted. The wireless device may not expect to receive a plurality of SL DCIs with a same HARQ process ID or a same ID for a SL communication link in a short receiving window indicating different sidelink resources. For example, a ID for the sidelink communication link may be determined based on a pair of {a source TX UE ID, a destination TX UE ID}. The destination TX UE ID may be a group ID in case of groupcast or a broadcast group ID in case of broadcast transmission. The destination TX UE ID may be another UE ID or a UE's C-RNTI in case of unicast transmission. This mechanism may enhance a reliability of a SL DCI via a redundant transmission from more than one search spaces and/or more than one frequency.

In an example, a base station may transmit one or more RRC messages comprising/indicating configuration parameters. The configuration parameters may comprise/indicate a plurality of search spaces for a SL DCI even when a wireless is configured/activated with a single cell in a cell group. A first base station and/or a second base station may configure a plurality of search spaces for a SL DCI across a plurality of cell groups. A wireless device may receive one or more SL DCIs indicating a same set of SL resources (e.g., an activation of a configured grant sidelink resource) via the plurality of search spaces.

Similar behaviors may be applied to the third SL and the fourth SL DCI. It is noted that a wireless device may be configured with more than two search spaces across a plurality of cells where the wireless device may receive up to the configured number of search spaces for a same SL resource indication. A procedure of two search spaces may be extended to more than two SL search spaces without the loss of generality. As the base station may transmit one or more SL DCIs for a set of SL resources, the wireless device may monitor the plurality of configured search spaces (e.g., in FIG. 21, monitor both SS #1 and SS #2).

In an example, a base station may transmit one or more RRC messages indicating configuration parameters for a cell. The configuration parameters may comprise/indicate one or more DCI formats used for DCIs indicating downlink resources or uplink resources and/or DCIs indicating a group common information such as slot formation indication or a preemption indication. The configuration parameters may comprise one or more sidelink DCI formats used for sidelink DCIs indicating sidelink resources. A base station may transmit downlink control information using various DCI formats, such as DCI formats used for DCIs indicating downlink resources or uplink resources, DCIs indicating a group common information, one or more sidelink DCI formats, and/or the like. In an example, different DCI formats may have different DCI sizes.

In existing technologies, a wireless device may monitor DCIs based on DCI formats. For example, a wireless device may monitor first DCIs based on one or more first DCI formats and second DCIs based on the one or more second DCI formats. This increases UEs monitoring complexity as number of DCI formats increases. In existing technologies, a wireless device may perform a size alignment of the one or more DCI formats to a predetermined DCI format (e.g., DCI format 0_0). For example, the configuration parameters may comprise a plurality of bandwidth parts comprising a first bandwidth part and a second bandwidth part. A first size of the predetermined DCI format (e.g., DCI format 0_0) via the first bandwidth part may be larger than a size of the one or more DCI formats. The base station may append predetermined values to the one or more DCI formats to have equal size to the predetermined DCI format when the first bandwidth part is an active bandwidth part of the cell. Existing size alignment procedures using a pre-determined DCI format is inefficient. For example, a second size of the predetermined DCI format of the second bandwidth part may be smaller than a size of the one or more DCI formats. Using a fixed/predetermined DCI format for a size alignment of the one or more DCI formats may lead performance degradation and increased overhead. Implementation of existing technology may result in transmission of increased number of padding bits (quantity of predefined values). A wireless device capability is limited to monitoring a limited number of DCI formats. Implementation of existing control channel monitoring when an increased number of DCI formats are configured may be inefficient. A wireless device may not be able to decode some of the DCIs due to a limited DCI processing capability, and this may increase DCI decoding failures.

In an example, a base station may transmit one or more RRC messages indicating configuration parameters. The configuration parameters may indicate a plurality of DCI formats of a bandwidth part of a cell. The plurality of DCI formats may comprise DCI formats configured to be monitored for the cell, for example for scheduling downlink and/or uplink resources. The plurality of DCI formats may comprise a sidelink DCI format for scheduling sidelink resources for a sidelink operation. Example embodiments describe a size alignment process for a sidelink DCI. The wireless device may determine a quantity of appended predetermined values for the sidelink DCI. The wireless device may receive the sidelink DCI with the quantity of the appended predefined values via the bandwidth part of the cell. The quantity is based on a smallest DCI format, of DCI formats, that is larger than a sidelink DCI format of the sidelink DCI. The wireless device may transmit a sidelink transport block based on the sidelink DCI. The embodiments may allow lower quantity of the appended predetermined values (padding bits) for the sidelink DCI/the sidelink DCI format. Example embodiments reduce downlink signaling overhead and UE complexity by reducing DCI overhead and the number of monitored DCI sizes. In an example, the smallest DCI is dynamically selected for an active bandwidth part based on configured DCI formats of the active bandwidth part.

In an example embodiment, when a number of DCI formats are configured for a bandwidth part of a cell, a wireless device may implement a DCI size alignment for a sidelink DCI and append predefined values to the sidelink DCI. This maintains/keeps consistent/same DCI monitoring processes, of the wireless device, for downlink and uplink DCIs regardless of whether sidelink DCI/sidelink DCI format(s) are configured. Example embodiments may enhance a DCI size adjustment for other DCIs, such as group DCIs. For example, embodiments may reduce UE processing and decoding capability for other DCIs when sidelink DCI/sidelink DCI format(s) are configured.

Example embodiments implement a process for determining the quantity of predefined values depending on DCI formats defined for an active bandwidth part. For example, the quantity may be determined based on a difference between a size, of a smallest DCI format of the DCI formats, where the smallest DCI format may be larger than the sidelink DCI format, and a size of the sidelink DCI format. The DCI formats and the sidelink DCI format may be configured/associated with the active bandwidth part. A wireless device and/or a base station may use example embodiments to dynamically determine the quantity of predefined values transmitted with the sidelink DCI. This reduces ambiguity in a DCI decoding process.

For example, the base station and the wireless device may align the sidelink DCI format based on a DCI format of the DCI formats, where the DCI format is larger than the sidelink DCI format and the DCI format is smallest among DCI formats that are larger than the sidelink DCI format. The base station may append the predefined values when a number of DCI sizes of the plurality of DCI formats exceed a capability of the wireless device. The embodiments may allow no appending of predefined values to a sidelink DCI when the wireless device supports the plurality of DCI formats without a size alignment. The embodiments may allow a reduced quantity of predefined values to a sidelink DCI when the wireless device may need to perform a size alignment.

The base station and the wireless device may perform a size alignment procedure between a DCI format and a sidelink DCI format. The base station may transmit a sidelink DCI based on the sidelink DCI format. The sidelink DCI may comprise one or more DCI fields of the sidelink DCI format and predefined values of padding bits. The wireless device, based on the size alignment procedure, may receive the sidelink DCI with the appended predefined values of padding bits. An actual size of the sidelink DCI may need to be known to the wireless device before attempting to decode the received sidelink DCI. A determination of a quantity of the predefined values of padding bits may be necessary in successful decoding of the sidelink DCI.

Example embodiments enable a sidelink DCI size alignment (e.g., a size alignment for a sidelink DCI) based on a number DCI sizes that a wireless device is capable to monitor and/or process on an active bandwidth part of a cell For example, when the wireless device is capable to process 4 DCI format sizes, and when the base station transmits configuration parameters for more than 4 DCI format sizes, the wireless device may implement a size alignment for sidelink DCIs. For example, when the wireless device is configured with 4 downlink/uplink DCI sizes, and one sidelink DCI size, the wireless device may implement example embodiments for the sidelink DCI size alignment. The capability of the wireless device may be a number of DCI sizes supported by the wireless device for a bandwidth part of the cell. Example embodiments reduces DCI decoding failures when the number of DCI sizes are larger than a UE capability of monitoring a limited number of DCI sizes. In an example, determining the quantity may be based on a number of sizes of configured DCI formats of the active bandwidth part of the cell and a capability of the wireless device. The quantity may be zero in response to the number of sizes being equal to or smaller than the capability of the wireless device. Example embodiments reduces transmission of padding bits and size of padding bits. For example, example embodiments reduce transmission of predefined values (padding bits) with a DCI (e.g., a sidelink DCI) by limiting transmission of predefined padding bits to a scenario when a number of DCI sizes of configured DCI formats is above a UE capability.

In an embodiment, a base station may transmit one or more RRC messages comprising configuration parameters. The configuration parameters may comprise/indicate a one or more search spaces over one or more cells (and/or over one or more cell groups) for scheduling one or more SL DCIs for a sidelink cell/carrier/BWP. A wireless device may need to increase its complexity if a sidelink DCI format of SL DCIs for the sidelink cell/carrier/BWP may be different from one or more DCI formats used for scheduling DCIs comprising resource assignments for downlink and/or uplink and/or other purposes (e.g., TPC commands, slot format indication, puncturing indication, and/or the like). The wireless device may use a second RNTI for SL DCIs, wherein the second RNTI may be different from RNTI(s) used for DCIs comprising resource assignments for downlink and/or uplink and/or other purposes. To reduce the wireless device complexity, embodiments may allow DCI size alignments between the sidelink DCI format of SL DCIs and a DCI format of DCIs. The wireless device may align the sidelink DCI format to a first DCI format in a first search space for SL DCIs for the sidelink cell. The wireless device may align the sidelink DCI format to a second DCI format in a second search space for SL DCIs for the sidelink cell.

In an example, a base station may transmit one or more RRC messages comprising configuration parameters. The configuration parameters may comprise/indicate a sidelink DCI format for a search space configured for SL DCIs for the sidelink cell. For example, the base station may configure a first DCI format and a second DCI format associated with a first search space for scheduling downlink and/or uplink data. One example is that the first DCI format is a DCI format 0_0/1_0 and the second DCI format is DCI format 0_1/1_1. The base station may indicate the first search space is being used for scheduling SL DCIs as well, where the sidelink DCI format is different from the first DCI format and/or the second DCI format. The base station, to minimize UE complexity increases, may indicate that the configuration parameters indicates/comprises the first DCI format (or the second DCI format) as an alignment target for the sidelink DCI format (e.g., aligning the sidelink DCI format to the first DCI format based on the configuration parameters). A wireless device may expect that the indicated alignment target DCI format (e.g., the first DCI format) has a larger DCI size than that of the sidelink DCI format. Otherwise, the wireless device may need to truncate the sidelink DCI format to align the DCI sizes (e.g., after truncation, a size of the sidelink DCI format becomes equal to a size of the target DCI format). In response to receiving the target DCI format for the alignment, the wireless device align the sidelink DCI format in the first search space to the indicated DCI format by adding 'zeros' or by adding known values or predefined values to make the same DCI sizes between the indicated DCI format and the sidelink DCI format. The wireless device, in response to indicating a DCI format for an alignment wherein a DCI size of the indicated DCI format is smaller than a DCI size of the sidelink DCI format, may assume a larger DCI size between the DCI size of the indicated DCI format and the DCI size of the sidelink DCI format as the DCI size used for both formats. For example, in the first search space, the wireless device may adjust a DCI size for monitoring a sidelink DCI format and an indicated DCI format for the alignment based on a larger DCI size between aligned DCI formats. In an example, a wireless device may skip monitoring for SL DCIs when a DCI size of an indicated DCI format for a size alignment may have smaller size compared to a DCI size of a sidelink DCI format.

In an example, a wireless device may determine, based on one more rules, a first DCI size of a sidelink DCI format in a search space, wherein the search space is configured/indicated for monitoring SL DCIs for a sidelink cell/carrier/BWP. For example, a rule may be that the wireless device may identify a largest DCI size among DCI formats monitored, for a scheduling cell, without counting the sidelink DCI format. Then the wireless device may align a DCI size of the sidelink DCI format to the identified DCI format. The wireless device may align the sidelink DCI format to the identified DCI format. For example, the wireless device may identify a DCI size of a DCI format among DCI formats monitored in the search space which has a larger size than a DCI size of the sidelink DCI format but a smallest among DCI sizes of larger DCI sizes than the DCI size of the sidelink DCI format. The wireless device may select a DCI format which has an closest DCI size to the size of the sidelink DCI format. The wireless device may select a DCI format which has an closest DCI size to the size of the sidelink DCI format where the DCI size is larger than or equal to the size of the sidelink DCI format.

Figure 22:
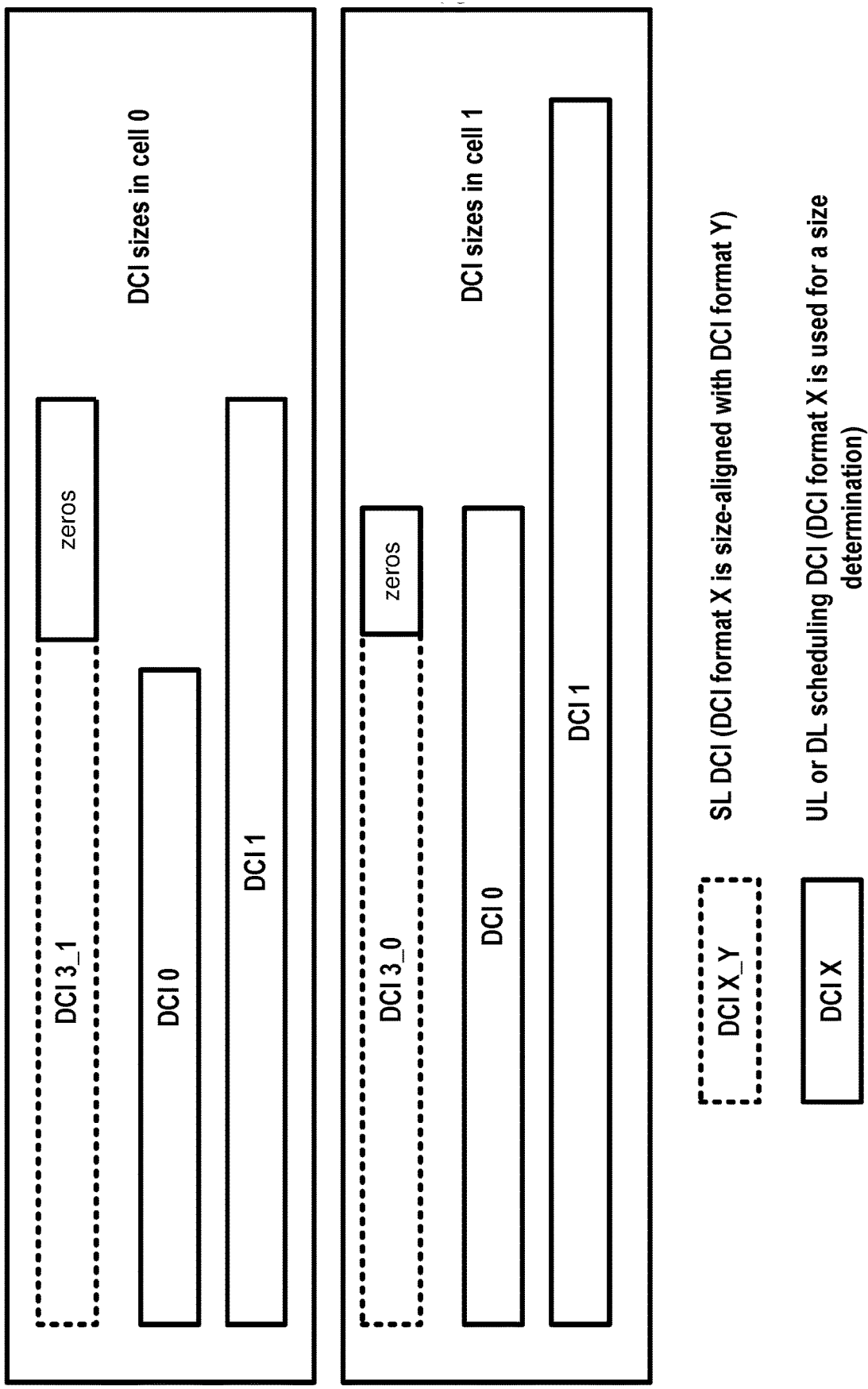
FIG. 22 illustrates an example a size alignment of downlink control information formats of a plurality of cells as per an aspect of an example embodiment of the present disclosure.

FIG. 22 illustrates a DCI size alignment procedure. In an example, a base station may transmit one or more RRC messages comprising configuration parameters. The configuration parameters may comprise/indicate a first search space on a first cell (cell0) for scheduling sidelink resources for a sidelink cell/carrier/BWP and a second search space on a second cell (cell1) for scheduling sidelink resources for the sidelink cell/carrier/BWP as to scenario of FIG. 19-21. The configuration parameters may comprise/indicate the first search space on the first cell for the sidelink cell/carrier/BWP. The base station may transmit one or more second RRC messages indicating the second search space on the second cell for the sidelink cell/carrier/BWP. The configuration parameters may comprise/indicate DCI format 0 (DCI0) and DCI format 1 (DCI1) for the first search space. The configuration parameters may comprise/indicate DCI format 0 and DCI format 1 for the second search space. A DCI size of DCI format 0 or DCI format 1 may be determined differently per each cell/search space as a current active bandwidth part of each cell may have different bandwidth. Based on configurations of each cell including a bandwidth of a current active DL BWP, each DCI size of a DCI format is determined. In the example, a wireless device may monitor DCI format 3 (DCI 3) for a sidelink DCI. In the first search space of cell0, the wireless device may align a DCI size of DCI format 3 for SL DCIs to a DCI format 1. For example, the configuration parameters may comprise/indicate DCI format 1 for an alignment for the SL DCIs on the first search space or on the first cell. For example, the wireless device may identify DCI format 1 in the first search space as a target alignment DCI format as the DCI format 1 has a larger DCI size compared to the DCI format 3 and is a smallest among such DCI formats with larger than or equal to the size of the DCI format 3. For example, the configuration parameters may comprise/indicate the DCI format 0 as an alignment DCI format on cell1 for the DCI format 3. For example, the wireless device may identify DCI format 0 as an alignment for the DCI format 3 in cell1 as a DCI size of the DCI format 0 is larger than the size of SL DCI format and is a smallest DCI size among the DCI format 0 and the DCI format 1.

In an example, a base station may transmit one or more RRC messages comprising configuration parameters. The configuration parameters may comprise/indicate a DCI format for each scheduling cell of SL DCIs for a sidelink cell/carrier/BWP that the wireless device may perform a DCI size alignment for SL DCIs for the sidelink cell/carrier/BWP. For example, the configuration parameters may indicate a DCI format for each search space of SL DCIs for the sidelink cell/carrier/BWP that the wireless device may perform a DCI size alignment for SL DCIs for the sidelink cell/carrier/BWP. The wireless device may perform a size alignment of a sidelink DCI format used for the SL DCIs in response to the DCI size alignment. The wireless device may assume that the DCI size alignment may be performed by appending 'zeros' or predetermined values to a smaller DCI sized DCI format among DCI formats to align the size. For example, in FIG. 22, the wireless device may assume that zeros are filled for the DCI format 3 to align the size to the DCI format 1 in cell0 and the DCI format 0 in cell1. In the example, the wireless device may monitor first DCIs based on a first DCI size (for DCI format 3 and DCI format 1) and second DCIs based on a second DCI seize (for DCI format 0) in cell0. The wireless device may monitor third DCIs based on a third DCI size (for DCI format 1) and fourth DCIs based on a fourth DCI size (for DCI format 3 and DCI format 0) in cell1. With the DCI size alignment, the wireless device may not need to increase a number of blind decoding to perform with and without a mode 1 sidelink operation (e.g., a base station assisted sidelink operation) is configured. In an example, a wireless device may perform a DCI size alignment for a sidelink DCI format for a search space where the sidelink DCI format is configured. Embodiments of a DCI size alignment may allow a smallest DCI size or a smallest quantity of padding bits (e.g., zeros, predefined values) to be appended for the sidelink DCI format while maintaining a same number of blind decoding for monitoring one or more DCIs.

Figure 23:
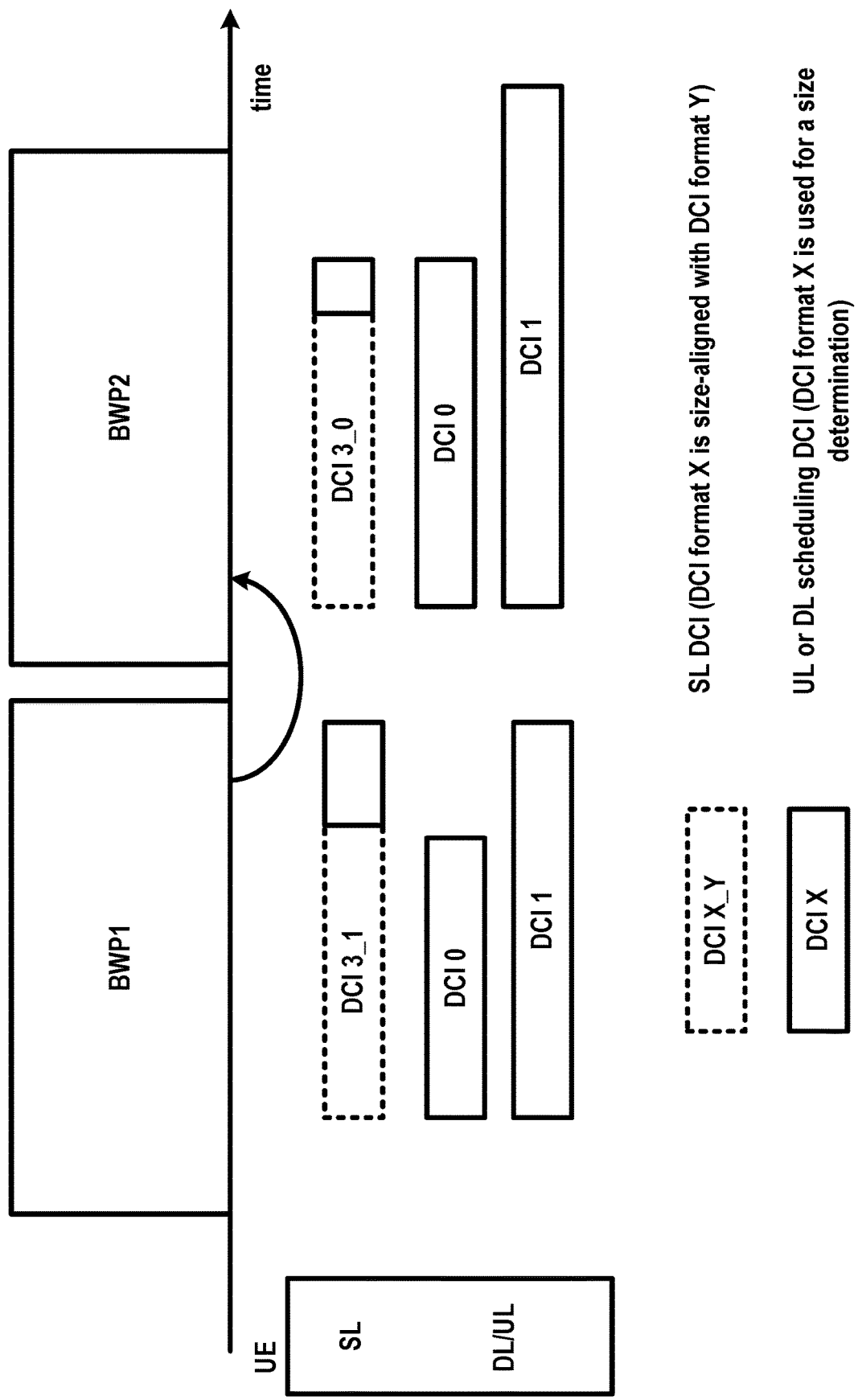
FIG. 23 illustrates an example a size alignment of downlink control information formats of a plurality of bandwidth parts of a cell as per an aspect of an example embodiment of the present disclosure.

In an example, a wireless device may determine a size of a SL DCI format for a sidelink cell/carrier/BWP based on one or more DCI formats monitored on an active BWP of a cell, wherein the one or more DCI formats are used for scheduling downlink and/or data, and/or scheduling additional information. For example, a base station may transmit one or more RRC messages comprising configuration parameters. The configuration parameters may comprise/indicate a DCI format to align a DCI size of a SL DCI format per each search space configured for monitoring SL DCIs for a sidelink cell or per each BWP of a cell or per each cell configured for SL DCIs of the sidelink cell. For example, without receiving a parameter of the DCI format by the configuration parameters, the wireless device may determine, based on a rule, a DCI format or an aligned DCI size for a SL DCI format. FIG. 23 illustrates an example of the rule as per an aspect of an embodiment of the present disclosure. The configuration parameters may comprise/indicate a first BWP (BWP1) and a second BWP (BWP2) for a cell. The configuration parameters may comprise/indicate a first DCI format (DCI 0) and a second DCI format (DCI 1) for the first BWP. The configuration parameters may comprise/indicate the first DCI format (DCI0) and the second DCI format (DCI1) for the second BWP. A DCI size of the first DCI format in the BWP1 may be different from a DCI size of the first DCI format in the second BWP (BWP2) as the DCI size of each format may be determined based on one or more parameters of the BWPs including a bandwidth of a BWP. In the first BWP, the configuration parameters may indicate to align a DCI size of a SL DCI format (DCI3) to the second DCI format (DCI1) when the first BWP is an active BWP of the cell.

The configuration parameters may indicate to align a DCI size of the SL DCI format (DCI3) to the first DCI format (DCI0) when the second BWP is an active BWP of the cell. A SL DCI format and a size of the SL DCI format may be determined based on one or more parameters of sidelink operation including a number of subchannels of a resource pool or a number of subchannels of a sidelink BWP of the sidelink cell. A size of the SL DCI format may not change based on a DL BWP. When the wireless device may maintain a same size of the SL DCI format in different DL BWPs (e.g., a size of the sidelink DCI format may be determined as same when the first BWP is an active BWP or the second BWP is an active BWP). For example, the wireless device may have/determine a first number of DCI sizes monitored on a first BWP based on one or more DCI formats configured to monitor for the cell via the first BWP (e.g., the first DCI format and the second DCI format) and the sidelink DCI format. The wireless device may determine/have a second number of DCI sizes based on one or more DCI formats configured to monitor for the cell via the second BWP (e.g., the first DCI format and the second DCI format) and the sidelink DCI format.

Additional DCI format of the sidelink DCI format may lead increased wireless device complexity. Changing/adapting/aligning a DCI size of a sidelink DCI format for a BWP depending on one or more DCI formats monitored on the BWP may reduce a wireless device complexity. This may allow an efficient a mode 1 sidelink operation (e.g., a gNB assisted sidelink operation) without increasing wireless device complexity.

In an example, a wireless device may determine a DCI size of a SL DCI format for a sidelink cell/carrier/BWP on a search space of a BWP of a cell based on one or more rules. The one or more rules may be one or more of followings. For example, the wireless device may identify/select a DCI format or a DCI size among one or more DCI sizes of DCI formats or among the DCI formats that are configured to monitor for the cell on the BWP based on search space configurations. The wireless device may select/identify the DCI size among one or more DCI sizes of the DCI formats configured to monitor on the BWP via one or more search spaces. The one or more search spaces may be configured to monitor SL DCIs for the sidelink cell (e.g., the one or more search spaces may be associated with the sidelink DCI format). The wireless device may select/determine a DCI size among the one or more DCI sizes which is larger than or equal to a DCI size of the SL DCI format for the sidelink cell. If there are multiple DCI sizes satisfying the condition, the wireless device may select a smallest DCI size among the multiple DCI sizes. The wireless device may receive a sidelink DCI, based on the sidelink DCI format, with a quantity of predefined values. The quantity of predefined values may be determined based on a smallest DCI format, of the one or more DCI formats, that is larger than the sidelink DCI format. The wireless device may perform a DCI size alignment of the sidelink DCI format to (or based on) the smallest DCI format. The wireless device may transmit one or more sidelink transmissions based on the sidelink DCI.

In an example, the configuration parameters may indicate one or more search spaces of a BWP of a cell for monitoring SL DCIs based on a sidelink DCI format. The configuration parameters may indicate one or more DCI formats, via the BWP of the cell, for non-sidelink operation (e.g., scheduling downlink and/or uplink data, indicating SFI, puncturing indication, TPC commands). When there is no DCI format or a DCI size of a DCI format among the one or more DCI formats which is larger than or equal to a DCI size of the sidelink DCI format for SL DCIs of a sidelink cell/carrier/BWP, the wireless device may not be able to align the SL DCI format to a DCI format or a DCI size. This case needs to be addressed. For example, the wireless device may not monitor (or skip monitoring) SL DCIs for the sidelink cell/carrier/BWP on the search space of the BWP of the cell or the BWP of the cell. For example, the wireless device may align the sidelink DCI format to a largest DCI size among the one or more DCI formats. For example, the wireless device may not align the sidelink DCI format and may monitor as long as the wireless device may support a number of DCI sizes, without a DCI size alignment of the sidelink DCI format to a DCI format, on the BWP based on a wireless device capability. For example, when a wireless device may support up to K different number of DCI sizes on a BWP of a cell, the wireless device may monitor the sidelink DCI format as long as a total number of DCI sizes including the sidelink DCI format and other DCI formats may not exceed the K. When the total number of DCI sizes may exceed the wireless device's capability, the wireless device may drop (or skip monitoring) one or more DCI formats or align the one or more DCI formats to the sidelink DCI format. The wireless device may select the one or more DCI formats on one or more conditions. For example, if a sidelink operation based on a gNB assistance (e.g., a mode 1 sidelink operation) may be configured with a high priority (e.g., a high LCH mapping, a high L1 QoS level), the wireless device may select one or more other DCI formats to align the size to a size of the sidelink DCI format. In an example, the configuration parameters may indicate to align non-sidelink DCI format(s) to the sidelink DCI format based on an explicit higher layer configuration (e.g., RRC signaling, MAC CE, DCI signaling/indication).

Figure 24:
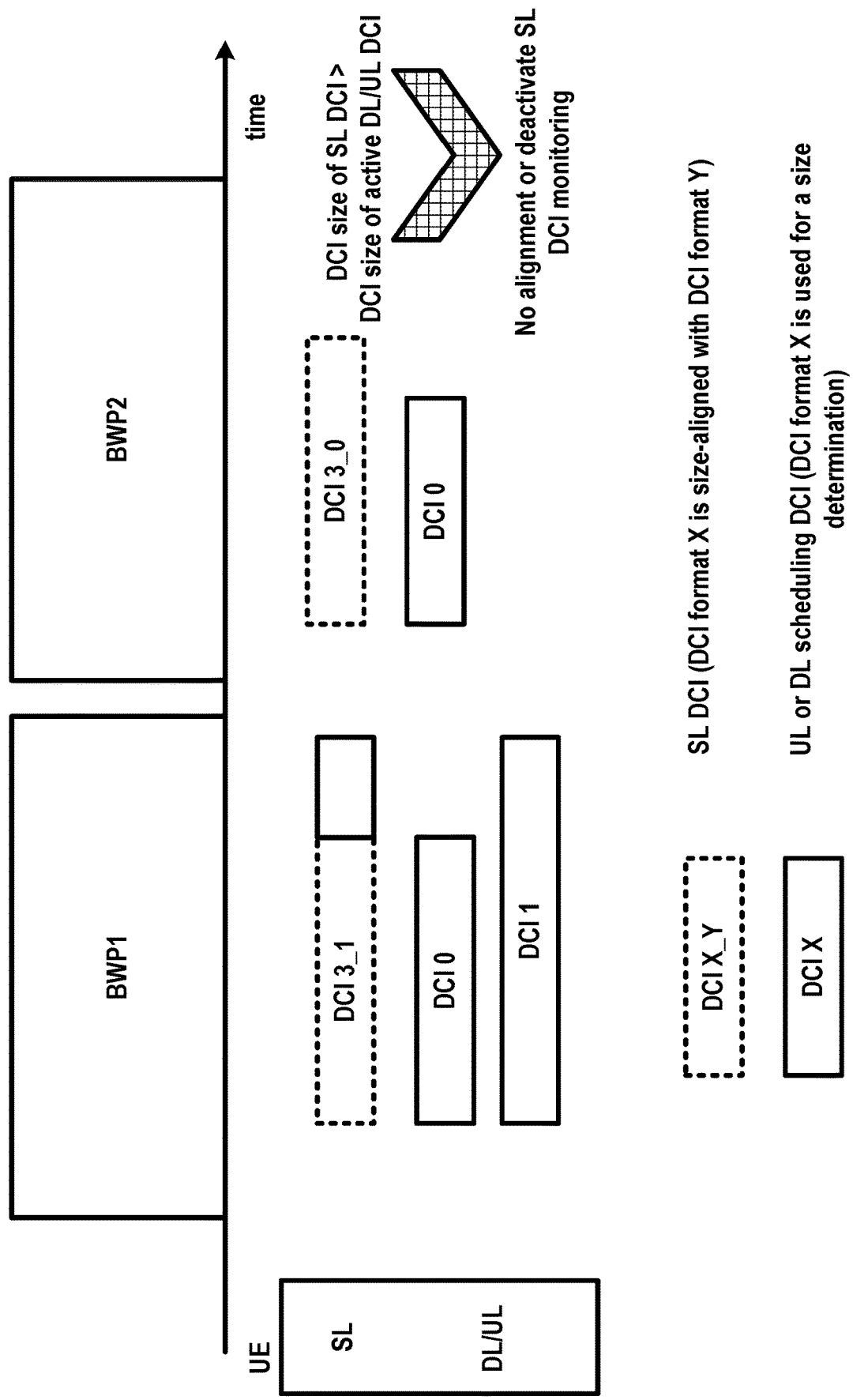
FIG. 24 illustrates an example a size alignment of downlink control information formats of a plurality of bandwidth parts of a cell as per an aspect of an example embodiment of the present disclosure.

FIG. 24 illustrates an example of the rules as per an aspect of an embodiment of the present disclosure. FIG. 24 is a similar scenario to FIG. 23. FIG. 24 illustrates a case where a wireless device may not be able to perform a DCI size alignment of a sidelink DCI format in a BWP. For example, in the second BWP (BWP2), there is no DCI format which the wireless device is able to align the sidelink DCI format unless the wireless device may truncate one or more bits from the sidelink DCI format. The example illustrates the case where the wireless device may determine to deactivate monitoring of a sidelink DCI format on the second BWP (BWP2) or does not perform the DCI size alignment of the sidelink DCI format or keeps the sidelink DCI format without a size alignment. In response to deactivating monitoring of the sidelink DCI format for a sidelink cell, the wireless device may switch to a sidelink operation mode which does not involve any gNB operation or does not involve monitoring one or more sidelink DCIs for the sidelink cell (e.g., a mode 2 sidelink operation). For example, the wireless device may switch to a mode 2 sidelink operation from a mode 1 sidelink operation, where the wireless device may determine, based on the mode 2 sidelink operation, sidelink resources without receiving sidelink DCIs.

In an example, a base station may transmit one or more RRC messages comprising configuration parameters. The configuration parameters may comprise/indicate a self-carrier scheduling via a first search space of a first cell. The base station may configure a cross-carrier scheduling via the first search space of the first cell for a second cell. The base station may configure to monitor SL DCIs of a sidelink cell/carrier/BWP via the first search space of the first cell. A first DCI size of the self-carrier scheduling, of a DCI format, via the first search space may be a same or different from a second DCI size, of the DCI format, of the cross-carrier scheduling via the first search space. The first DCI size and the second DCI size may be determined based on one or more parameters for data including a bandwidth of a scheduled cell. In response to have difference sizes between the first DCI size and the second DCI size, a wireless device may select the first DCI size as a target DCI size to align a size of a sidelink DCI against in response to the wireless device performing a DCI size alignment of the sidelink DCI format to the DCI format. For example, a wireless device may select/determine a smallest DCI format, of DCI formats used/configured to monitor for a cell based on a self-carrier scheduling, that is larger than a sidelink DCI format as a reference DCI format for the sidelink DCI format used for SL DCIs scheduling sidelink resources for a sidelink cell/carrier/BWP.

In an example, a base station may transmit one or more RRC messages comprising configuration parameters. The configuration parameters may comprise/indicate one or more DL BWPs for a cell for a wireless device. Each DL BWP may comprise one or more search spaces to monitor DCIs for downlink and/or uplink data scheduling and/or other purposes such as TPC commands, SFI indication, puncturing indication, and/or the like. The configuration parameters may indicate one or more first search spaces on a BWP for SL DCIs for a sidelink cell. The base station may not configure any search space of a BWP for SL DCIs. Whether to support SL DCIs for a certain BWP may be determined based on RRC configuration. For example, the base station may configure all search spaces or some search spaces among a first BWP of a cell are configured for monitoring SL DCIs for the wireless device. The base station may not configure any search space of a second BWP of the cell for SL DCIs. In response to a switching from the first BWP to the second BWP, the wireless device may have different search spaces configured for SL DCIs of the sidelink cell. When there is no configured search space for SL DCIs on a current active BWP of the cell, the wireless device may not monitor any SL DCI on the cell. The wireless device may assume that a sidelink operation based on a base station assistance (e.g., a mode 1 sidelink operation) is disabled for the sidelink cell when there is no active search space on any current DL BWP of active cells configured for SL DCIs for the sidelink cell.

In an example, a base station may transmit one or more RRC messages comprising configuration parameters. The configuration parameters may comprise/indicate a cross-carrier scheduling for a cell. For example, a first cell may schedule one or more DCIs for a second cell. The configuration parameters may comprise/indicate one or more search spaces in one or more BWPs of the second cell. The configuration parameters may indicate/comprise parameters indicating whether to monitor SL DCIs on some or all search spaces of the second cell similar as self-carrier scheduling case. A wireless device may monitor SL DCIs via the first cell when the base station configures to monitor SL DCIs on the second cell on a current active DL BWP of the second cell. For example, one or more search spaces on the current active DL BWP of the second cell are configured with SL DCIs to monitor, the wireless device monitors SL DCIs from the first cell via one or more first search spaces corresponding to the one or more search spaces. The wireless device may determine the one or more first search spaces corresponding to the one or more search spaces based on search space identifiers or based on a cross-carrier scheduling procedure. When a scheduled cell is configured with a cross-carrier scheduling, a base station may use a same scheduling cell for scheduling sidelink DCIs as well scheduling DCIs for the scheduled cell when sidelink DCIs are configured to be monitored via the scheduled cell. For example, the configuration parameters may indicate a scheduling cell for the sidelink DCI format. When the scheduling cell is configured with a cross-carrier scheduling by a cell, the wireless device may monitor sidelink DCIs and downlink/uplink DCIs for the scheduling cell via the cell.

In an example, a base station may transmit one or more RRC messages comprising configuration parameters. The configuration parameters may comprise/indicate a first cell to a wireless device for downlink/uplink data transmission for a wireless device. The configuration parameters may comprise/indicate one or more first search spaces on the first cell for the downlink/uplink data transmission for the wireless device. The configuration parameters may comprise/indicate the first cell as a scheduling cell for SL DCIs of a sidelink cell for the wireless device. The wireless device may monitor SL DCIs on the one or more first search spaces of the first cell without additional configuration from the base station. The wireless device may align a DCI size of a SL DCI in each search space to a DCI format monitored on the each search space for scheduling downlink/uplink data transmission. The wireless device may perform a DCI size alignment of a SL DCI format for the sidelink cell to the DCI format. When the DCI format may have a smaller size compared to the SL DCI format on a search space, the wireless device may skip monitoring the SL DCI format on the search space. In an example, the configuration parameters may comprise/indicate one or more second search spaces from the one or more first search spaces for SL DCIs for the sidelink cell. The wireless device may monitor for SL DCIs on the one or more second search spaces. The wireless device may align a DCI size of a SL DCI in a search space of the one or more second search space to a DCI format monitored on the search space for scheduling downlink/uplink data transmission. The wireless device may align the SL DCI format in the search space of the one or more second search space to the DCI format monitored on the search space for scheduling downlink/uplink data transmission. In an example, a base station may transmit one or more RRC messages comprising configuration parameters. The configuration parameters may comprise/indicate a DCI format (e.g., DCI format 1_0, DCI format 1_1 or DCI format 0_0, DCI format 0_1) for a size alignment for a SL DCI format. A wireless device may monitor one or more third search spaces among the one or more first search spaces, wherein the wireless device may monitor the configured DCI format for downlink/uplink data transmission. The wireless device may align a DCI size of the SL DCI format in a search space of the one or more third search space to the indicated DCI format on the one or more third search spaces.

In an example, a wireless device may determine a DCI format as a DCI format 1_0 or DCI format 0_0 (e.g., a fallback DCI format) monitored in a UE-specific search space to align a DCI size of SL DCIs for a sidelink cell when configured to monitor. In an example, a wireless device may determine a DCI format as a DCI format 1_1 or DCI format 0_1 (e.g., a non-fallback DCI format) monitored in a UE-specific search space to align a DCI size of SL DCIs for a sidelink cell when configured to monitor the SL DCIs for the sidelink cell.

In an example, a cross-carrier scheduling may be configured independently between one or more first search spaces, for DCIs scheduling downlink and/or uplink and/or other purposes such as SFI indication, TPC commands, puncturing indication and/or the like, and one or more second search spaces, for SL DCIs scheduling sidelink resources. A base station may transmit one or more RRC messages comprising configuration parameters. The configuration parameters may comprise/indicate a cell index for a sidelink DCI. In an example, a wireless device may not expect to be configured with a cell index wherein the wireless device may be configured with a cross-carrier scheduling on a cell with the cell index. The wireless device may assume a cell with a cross-carrier scheduling is not configured as a scheduling cell via the configuration parameters for monitoring SL DCIs.

Figure 25:
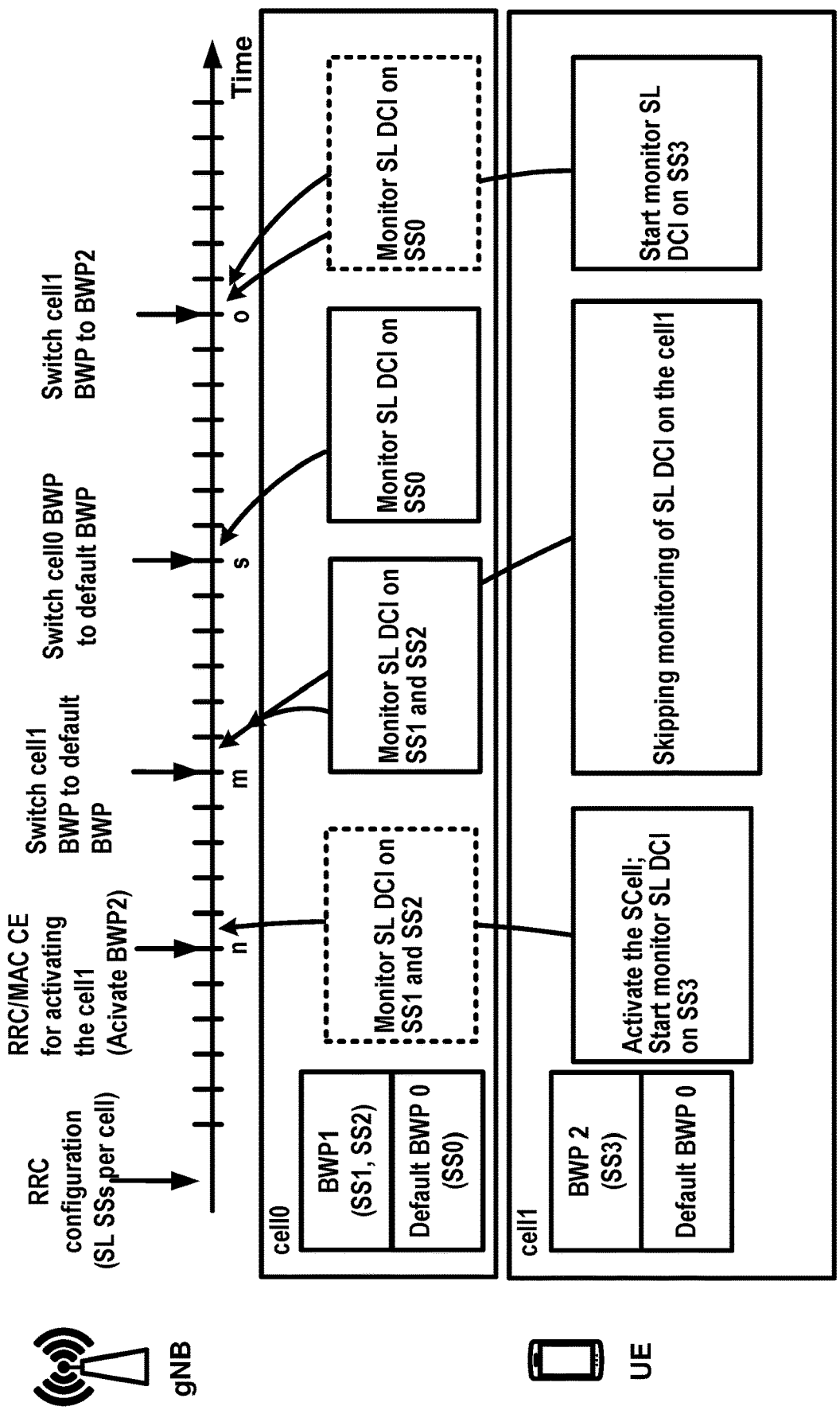
FIG. 25 illustrates an example signal flow diagram of an embodiment as per an aspect of an example embodiment of the present disclosure.

FIG. 25 illustrates an example of different search spaces are configured for SL DCIs for different bandwidth parts. In an example, a base station may transmit one or more RRC messages comprising configuration parameters. The configuration parameters may comprise/indicate a first cell (cell0) and a second cell (cell1) to a wireless device (UE). The configuration parameters may comprise/indicate a first BWP (BWP1) and a second BWP (default BWP 0) for the first cell. The configuration parameters may comprise/indicate a third BWP (BWP2) and a fourth BWP (Default BWP0) for the second cell. The configuration parameters may comprise/indicate one or more search spaces for each BWP. Among the configured search spaces, the configuration parameters may comprise/indicate that a first search space (SS1) and a second search space (SS2), of the first BWP of the first cell, are configured for SL DCIs for a sidelink cell/carrier/BWP. The configuration parameters may indicate that a third search space (SS0), of the second BWP of the first cell, is associated with a sidelink DCI format used for SL DCIs for the sidelink cell/carrier/BWP. The configuration parameters may indicate that a fourth search space (SS3), of the third BWP of the second cell, is associated with the sidelink DCI format used for SL DCIs for the sidelink cell/carrier/BWP. The configuration parameters may not indicate that any search space of the fourth BWP of the second cell is associated with the sidelink DCI format for SL DCIs for the sidelink cell/carrier/BWP.

At a time n, the base station may indicate to activate the second cell where initial/first active DL BWP is indicated as BWP2. A wireless device may activate the third BWP (BWP2) on the second cell as an active BWP. In response to activating the third BWP (BWP2), the wireless device may start monitoring SS3 for SL DCIs on the second cell. The wireless device may also monitor SS1 and SS2 of BWP1 on the first cell assuming the first BWP is a current active DL BWP of the first cell, depending on a configuration or a rule. For example, the wireless device may monitor multiple cells for SL DCIs for a single sidelink cell/carrier/BWP as specified in this specification. For example, the base station may indicate a cell among the multiple cells as specified in this specification. For example, the wireless device may determine/identify a single cell to monitor SL DCIs for the sidelink cell based on rule(s). The wireless device may select a cell with a lowest (or a highest) cell index among cells, wherein each cell may have a current active DL BWP which comprises at least one search space configured to monitor SL DCIs for the sidelink cell. In the example of FIG. 23 at a time n, the wireless device may identify cell0 as the cell for monitoring SL DCIs for the sidelink cell. For example, the wireless device may select a cell with a current active BWP not being a default BWP. When there are more than one candidate cells, the wireless device may select a lowest indexed or a highest indexed cell among the candidate cells. In the example of FIG. 25, the wireless device may select cell0 as the current active BWP of the first cell is not a default BWP, and may have a lower cell index than the second cell. For example, a base station may configure a list of cell indices determining a priority.

The wireless device may monitor a cell with a highest priority (e.g., in a top list) wherein the cell is having a current active DL BWP not being a default BWP and/or the cell is configured with a self-carrier scheduling. For example, the configuration parameters may indicate/comprise a cell index which is used for monitoring for SL DCIs as long as the cell has an active DL BWP and at least one search space configured for SL DCIs for the sidelink cell/carrier/BWP are configured for the active DL BWP. In response to a deactivation on the indicated cell or a BWP switching on the indicated cell leading a new BWP being not configured with any search space for SL DCIs, the wireless device may switch to another cell (e.g., PCell, SPCell, a PUCCH SCell, and/or the like) for monitoring SL DCIs.

At a time m, the base station indicates a BWP switching on the second cell from the third BWP (BWP2) to a default BWP (the fourth BWP). The wireless device may not have any search space on the fourth BWP on the second cell for SL DCIs for the sidelink cell/carrier/BWP. The wireless device may fallback/switch to another cell for monitoring SL DCIs. The wireless device may skip monitoring for SL DCIs on the second cell when an active BWP of the second cell is the fourth BWP (e.g., a BWP does not comprise a search space associated with the sidelink DCI format or a BWP not configured for monitoring SL DCIs). The wireless device may continue or start monitoring on SS1 and SS2 on the first cell at the time m for SL DCIs for the sidelink cell. At a time s, the base station indicates a BWP switching on the first cell from the first BWP to the default BWP of the first cell. In response to the BWP switching, the wireless device changes search spaces for SL DCIs for the sidelink cell from SS1/SS2 to SS0. The wireless device starts monitoring on the SS0 for SL DCIs for the sidelink cell.

In an example, a wireless device may assume that there is at least one search space on a default BWP of a PCell in a first cell group or a SPCell in a second cell group (if the second cell group schedules SL DCIs for the wireless device) or a scheduling cell of a sidelink operation configured for SL DCIs for a sidelink cell if a gNB assisted sidelink operation (e.g., a mode 1 sidelink operation) is configured/activated. This is to ensure there is at least one search space to schedule SL DCIs regardless of SCell deactivation and/or BWP switching and/or power saving transitions. At a time o, the base station switches an active DL BWP of the second cell from the default BWP to the third BWP (BWP2). In response to the switching, the wireless device may start monitoring on the SS3. Depending on the rule, the wireless device may continue monitoring on the SS0 or may skip monitoring on the SS0 as the wireless device monitors the SS3 in the second cell.

It is noted that a sidelink cell may be replaced with a sidelink resource pool. Embodiments in this specification may be applied to a sidelink cell or a sidelink resource pool or a group of sidelink cells or a group of resource pools and/or combinations of them.

In an example, a base station may transmit one or more RRC messages comprising configuration parameters. The configuration parameters may comprise/indicate a plurality of search spaces over one or more cells of one or more cell groups for SL DCIs for a sidelink cell/carrier/BWP to a wireless device, when a gNB-assisted sidelink operation (a mode 1 sidelink operation) is enabled/configure/activated. The wireless device may determine one or more first search spaces and/or one or more first cells for monitoring SL DCIs for the sidelink cell among the configured plurality of search spaces over the one or more cells of the one or more cell groups. For example, the wireless device may indicate the one or more first search spaces and/or the one or more first cells via a sidelink SR transmission. For example, a base station may transmit one or more RRC messages comprising configuration parameters. The configuration parameters may comprise/indicate a plurality of sidelink SR resources/configurations for a sidelink cell where the wireless device may select different SR resource/configuration among the plurality of resources/configurations to indicate the one or more first search spaces and/or the one or more first cells. For example, a base station may request a feedback on the one or more first search spaces and/or the one or more first cells.

In response to receiving the request, the wireless device may transmit a MAC CE comprising the one or more first search spaces and/or the one or more first cells. For example, the wireless device may determine the one or more first search spaces and/or the one or more first cells and may inform to the base station upon a change in terms of selection/determination. The wireless device may use a MAC CE to convey the information or use a UCI (Uplink control information) to convey the information.

In an example, a wireless device may convey information via selecting a positive SR and a negative SR in transmitting a sidelink SR. For example, a base station may transmit one or more RRC messages comprising configuration parameters. The configuration parameters may comprise/indicate a first cell and a second cell for SL DCIs for a sidelink cell. The wireless device may indicate the first cell or the second cell to receive SL DCIs corresponding to a SL SR in the SL SR transmission via a positive SR or a negative SR transmission. The positive SR and the negative SR may use a same resource or may use different resources to differentiate the information. For example, if a SR is transmitted using a PUCCH format 1, a code corresponding to a ACK may be assumed as a positive SR, and a code corresponding to a NACK may be assumed as a negative SR. In this case, it may be assumed that SR and HARQ-ACK of the wireless device corresponding to the sidelink DCI may not be combined. For example, the wireless device may indicate a preferred mode (e.g., a gNB assisted mode (e.g., mode 1) or a UE-autonomous mode (e.g., mode 2)) for a sidelink operation via a positive SR (e.g., a gNB assisted mode) or a negative SR (e.g., a UE-autonomous mode). For example, the wireless device may indicate a level of a buffer for a sidelink operation via a positive and a negative SR (e.g., a high buffer size using a positive SR and a low buffer size using a negative SR), where the configuration parameters may indicate/comprise a threshold to determine the high buffer size (e.g., buffer size is greater than or equal to the threshold) or the low buffer size (e.g., buffer size is lower than the threshold). The wireless device may use one or more bits of SR transmission to convey information.

In an example, a wireless device may transmit a SL SR and a SR simultaneously and may transmit one or more MAC CEs in response to receiving a UL grant. In response to receiving the UL grant, when the wireless device may not have any uplink data to transmit, instead of transmitting a BSR (buffer status report) for an uplink data, the wireless device may transmit the one or more MAC CEs for assisting sidelink operation. For example, one state of a SL SR state may represent that a wireless device may need an UL grant for transmitting one or more MAC CEs and a SL DCI (a SL grant) for one or more sidelink resource allocations. Another state of the SL SR state may represent that the wireless device may need only the SL DCI for the one or more sidelink resource allocations. For example, a SR for a UL grant and a SL SR for a SL DCI/grant may be jointly transmitted or may be separately transmitted based on SR configurations for the SR and the SL SR.

Figure 26:
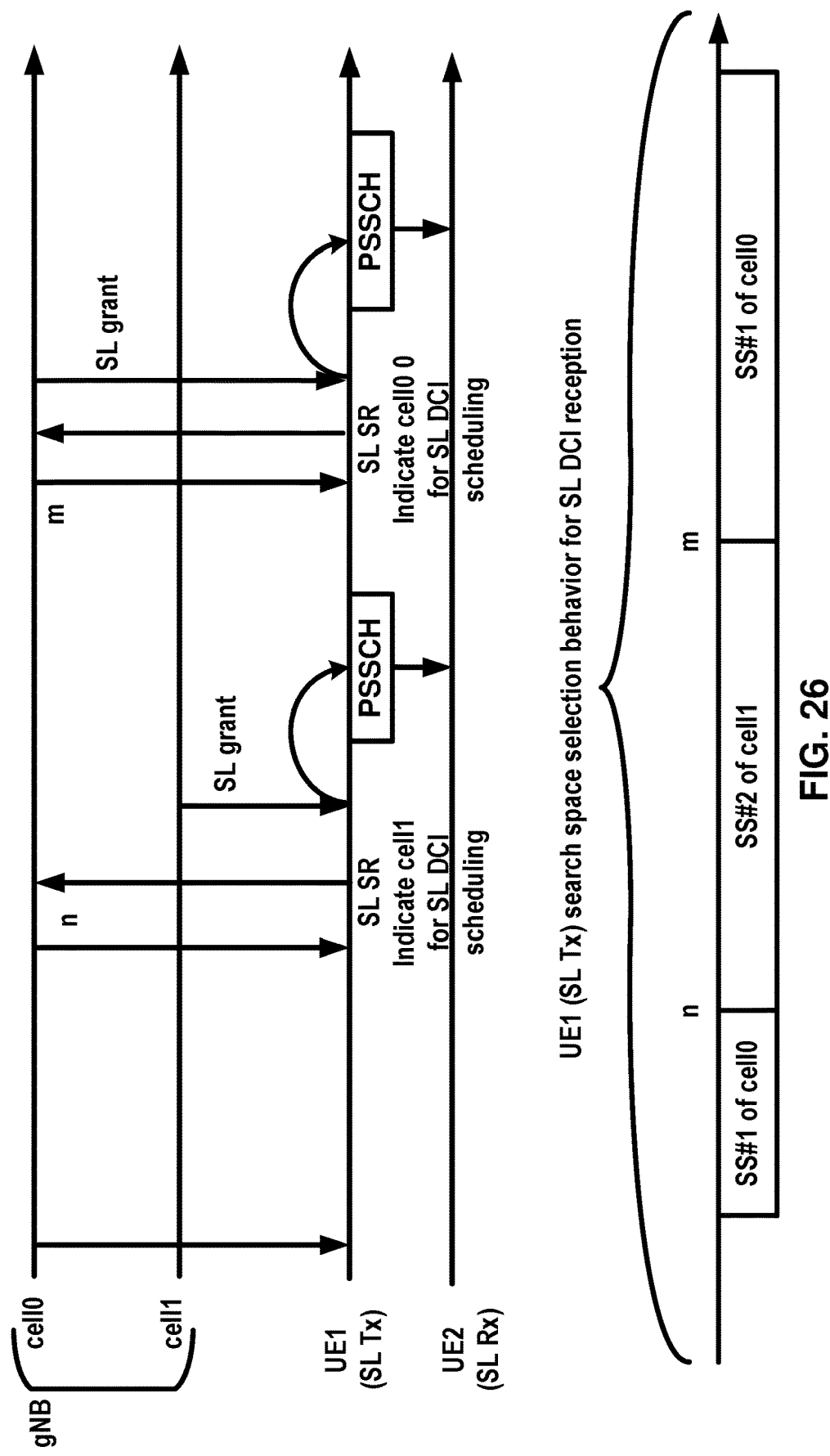
FIG. 26 illustrates an example signal flow diagram of an embodiment as per an aspect of an example embodiment of the present disclosure.

FIG. 26 illustrates an example of an embodiment. FIG. 26 shows a similar scenario to FIG. 19-21. A base station may transmit one or more RRC messages comprising configuration parameters. The configuration parameters may comprise/indicate a plurality of search spaces across a plurality of cells for monitoring SL DCIs for scheduling sidelink resources of a sidelink cell/carrier/BWP. A wireless device may recommend or indicate a desired cell to receive SL DCIs for the sidelink cell/carrier/BWP via a SL SR transmission. The information may be transmitted via a multi-bit (including 1 bit) SL SR transmission or via a MAC CE corresponding via a PUSCH based on an UL grant after transmission of the SL SR, or via a UE RRC signaling. For example, a cell index of the desired cell and a positive SR may be transmitted via the multi-bit SL SR transmission. For example, the cell index may be indicated via the MAC CE or the UE RRC signaling. The wireless device may indicate the cell index=1 in a first SL SR transmission. In response to receiving the SL SR, the base station may accept the request and may schedule a SL DCI corresponding to the SL SR via cell1. When the wireless device requests to switch to cell0 for SL DCIs, the base station may transmit SL DCIs via cell0 accordingly. The wireless device may monitor a default cell (e.g., a lowest indexed cell) among configured cells for SL DCIs for the sidelink cell. The wireless device may request a switch via a SL SR transmission. In response to transmitting a SL SR with a change of a cell for SL DCIs, the wireless device may switch its monitoring search spaces for the SL DCIs at a time n and a time m. In the time n, the wireless device switches to the cell1 after requesting cell1 for SL DCIs for the sidelink cell and starts monitoring on SS #2 for cell1. In the time n, the wireless device starts monitoring on SS #1 based on the request to switch back to cell0.

In an example, a first base station and/or a second base station may configure a first cell group and a second group to a wireless device. The first cell group may operate using a first radio access technology (RAT) such as LTE, Wi-Fi, 5G, NR, and/or the like. The second cell group may operate using a second radio technology (RAT) such as LTE, Wi-Fi, 5G, NR, and/or the like. The wireless device may operate a sidelink operation on one or more sidelink cells. For a sidelink cell among the one or more sidelink cells, the wireless device may operate the sidelink cell using the second RAT. The first base station and/or the second base station may configure a first sidelink operation assistance via the first cell group and a second sidelink operation assistance via the second cell group. For example, the first sidelink operation is a cross-RAT sidelink assistance via one or more DCIs for the sidelink cell via the first cell group using the first RAT. For example, the second sidelink operation is an intra-RAT sidelink assistance via one or more DCIs for the sidelink cell via the second cell group using the second RAT.

For example, the first base station and/or the second base station may transmit one or more RRC messages indicating/ comprising configuration parameters. The configuration parameters may indicate/comprise the second cell group (e.g., configuring SPCell) and activates at least one cell (e.g., SPCell) in the second cell group. Based on the configuration parameters, the wireless device may switch to the second cell group for SL DCIs for the sidelink cell, when the wireless device is configured with at least one search space on an active cell of the second cell group. When a RLF occurs on the second cell group or the second cell group is deactivated or the second cell group is deconfigured, or a handover command is received, or the second cell group is not available, or the first base station and/or the second base station may request to switch back to the first cell group for receiving SL DCIs for the sidelink cell, the wireless device may fallback/switch to the inter-RAT sidelink operation (e.g., the first sidelink operation).

Note that when the first cell group and the second cell group may utilize a same RAT, embodiments for a carrier aggregation scenario may be applied or embodiments for inter-RAT cell group may be applied.

In an example, a base station may switch/change/adapt a cell index for SL DCIs for a sidelink cell via DCI(s) and/or MAC CE(s). One example is to utilize a field in a sidelink DCI format. For example, the field may be a bandwidth part index. For example, the field may be a new field to switch/ indicate a scheduling cell. For example, the field may be a TPC field. For example, the field may be a HARQ process ID field. Other examples are not precluded. When a sidelink DCI may comprise/indicate a scheduling cell index of SL DCIs for the sidelink cell, a wireless device may apply the indicated scheduling cell after T since it has received the sidelink DCI to allow a processing time. For example, T may be a processing delay to reflect a new scheduling cell for SL DCIs. For example T may be determined based on a UE capability. For example, T may be determined as 2 slots. For example, T may be determined same as a delay to switch a BWP. For example, T may be determined same as a delay to activation of a SCell.

Figure 27:
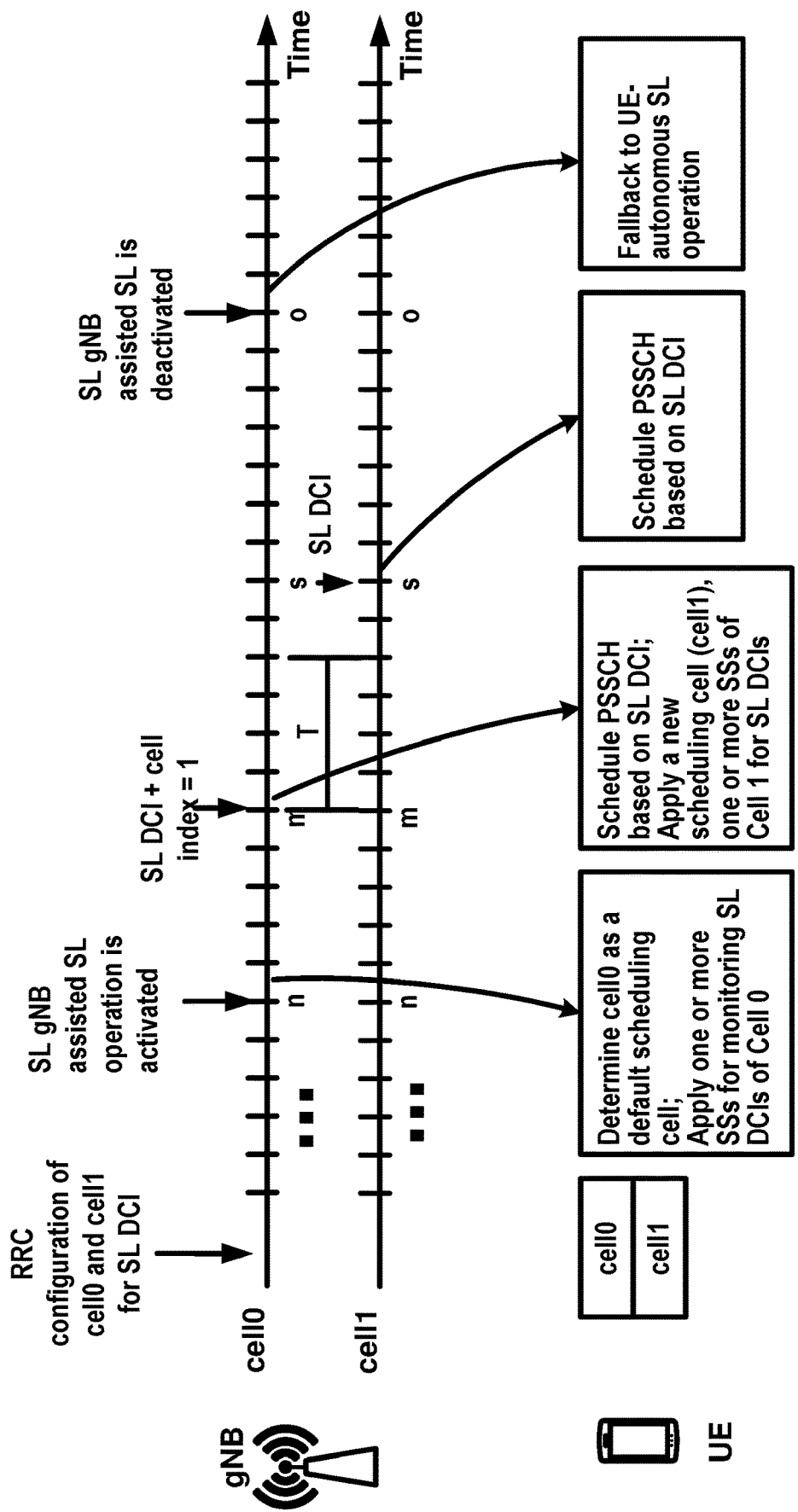
FIG. 27 illustrates an example signal flow diagram of an embodiment as per an aspect of an example embodiment of the present disclosure.

FIG. 27 illustrates an example. A base station may transmit one or more RRC messages comprising configuration parameters. The configuration parameters may comprise/ indicate a plurality of search spaces over a plurality of cells similar to a scenario of FIG. 19-21 for a sidelink cell. At a time n, the base station may activate a gNB-assisted sidelink operation (e.g., a mode 1 sidelink operation) for the sidelink cell. In response to the activation, a wireless device may determine a default cell index/a default cell used for SL DCIs for the sidelink cell (e.g., a lowest indexed cell, cell0). Based on the determination, the wireless device may start to monitor one or more search spaces associated with the default cell. For example, the wireless device is configured with a first search space and a second search space for the cell0, the wireless device monitors the first search space and the second search space after the activation of the gNB-assisted sidelink operation for the sidelink cell. At a time m, the base station may indicate switching of a scheduling cell for the sidelink cell from cell0 to cell1 by indicating the cell index=1 in the scheduling SL DCI. In response to receiving the SL DCI, the wireless device may schedule one or more PSSCH(s) based on the SL DCI. The wireless device may apply the indicated scheduling cell (cell1) after a time delay T. After then time T, the base station may schedule another SL DCI at a time s via cell1. The wireless device may schedule one or more PSSCHs based on the another SL DCI received from cell1. At a time o, the base station may indicate to deactivate the gNB-assisted sidelink operation for the sidelink cell. The wireless device may fall back to a UE-assisted sidelink operation (e.g., a mode 2 sidelink operation) for the sidelink cell.

In an example, a wireless device may not be able to switch to another cell for SL DCIs for a sidelink cell in case a primary scheduling cell becomes unavailable. For example, the wireless device may be configured with a single cell for downlink and/or uplink transmissions. The single cell may be also used for scheduling SL DCIs for the sidelink cell when a gNB-assisted sidelink operation (e.g., a mode 1 sidelink operation) is enabled for the sidelink cell. For example, the wireless device may not support dynamic switching to another cell for the sidelink operation. For example, the wireless device may be configured with a plurality of cells across a plurality of cell groups. A first cell group may be operated with a first RAT. A second cell group may be operated with a second RAT. The wireless device may support either the first RAT or the second RAT for a sidelink operation on the sidelink cell. The wireless device may not be able to switch between two cell groups, where one cell group may consist of a single cell. When the wireless device may not be able to switch or the base station may not be able to dynamically change a scheduling cell for SL DCIs for the sidelink cell, the wireless device may switch to a UE-autonomous sidelink operation (e.g., a mode 2 sidelink operation) or the base station may trigger to deactivate the gNB-assisted sidelink operation when the single cell becomes unavailable.

In an example, the base station may indicate dynamically enabling and/or disabling of a gNB-assisted operation via DCIs and/or MAC CEs for each sidelink resource pool or for each sidelink cell/carrier/BWP. The base station may utilize a MAC CE format similar to a SCell activation/deactivation to activate the gNB-assisted operation for a resource pool where a list of resource pools are indexed and indicated using a bitmap. The base station may utilize a MAC CE format similar to a SCell activation/deactivation to activate the gNB-assisted operation for a sidelink cell/carrier/BWP where a list of sidelink cells/carriers/BWPs are indexed and indicated using a bitmap. For example, in response to receiving a power saving signal (e.g., reducing monitoring on one or more search spaces/CORESETs, switching to dormant state, switching to power efficient bandwidth part, switching to DRX off, DRX off state, no-wake-up at the DRX onduration, and/or the like), the wireless device may assume that the gNB-assisted sidelink operation where SL DCIs are scheduled from search spaces which will be skipped for monitoring by the power saving signal. If a first search space is indicated to skip monitoring and a second search space is indicated to continue monitoring, wherein the first search space and the second search space are used for SL DCIs for a sidelink cell, the wireless device may monitor the second search space only for the SL DCIs for the sidelink cell.

For example, during a measurement gap, the wireless device may not be able to receive SL DCIs. The wireless device may be allowed to use a UE-autonomous operation during the measurement gap. For example, during a beam failure recovery of a scheduling cell, the wireless device may not receive SL DCIs. The wireless device may be allowed to use a UE-autonomous operation during the beam recovery procedure of the scheduling cell. In an example, the base station may utilize a separate DCIs from the sidelink DCIs to indicate the switching. In an example, the base station may utilize DCIs scheduling downlink data to indicate the switching where downlink data may comprise MAC CEs indicating the switching.

Figure 28:
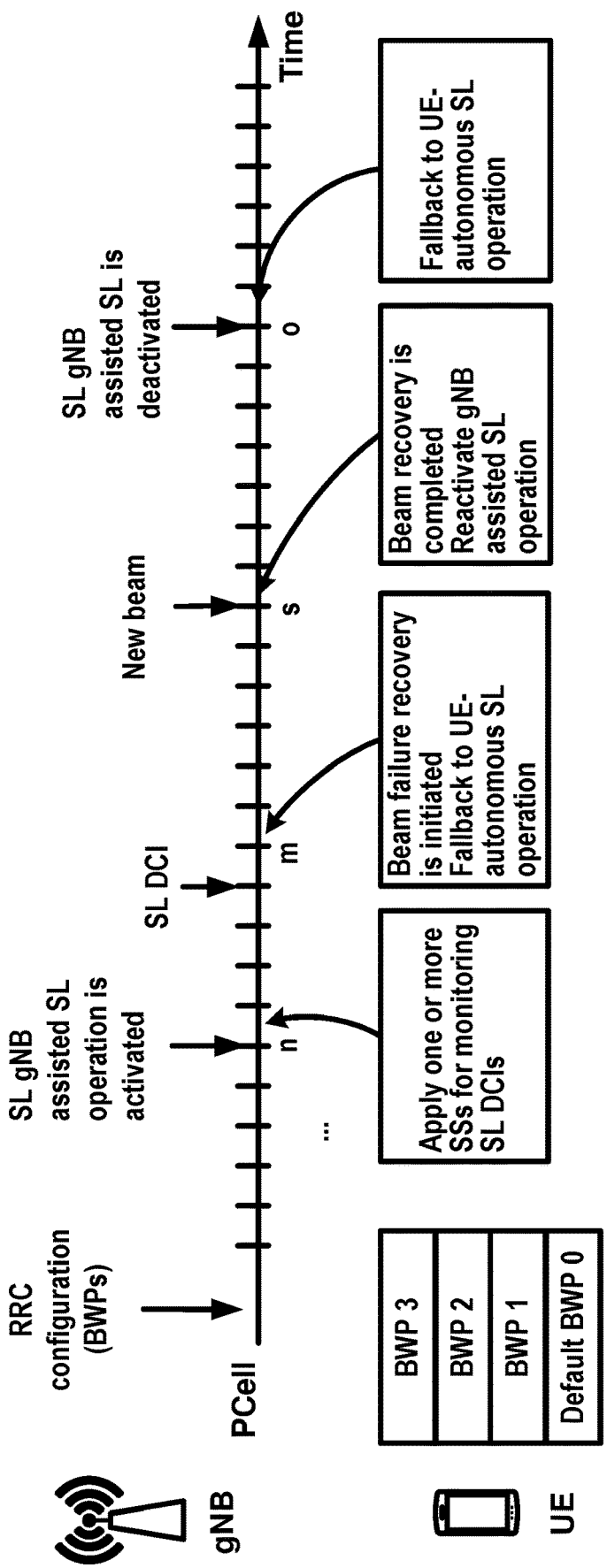
FIG. 28 illustrates an example signal flow diagram of an embodiment as per an aspect of an example embodiment of the present disclosure.

FIG. 28 illustrates an example. A base station may configure PCell to a wireless device which is used for both downlink/uplink and a sidelink scheduling for a sidelink cell. When a gNB-assisted operation is activated at a time n, the wireless device may start monitoring of one or more search spaces configured for SL DCIs for the sidelink cell associated with the PCell. The wireless device may receive a SL DCI from PCell. At a time m, a beam failure occurs and a beam failure recovery is transmitted. In response to transmission of a BFR, the wireless device may fallback to a UE-assisted sidelink operation for the sidelink cell. When the wireless device switches to the UE-assisted sidelink operation, the wireless device may select resource pools for the sidelink cell. For example, the wireless device may select one or more resource pools of the sidelink cell configured with a UE-assisted operation (e.g., mode 2 operation resource pool). This may increase some latency if the one or more resource pools of mode 2 may be configured with a large interval/periodicity. Another approach is to use one or more resource pools of the sidelink cell configured for a gNB-assisted operation. The resource pools will be maintained as before BFR. Instead of monitoring SL DCIs for potential sidelink transmissions, the wireless device may select one or more resources from the resource pools. This may require the wireless device performing a sensing/measurement on the resource pools for the gNB-assisted operation (e.g., mode 1 operation resource pools). When the base station configures a resource pool which can be used for 'temporary' UE-autonomous operation and will be used mainly based on a gNB-assisted, the base station may configure a sensing/measurement on the resource pool. The base station may also indicate/configure whether to fallback to the UE-autonomous operation mode in case of a failure/unavailability.

After a beam recovery is completed at a time s, the wireless device may switch/fallback to the gNB-assisted behavior (e.g., reactivate gNB-assisted SL operation). The autonomous fallback operation to a UE-autonomous resource selection or UE-autonomous sidelink operation may be indicated by the base station for each resource pool which is configured for a gNB-assisted resource selection or gNB-assisted sidelink operation. In an example, a base station may transmit one or more RRC messages comprising configuration parameters. The configuration parameters may comprise/indicate one or more configured grants or semi-persistent scheduling or semi-periodic resources or periodic resources or a recovery resource pool for a sidelink cell if the base station may assist a sidelink operation on the sidelink cell. When a scheduling cell for SL DCIs for the sidelink cell becomes unavailable due to some failure(s) (such as beam failure, measurement gap, radio link failure, hand-over, RRC_INACTIVE, RRC_IDLE, dormant state, power saving, SCell deactivated, and/or the like), the wireless device may be allowed to use the configured one or more configured grants or the semi-persistent scheduling or the semi-periodic resources or the periodic resources or a recovery resource pool for the sidelink cell until the failure(s) are resolved. In other cases, the configured resources are not assumed to be used by the wireless device. To utilize the configured resources, the wireless device may perform a measurement/sensing on the configured resources regardless of whether the wireless device is currently using the resources or not. While the wireless device is not utilizing the resources, the wireless device may perform measurements/sensing with a first periodicity/interval (e.g., 100 msec) whereas the wireless device may perform measurements/sensing with a second periodicity (e.g., 10 slots) when the wireless device is using the configured resources due to the failure(s). The configured resources may be also used by the wireless device when the base station may deactivate the gNB-assisted operation on one or more resources pools of the sidelink cell.

In an example, a wireless device may transmit 'an early SL SR' which may request to configure a semi-persistent or a configured grant resource to a base station. The configured semi-persistent or the configured grant resource may be used if new sidelink data may arrive. Otherwise, the wireless device may deactivate the configured resource after a certain time or based on one or more events. For example, the wireless device may transmit the early SL SR before a measurement gap which may have a few msec interruption time (e.g., 6 msec) on a scheduling cell. The base station, in response to the early SL SR transmission, may configure a configured grant or activate a configured grant resource which can be used within the measurement gap. After the measurement gap is finished, the configured grant resource may be autonomously deactivated by the wireless device or the base station may deactivate the configured grant resource. The base station, dynamically, activate or deactivate one or more configured grant resources. Similar as to SCell activation/deactivation MAC CE, a set of configured grant resources may be activated and/or deactivated by a MAC CE or DCIs. When the wireless device may not expect any sidelink data, the wireless device may not indicate the early SL SR. In an example, a base station may configure one or more configured grant resources which may be used when a scheduling cell for SL DCIs for a sidelink cell is not available. A wireless device may transmit 'a confirmation' before the scheduling cell becomes unavailable or via another cell (e.g., PCell) about utilizing the configured one or more configured grant resources during the unavailability duration.

Figure 29:
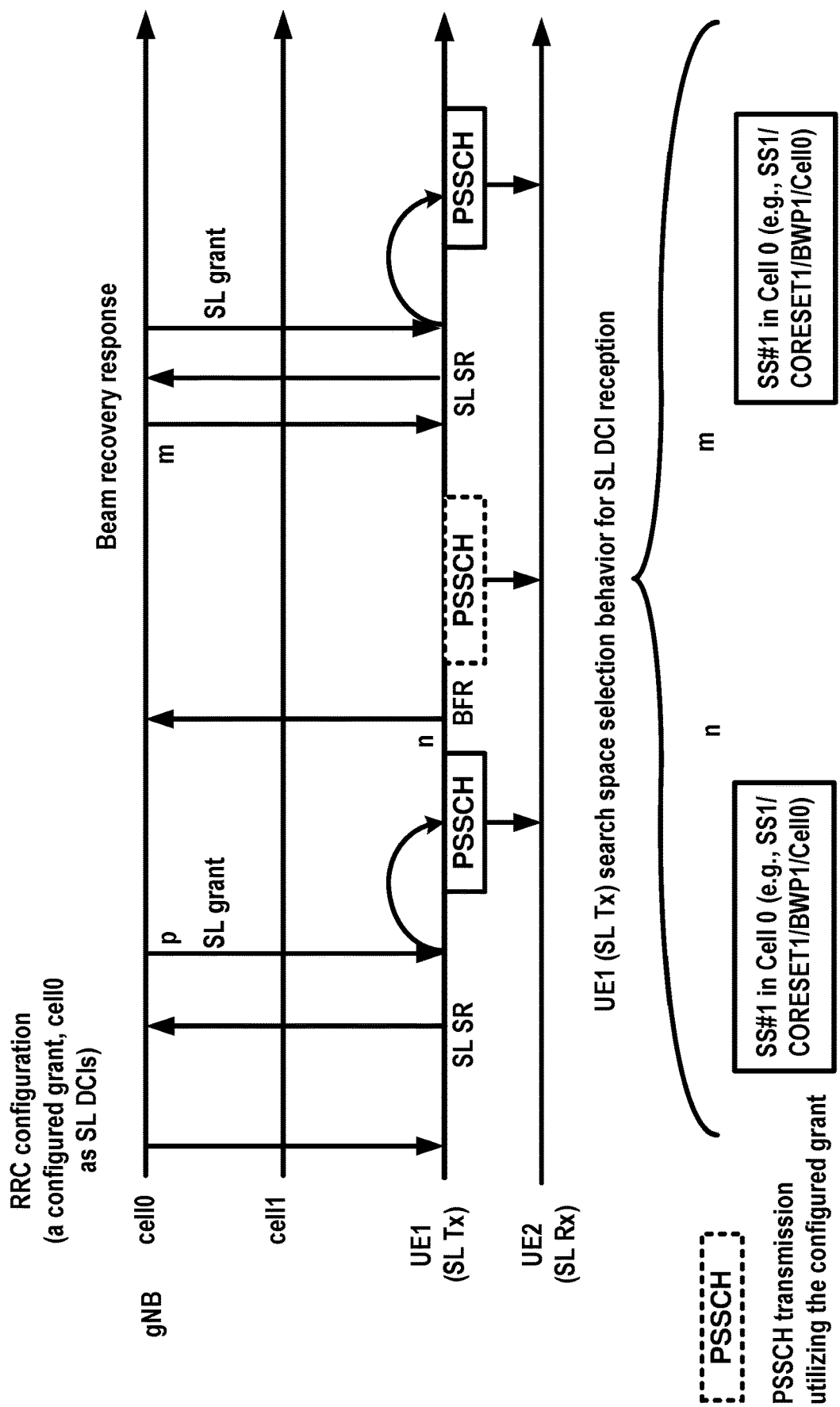
FIG. 29 illustrates an example signal flow diagram of an embodiment as per an aspect of an example embodiment of the present disclosure.

FIG. 29 illustrates an example. A base station may transmit, to a wireless device, one or more RRC messages comprising configuration parameters. The configuration parameters may comprise/indicate a first cell (cell0) and a second cell (cell1). The wireless device (Tx UE) may operate a sidelink operation on a sidelink cell and communicate with another wireless device (Rx UE) via the sidelink cell. The configuration parameters may comprise/indicate the first cell as a scheduling cell for scheduling one or more SL DCIs for resource allocation on the sidelink cell. The configuration parameters may comprise/indicate a configured grant resource/configuration that may be used during the unavailability time of the first cell. The wireless device may receive one or more SL DCIs from the base station for resource allocations on the sidelink cell and/or one or more resource pools of the sidelink cell. The base station may transmit a SL DCI, via the first cell (cell0), scheduling resources for the sidelink cell at a time p. The wireless device may transmit one or more PSSCH(s) based on the SL DCI received at the time p. When the wireless device detects a beam failure on the first cell (cell0), the wireless device transmits a BFR request via a SR to another cell or via a PRACH or via another dedicated channel via another cell, and/or the like. In response to transmitting the BFR, the wireless device may start utilizing the configured grant resource/configuration for the sidelink cell. For example, the wireless device may autonomously activate the configured grant resources and may transmit one or more PSSCH(s) utilizing the configured grant resource/configuration based on a resource selection without receiving SL DCI from the base station. For example, the configured grant resource/configuration may be configured based on a type 1 configured grant, where the configured grant resource/configuration may be activated upon receiving the configuration parameters. The wireless device may skip using the configured grant resource/configuration while the first cell is available for transmitting SL DCIs. The wireless device may start using the configured grant resource/configuration in response to the first cell becomes unavailable. In response to receiving a beam recovery response at a time m, the wireless device may deactivate or stop using the configured grant resource/configuration. The base station may resume transmitting SL DCIs to the wireless device. The wireless device may transmit one or more PSSCHs based on second SL DCIs received after the beam recovery response to the another wireless device (Rx UE).

In an example, a base station may transmit one or more RRC messages comprising configuration parameters. The configuration parameters may comprise/indicate a plurality of search spaces of a plurality of cells for SL DCIs for a sidelink cell. The configuration parameters may indicate/comprise a list of priority for the configured plurality of cells for monitoring for SL DCIs for the sidelink cell. A wireless device may monitor a highest priority cell (e.g., a top cell in the list) for SL DCIs for the sidelink cell as long as the highest priority cell is available (e.g., the wireless device is able to receive DCIs from the cell). When the highest priority cell becomes unavailable due to a beam failure, RLF, deactivated state, measurement gap and/or the like, the wireless device may switch to a next highest priority cell in the list for SL DCIs for the sidelink cell. When the highest priority cell becomes available again, the wireless device may switch back to the highest priority cell. In an example, a base station may configure a plurality of search spaces of a plurality of cells. The configuration parameters may indicate/comprise time durations to monitor a cell among the plurality of cells. For example, the configuration parameters may indicate/comprise odd frames (e.g., odd 10 msec) for monitoring a first cell among the plurality of cells. The configuration parameters may indicate/comprise even frames (e.g., even 10 msec) for monitoring a second cell among the plurality of cells.

The wireless device may indicate unavailability of a cell via an indication such as a beam failure recovery request, an RLF indication to a PCell of a second cell group, an RLF indication and/or the like. The base station may indicate unavailability of the cell via an indication of a power saving triggering, a measurement gap, DRX cycle configurations, and/or the like.

Figure 30:
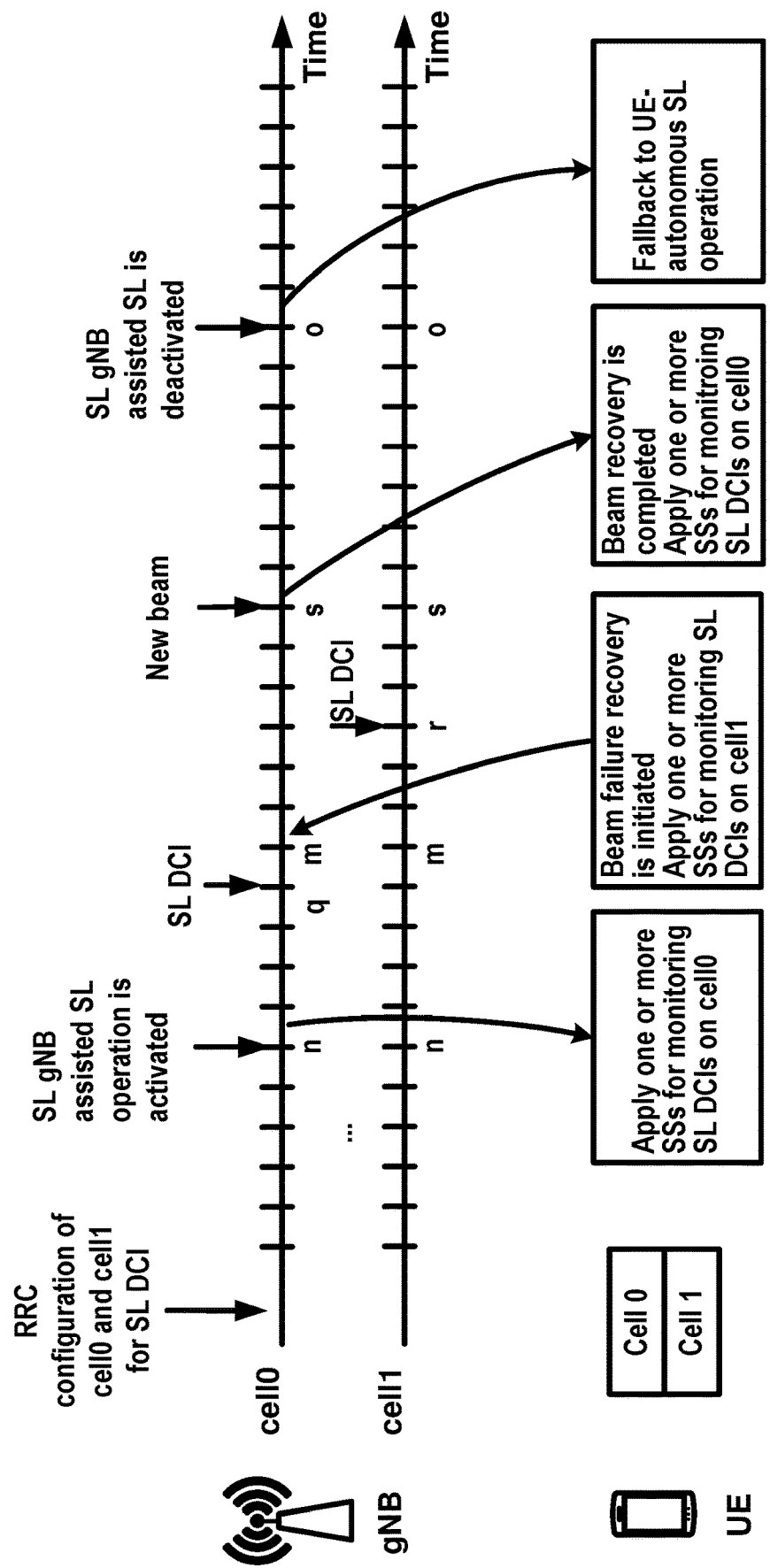
FIG. 30 illustrates an example signal flow diagram of an embodiment as per an aspect of an example embodiment of the present disclosure.

FIG. 30 illustrates an example. A scenario of FIG. 30 is similar to FIG. 27. A base station may transmit one or more RRC messages comprising configuration parameters. The configuration parameters may comprise/indicate a plurality of search spaces of a plurality of cells for scheduling SL DCIs for a sidelink cell. At a time n, a gNB-assisted sidelink operation is activated. In response to the activation, a wireless device may monitor one or more search spaces associated with a default cell (e.g., cell0). The base station may transmit a SL DCI at a time q via the cell0. The wireless device may transmit one or more PSSCHs based on the SL DCI. At a time m, a beam failure occurs for the cell0. The wireless device may switch a scheduling cell for SL DCIs for the sidelink cell from the cell0 to cell1. The wireless device may monitor one or more search spaces associated with the cell1 during a beam failure recovery procedure for the cell0. At a time r, the base station may transmit another SL DCI via the cell1. At a time s, a beam recovery process is completed. The wireless device may fallback/switch to the cell0 for SL DCIs for the sidelink cell. The wireless device may monitor the one or more search spaces associated with the cell0 after the beam recovery is completed.

In an example, a base station may transmit one or more RRC messages comprising configuration parameters. The configuration parameters may comprise/indicate one or more search spaces on a cell for a resource pool mapping with a logical channel priority (LCH) for a sidelink cell. For example, the configuration parameters may indicate a first search space for a first resource pool and may indicate a second search space for a second resource pool. For example, the configuration parameters may indicate a first search space for a first LCH and may indicate a second search space for a second LCH. For example, depending on a priority of the resource pool based on LCH mapping, the base station may configure a PCell or a SCell. For each resource pool, the configuration parameters may indicate/comprise a cell index where a wireless device may monitor for SL DCIs for the sidelink cell and/or for the resource pool.

In an example, a base station may transmit one or more RRC messages comprising configuration parameters. The configuration parameters may comprise/indicate a cell index to be used for a timing reference when a wireless device may utilize the base station as a synchronization source for a sidelink operation. As a first wireless device may be connected to a first frequency and a second wireless device may be connected to a second frequency where overall latency may be different in each frequency (e.g., the first frequency is below 6 GHz and the second frequency is above 6 GHz), it may be beneficial to indicate a cell index or frequency which the first wireless device and/or the second wireless device may use for the synchronization. If there is no such a signaling, the wireless device may perform a synchronization for a sidelink operation based on PCell of a first cell group when a gNB-assisted operation is configured for the first cell group and/or SPCell of a second cell group when a gNB-assisted operation is configured for the second cell group. The wireless device may perform a sidelink synchronization for a sidelink cell/carrier/BWP based on a scheduling cell which is configured for SL DCIs for the sidelink cell/carrier/BWP. The wireless device may select a lowest cell index among scheduling cells for SL DCIs for the sidelink cell when there are a plurality of scheduling cells configured. In an example, the wireless device may assume a primary cell as a synchronization source, wherein the primary cell belongs to a same timing advance group as to a scheduling cell for SL DCIs for the sidelink cell. Flexible indication of a synchronization frequency/cell may allow a first wireless device and a second device to align its timing sources even if the first wireless is connected to a first frequency as a PCell and the second wireless device is connected to a second frequency as a PCell. This may be beneficial in carrier aggregation, cell grouping, dual connectivity, inter-RAT dual connectivity, inter-RAT sidelink operation and/or the like.

In an example, when a wireless device is connected to a first cell group with a first RAT and a second cell group with a second RAT, the wireless device may follow a first base station of the first cell group or a second base station of the second cell group depending on a RAT of a sidelink resources/operation of a sidelink cell. When the sidelink resource/operation of the sidelink cell is based on the first RAT, the first base station is used for a time synchronization. When the sidelink resource/operation of the sidelink cell is based on the second RAT, the second base station is used for the time synchronization. For example, the first RAT and the second RAT are a same, the wireless device may follow a primary cell of a cell group where a scheduling cell for SL DCIs for the sidelink cell belongs to. When the first base station may control the sidelink operation/resource of the second RAT, the first base station may be a synchronization source. When the second base station may control the sidelink operation/resource of the first RAT, the second base station may be the synchronization source.

In an example, a scheduling cell for SL DCIs for a sidelink cell may be restricted to one of one or more cells that belong to a same timing advanced group to a PCell or a SPCell.

In an example, a base station may transmit one or more RRC messages comprising configuration parameters. The configuration parameters may comprise/indicate a first resource pool on a sidelink cell and one or more first search spaces of a first cell. The base station may configure a second resource pool on the sidelink cell and one or more second search spaces of a second cell. When the first cell is active/available, a wireless device may utilize the first resource pool on the sidelink cell. When the second cell is active/available, the wireless device may utilize the second resource pool on the sidelink cell. The first cell and the second cell may be a same or may be different.

Embodiments proposed in the specification may be applied to other channel transmission such as a SR transmission or a sidelink control information transmission. For example, a base station may transmit one or more RRC messages comprising configuration parameters. The configuration parameters may comprise/indicate a plurality of SR resources mapping over a plurality of cells for a same set of LCHs. A primary SR resource (e.g., SR resource configured in PCell or SPCell or PUCCH SCell) is used when a primary cell (e.g., PCell or SPCell or PUCCH SCell) is available for SR transmission. The base station may select a single cell for a SR transmission and/or as a PCell or a primary cell of a cell group via dynamic signaling such as DCIs and/or MAC CEs. In response to receiving a command to switch the primary cell, a wireless device may switch to a new primary cell for transmission of SRs, receiving paging and/or the like. The wireless device may assume that a previous primary cell and the new primary cell may belong to a same timing advance group and may belong to a same frequency region (such as below 6 GHz or above 6 GHz or in a same band (e.g., intra-band carriers)). Otherwise, a wireless device may use a next cell for SR transmission. In an example, a transmitter wireless device may configure a plurality of search spaces of a plurality of sidelink cells for SCIs for scheduling a resource pool and/or a sidelink cell. Embodiments in the specification for SL DCIs may be applied similarly to the SCIs.

Figure 31:
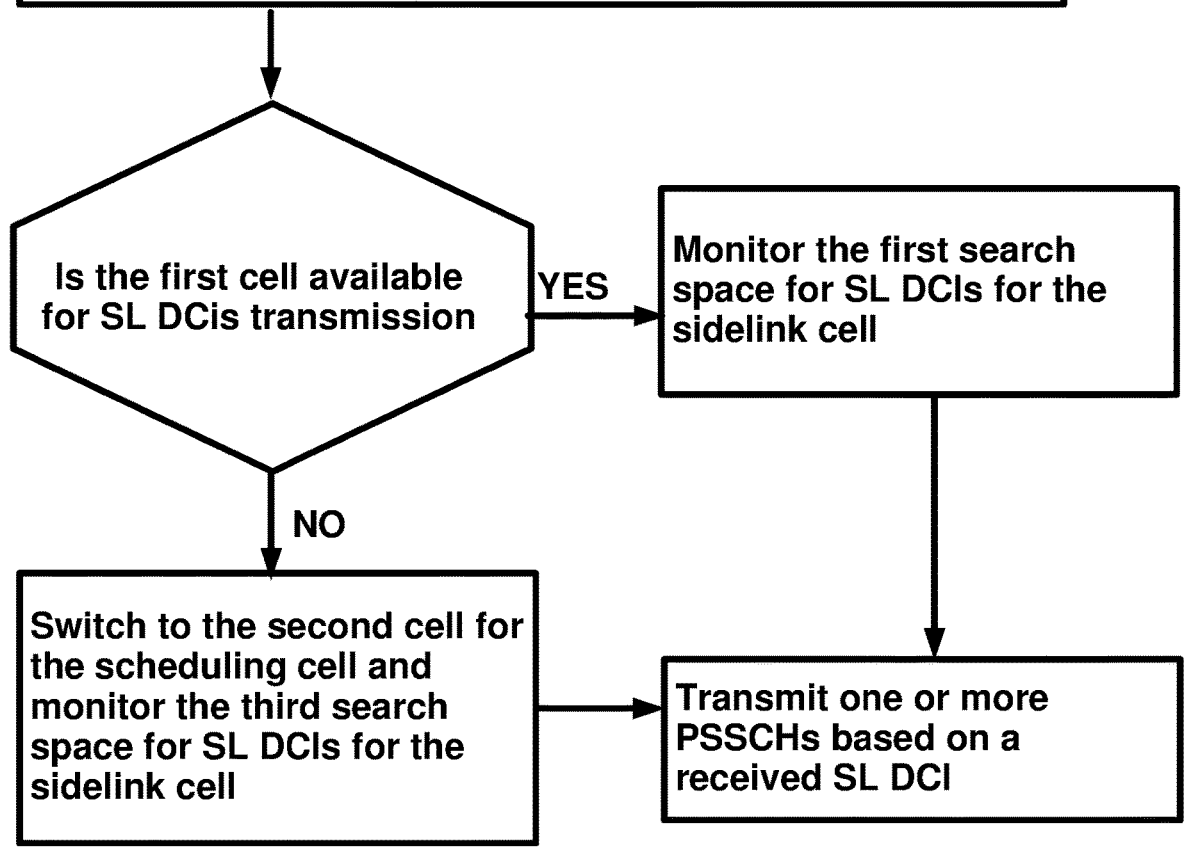
FIG. 31 is a flow diagram of an aspect of an example embodiment of the present disclosure.

FIG. 31 illustrates a flow diagram. A base station may transmit one or more RRC messages comprising configuration parameters. The configuration parameters may comprise/indicate a plurality of search spaces of a plurality of cells (e.g., a first search space and a second search space associated with a first cell and a third search space associated with a second cell). The configuration parameters may comprise/indicate one or more search spaces for SL DCIs for a sidelink cell (e.g., the first search space of the first cell and the third search space of the second cell). A wireless device may determine a single cell (or a single search space) for monitoring SL DCIs for the sidelink cell based on a certain rule. For example, the wireless device may determine the first cell as the single cell. The wireless device may monitor the first cell for SL DCIs for the sidelink cell when the first cell is available for transmitting SL DCIs. Otherwise, the wireless device may switch to the second cell and monitor the third search space of the second cell for SL DCIs. Based on one or more received SL DCI(s), the wireless device may transmit one or more PSSCH(s).

Figure 32:
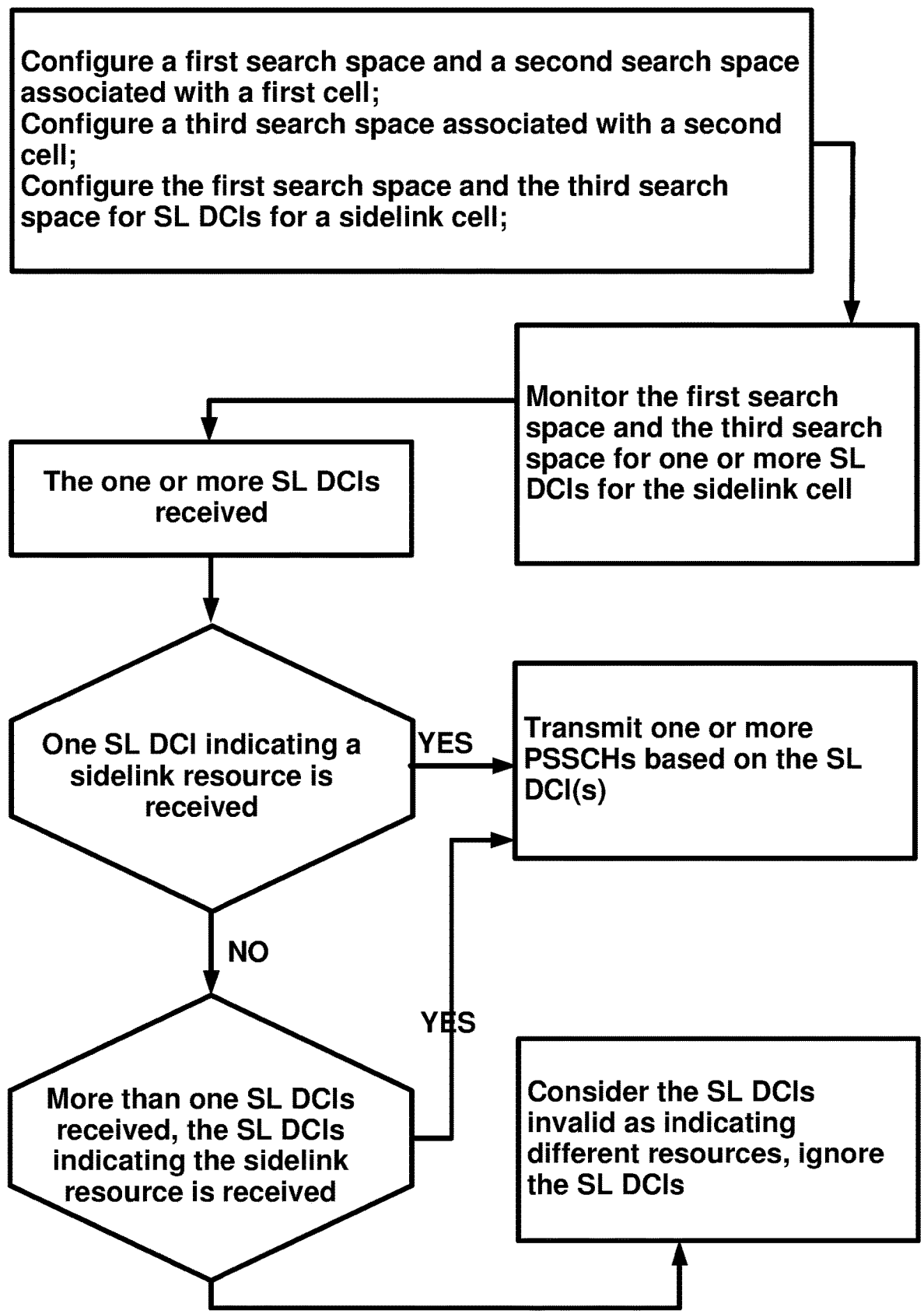
FIG. 32 is a flow diagram of an aspect of an example embodiment of the present disclosure.
Figure 33:
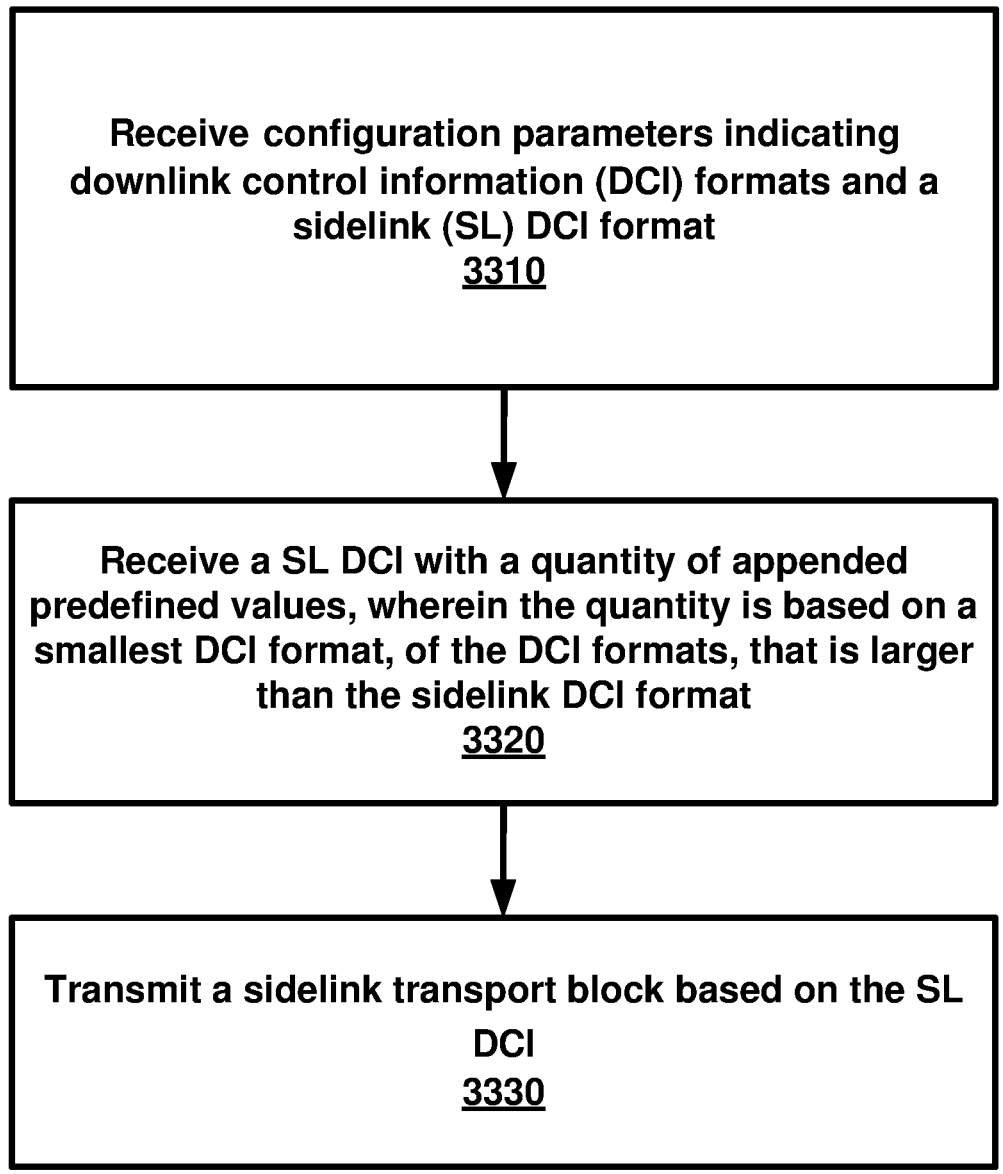
FIG. 33 is a flow diagram of an aspect of an example embodiment of the present disclosure.
Figure 34:
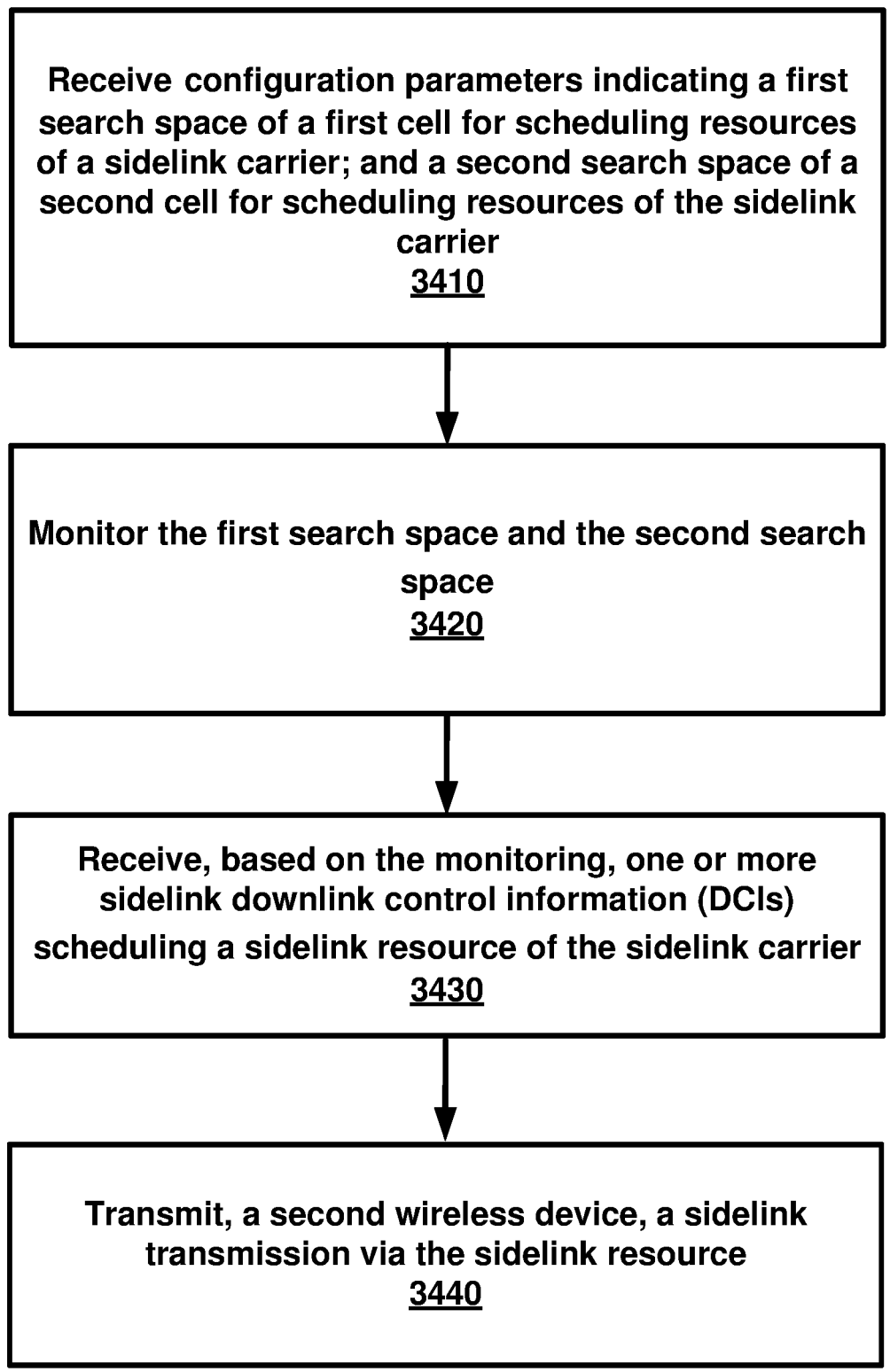
FIG. 34 is a flow diagram of an aspect of an example embodiment of the present disclosure.

FIG. 32 illustrates a flow diagram. A base station may transmit one or more RRC messages comprising configuration parameters. The configuration parameters may comprise/indicate a plurality of search spaces of a plurality of cells (e.g., a first search space and a second search space associated with a first cell and a third search space associated with a second cell). The configuration parameters may comprise/indicate one or more search spaces for SL DCIs for a sidelink cell (e.g., the first search space of the first cell and the third search space of the second cell). A wireless device may monitor all configured search spaces for SL DCIs for the sidelink cell. The wireless device may monitor the first search space of the first cell and the third search space of the second cell. When the wireless device may receive a single DCI from either cell/search space, the wireless device may transmit one or more PSSCHs based on the received single SL DCI for the sidelink cell. When the wireless device may receive more than one SL DCIs from cells/search spaces, the wireless device may transmit one or more PSSCHs based on the received SL DCIs when indicated sidelink resources from the SL DCIs are equivalent. Otherwise, the wireless device may consider the received SL DCIs are invalid and may ignore the received SL DCIs.

In an example, a wireless device may receive one or more radio resource control (RRC) messages. The one or more RRC messages may comprise, for monitoring a first sidelink DCI for a sidelink cell, one or more first parameters indicating a first search space of a first cell. The one or more RRC messages may comprise, for monitoring a second sidelink DCI for the sidelink cell, one or more second parameters indicating a second search space of a second cell. The wireless device may monitor both the first search space of the first cell and the second search space of the second cell for one or more resource allocation, via one or more sidelink DCIs via the first cell and/or the second cell, for sidelink data transmission of a transport block for the sidelink cell. The wireless device may transmit the sidelink data transmission in response to receiving the one or more resource allocation.

For example, the base station may select the first cell and the second cell from one or more active cells of a cell group configured to the wireless device. For example, the base station may select the first cell and the second cell from active cells across a plurality of cell groups configured to the wireless device. For example, the first cell and the second cell may be different. For example, the first cell and the second cell may be the same. For example, the wireless device may monitor the first search space for monitoring one or more DCIs, wherein the one or more DCIs may comprise resource assignments for scheduling downlink and/or uplink data for one or more cells.

For example, the wireless device may determine a first DCI size for the first sidelink DCI of the first cell, wherein the first DCI size may be determined based on one or more DCI formats of DCIs for the first cell. For example, the wireless device may determine the first DCI size for the first sidelink DCI of the first cell, wherein the first DCI size may be the same as a DCI size used for the first search space for monitoring one or more DCIs comprising resource assignments for downlink and/or uplink data for the one or more cells. For example, the wireless device may select a second DCI size among a plurality of DCI sizes that are used for the first search space for monitoring one or more DCIs comprising resource assignments for downlink and/or uplink data for the one or more cells when self-carrier scheduling and cross-carrier scheduling are supported by the first search space. The wireless device may determine a third DCI size based on a self-carrier scheduling for the second DCI size.

For example, the wireless device may align a first SL DCI size of the first sidelink DCI of the first cell to a first DL/UL DCI size used for monitoring on the first search space where the wireless device is not configured with monitoring SL DCIs on the first search space. For example, the wireless device may align a second SL DCI size of the second sidelink DCI of the second cell to a second DL/UL DCI size used for monitoring on the second search space where the wireless device is not configured with monitoring SL DCIs on the second search space. This may allow no increase of number of blind decoding the wireless device may need to perform with and without configuration of monitoring SL DCIs on a cell.

For example, the wireless device may select one or more search spaces for the first search space, wherein the wireless device may monitor fallback DCI formats such as DCI format 0_0 and DCI format 1_0. For example, the wireless device may select one or more search spaces for the first search space, wherein the wireless device may monitor non-fallback DCI formats such as DCI format 0_1 and DCI format 1_1. For example, the wireless device may select one or more search spaces for the first search space, wherein the wireless device may monitor non scheduling DCI formats such as DCI format 2_0 and DCI format 2_1. For example, the wireless device may select only UE-specific search spaces for the one or more search spaces. For example, the wireless device may select only cell-specific search space for the one or more search spaces. For example, the wireless device may select a search space regardless of USS or CSS. For example, the wireless device may determine a DCI size of the selected DCI formats as the first DCI size of the first sidelink DCI. A similar procedure may apply to the second sidelink DCI on the second cell.

For example, the wireless device may select a smallest DCI size among a plurality of DCI sizes of the one or more search spaces of the first cell. The wireless device may select the DCI size with a self-carrier scheduling DCI formats. The DCI size may be larger than or equal to the size of the first sidelink DCI format. Otherwise, the wireless device may skip monitoring the first sidelink DCI format on the first search space.

For example, the base station may transmit a plurality of SL DCIs over the first cell and the second cell for scheduling one or more sidelink resources for a transport block. In response to receiving the plurality of SL DCIs, the wireless device may transmit the scheduling when indicated sidelink resources from the plurality of SL DCIs are equal.

In an example, a wireless device may receive one or more radio resource control messages. The one or more RRC messages may comprise one or more first parameters indicating one or more first search spaces, of a first cell, for monitoring for a first sidelink DCI for a sidelink cell. The one or more RRC messages may comprise one or more second parameters indicating one or more second search spaces, of a second cell, for monitoring for a second sidelink DCI for the sidelink cell. The wireless device may receive a command via MAC CEs or DCIs to indicate or switch a cell index of a scheduling cell between the first cell and the second cell for the sidelink cell. The wireless device may determine the one or more first search spaces in response to indication of the first cell in the cell index. The wireless device may determine the one or more second search spaces in response to indication of the second cell in the cell index. The wireless device may monitor the determined search spaces for a sidelink DCI for the sidelink cell. The wireless device may transmit a sidelink transmission based on the received sidelink DCI.

In an example, a wireless device may receive one or more radio resource control messages. The one or more RRC messages may comprise one or more first parameters indicating one or more first search spaces, of a first cell, for monitoring for a first sidelink DCI for a sidelink cell. The one or more RRC messages may comprise one or more second parameters indicating one or more second search spaces, of a second cell, for monitoring for a second sidelink DCI for the sidelink cell. The wireless device may transmit a command via MAC CEs or SRs to indicate or switch a cell index of a scheduling cell between the first cell and the second cell for the sidelink cell. The wireless device may determine the one or more first search spaces in response to indication of the first cell in the cell index. The wireless device may determine the one or more second search spaces in response to indication of the second cell in the cell index. The wireless device may monitor the determined search spaces for a sidelink DCI for the sidelink cell. The wireless device may transmit a sidelink transmission based on the received sidelink DCI.

In an example, a wireless device may receive one or more RRC messages, for monitoring SL DCIs for a sidelink cell. The one or more RRC messages may comprise one or more first parameters indicating a first search space for a first BWP of a cell. The one or more RRC messages may comprise one or more second parameters indicating a second search space for a second BWP of the cell. The wireless device may receive a command to activate the first BWP as a current active BWP for the cell. The wireless device may determine a first SL DCI size of a first sidelink DCI which is assumed to be used for monitoring SL DCIs in the first search space based on one or more DCI formats monitored for non-sidelink DCIs. The wireless device may use the first SL DCI size for monitoring the first sidelink DCI for the first search space of the first BWP for the sidelink cell. The wireless device may receive a command to activate the second BWP as a current active BWP for the cell. The wireless device may determine a second SL DCI size of a second sidelink DCI which is assumed to be used for monitoring SL DCIs in the second search space based on one or more DCI formats monitored for non-sidelink DCIs. The wireless device may use the second SL DCI size for monitoring the second sidelink DCI for the second search space of the second BWP for the sidelink cell.

In an example, a first wireless device may receive from a base station one or more radio resource control messages. The one or more RRC messages may indicate a plurality of search spaces for receiving scheduling information of a sidelink cell. The one or more parameters may comprise a first parameter indicating a first search space of a first cell. The one or more parameters may comprise a second parameter indicating a second search space of a second cell. The first wireless device may receive from the base station via one or more search spaces of the plurality of search spaces one or more sidelink DCIs. The first wireless device may transmit to a second wireless device a sidelink transmission based on the one or more sidelink DCIs.

What is claimed is:

1. A method comprising:
    receiving, by a first wireless device from a base station, one or more configuration parameters indicating:
        a first search space of a first cell for scheduling resources of a sidelink carrier; and
        a second search space of a second cell for scheduling resources of the sidelink carrier;
    monitoring the first search space and the second search space;
    determining a cell among the first cell and the second cell to be a scheduling cell of the sidelink carrier, wherein the scheduling cell is based on a lowest cell index among the first and second cell;
    receiving, based on the monitoring, sidelink downlink control information (DCI) scheduling a sidelink resource of the sidelink carrier; and
    transmitting, by the first wireless device to a second wireless device, a sidelink transmission via the sidelink resource.

2. The method of claim 1, wherein the second search space overlaps with the first search space in time domain.

3. The method of claim 1, further comprising receiving a command, via one or more medium access control control elements (MAC CEs) or DCIs, indicating a cell among the first cell and the second cell, wherein the first wireless device receives, from the base station, the sidelink DCI via the cell indicated by the command.

4. The method of claim 1, further comprising transmitting a message indicating the cell via a medium access control control element (MAC CE) or a scheduling request (SR).

5. The method of claim 1, further comprising monitoring at least one of:
    the first search space, for the sidelink DCI, of the first cell in response to the cell being the first cell; or
    the second search space, for DCIs, of the second cell in response to the cell being the first cell.

6. The method of claim 1, further comprising monitoring at least one of:
    the second search space, for the sidelink DCI, of the second cell in response to the cell being the second cell; or
    the first search space, for DCIs, of the first cell in response to the cell being the second cell.

7. The method of claim 1, further comprising determining a first DCI size of a first sidelink DCI, via the first search space, based on a second DCI size of a first DCI via the first search space.

8. The method of claim 7, further comprising adding zeros to the first sidelink DCI in response to a size of the first sidelink DCI being smaller than the second DCI size before adding the zeros.

9. A first wireless device comprising:
    one or more processors; and
    memory storing instructions that, when executed by the one or more processors, cause the first wireless device to:
        receive, from a base station, one or more configuration parameters indicating:
            a first search space of a first cell for scheduling resources of a sidelink carrier; and
            a second search space of a second cell for scheduling resources of the sidelink carrier;
        monitor the first search space and the second search space;
        determine a cell among the first cell and the second cell to be a scheduling cell of the sidelink carrier, wherein the scheduling cell is based on a lowest cell index among the first and second cell;
        receive, based on the monitoring, sidelink downlink control information (DCI) scheduling a sidelink resource of the sidelink carrier; and
        transmit, by the first wireless device to a second wireless device, a sidelink transmission via the sidelink resource.

10. The first wireless device of claim 9, wherein the second search space overlaps with the first search space in time domain.

11. The first wireless device of claim 9, wherein the instructions further cause the first wireless device to receive a command, via one or more medium access control control elements (MAC CEs) or DCIs, indicating a cell among the first cell and the second cell, wherein the first wireless device receives, from the base station, the sidelink DCI via the cell indicated by the command.

12. The first wireless device of claim 9, wherein the instructions further cause the first wireless device to transmit a message indicating the cell via a medium access control control element (MAC CE) or a scheduling request (SR).

13. The first wireless device of claim 9, wherein the instructions further cause the first wireless device to monitor at least one of:
    the first search space, for the sidelink DCI, of the first cell in response to the cell being the first cell;

the second search space, for DCIs, of the second cell in response to the cell being the first cell;

the second search space, for the sidelink DCI, of the second cell in response to the cell being the second cell; or the first search space, for DCIs, of the first cell in response to the cell being the second cell.

14. The first wireless device of claim 9, wherein the instructions further cause the first wireless device to determine a first DCI size of a first sidelink DCI, via the first search space, based on a second DCI size of a first DCI via the first search space.

15. The first wireless device of claim 14, wherein the instructions further cause the first wireless device to add zeros to the first sidelink DCI in response to a size of the first sidelink DCI being smaller than the second DCI size before adding the zeros.

16. A system comprising:
a base station comprising one or more first processors and memory storing instructions that, when executed by the one or more first processors, cause the base station to:
  transmit one or more configuration parameters indicating:
    a first search space of a first cell for scheduling resources of a sidelink carrier; and
    a second search space of a second cell for scheduling resources of the sidelink carrier;
a first wireless device comprising one or more second processors and second memory storing second instructions that, when executed by the one or more second processors, cause the first wireless device to:
  receive, from the base station, the one or more configuration parameters;
  monitor the first search space and the second search space;
  determine a cell among the first cell and the second cell to be a scheduling cell of the sidelink carrier, wherein the scheduling cell is based on a lowest cell index among the first and second cell;
  receive, based on the monitoring, sidelink downlink control information (DCI)
  scheduling a sidelink resource of the sidelink carrier; and
  transmit a sidelink transmission via the sidelink resource; and
a second wireless device comprising one or more third processors and third memory storing third instructions that, when executed by the one or more third processors, cause the second wireless device to:
  receive, from the first wireless device, the sidelink transmission via the sidelink resource.

* * * * *